US010618404B2

(12) United States Patent
Laberge et al.

(10) Patent No.: US 10,618,404 B2
(45) Date of Patent: Apr. 14, 2020

(54) VEHICLE HAVING DUAL AIR INTAKE SYSTEMS

(71) Applicant: BOMBARDIER RECREATIONAL PRODUCTS INC., Valcourt (CA)

(72) Inventors: Nicolas Laberge, Valcourt (CA); Andre Cote, Sherbrooke (CA); Emmanuel Rius, Sherbrooke (CA); Andre Gilbert, Sherbrooke (CA); Felix-Antoine Brassard, Drummondville (CA); Eric Bertrand, Sherbrooke (CA); David Manseau, Wickham (CA); Eric Lafreniere, Drummondville (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 16/047,803

(22) Filed: Jul. 27, 2018

(65) Prior Publication Data

US 2019/0023123 A1 Jan. 24, 2019

Related U.S. Application Data

(63) Continuation-in-part of application No. PCT/IB2017/050492, filed on Jan. 30, 2017.

(Continued)

(51) Int. Cl.

*B60K 13/02* (2006.01)
*B60K 11/06* (2006.01)

(Continued)

(52) U.S. Cl.

CPC .............. *B60K 13/02* (2013.01); *B60K 11/06* (2013.01); *B60K 11/08* (2013.01); *B62K 5/027* (2013.01);

(Continued)

(58) Field of Classification Search

CPC ........ B60K 13/02; B60K 11/08; B60K 11/06; B60K 2005/003; B62K 5/08; B62K 5/027;

(Continued)

(56) References Cited

U.S. PATENT DOCUMENTS

| | | | |
|---|---|---|---|
| 4,787,470 | A | 11/1988 | Badsey |
| 5,836,412 | A | 11/1998 | Lyles et al. |

(Continued)

FOREIGN PATENT DOCUMENTS

| | | |
|---|---|---|
| WO | WO2015/036983 A2 | 3/2015 |
| WO | WO2017/130172 A1 | 8/2017 |
| WO | WO2017/130174 A1 | 8/2017 |

OTHER PUBLICATIONS

International Search Report of PCT/IB2017/050492; dated May 19, 2017; Lee W. Young.

(Continued)

*Primary Examiner* — Jacob B Meyer

(74) *Attorney, Agent, or Firm* — BCF LLP

(57) ABSTRACT

A vehicle includes a frame, a plurality of ground-engaging members, a steering assembly for steering the vehicle, an internal combustion engine, and a continuously variable transmission (CVT). An engine air intake system provides air to the engine and includes a first air inlet facing generally forwardly and a first rearwardly-extending conduit portion extending rearwardly from the first air inlet. The first rearwardly-extending conduit portion fluidly communicates with an engine air inlet. A CVT air intake system provides air to the CVT and includes a second air inlet facing generally forwardly and a second rearwardly-extending conduit portion extending rearwardly from the second air inlet. The second rearwardly-extending conduit portion fluidly communicates with a cooling air inlet of the CVT. The (Continued)

engine is disposed at least in part laterally between the first and second rearwardly-extending conduit portions.

22 Claims, 57 Drawing Sheets

Related U.S. Application Data

(60) Provisional application No. 62/664,639, filed on Apr. 30, 2018, provisional application No. 62/289,155, filed on Jan. 29, 2016.

(51) Int. Cl.

| | |
|---|---|
| ***B62K 5/027*** | (2013.01) |
| ***F16H 57/04*** | (2010.01) |
| ***B62K 5/08*** | (2006.01) |
| ***B60K 11/08*** | (2006.01) |
| *B60K 5/00* | (2006.01) |
| *B62J 35/00* | (2006.01) |
| *B62K 5/05* | (2013.01) |

(52) U.S. Cl.

CPC ........... *B62K 5/08* (2013.01); *F16H 57/0416* (2013.01); *B60K 2005/003* (2013.01); *B60Y 2200/122* (2013.01); *B60Y 2400/72* (2013.01); *B62J 35/00* (2013.01); *B62K 5/05* (2013.01)

(58) Field of Classification Search

CPC ........ B62K 5/05; F16H 57/0416; B62J 35/00; B60Y 2400/72; B60Y 2200/122

See application file for complete search history.

(56) References Cited

U.S. PATENT DOCUMENTS 6,409,783 B1 6/2002 Miyajima et al.
6,478,105 B2 11/2002 Okuma
6,691,661 B2 2/2004 Lundgreen et al.
6,966,395 B2 * 11/2005 Schuehmacher ...... B62M 27/02 180/185
7,264,075 B2 * 9/2007 Schuemacher ........ B62M 27/02 180/182
7,270,207 B2 9/2007 Idei et al.
7,389,758 B2 6/2008 Yokoi
7,418,937 B2 9/2008 Yokoi
7,493,881 B2 2/2009 Smith et al.
7,730,865 B2 6/2010 Yokoi
7,832,371 B2 11/2010 Fujita et al.
7,845,452 B2 12/2010 Bennet et al.
7,963,358 B2 6/2011 Buell et al.
7,975,792 B2 7/2011 Nobuhira
7,985,271 B2 7/2011 Nobuhira
8,006,798 B2 8/2011 Portelance
8,151,754 B2 4/2012 Matsuda et al.
8,157,039 B2 * 4/2012 Melvin .................. B60K 11/08 180/68.1
8,439,019 B1 * 5/2013 Carlson ..................... F16H 7/20 123/559.1
8,517,136 B2 * 8/2013 Hurd .................... B60K 5/1241 180/233
8,613,336 B2 * 12/2013 Deckard ............. F16H 57/0416 180/68.3
8,695,746 B2 4/2014 Holroyd et al.
8,827,020 B2 * 9/2014 Deckard ............. F16H 57/0416 180/68.1
8,863,876 B2 10/2014 Tsutsui et al.
8,936,123 B2 1/2015 Kogo et al.
8,944,197 B2 2/2015 Matsushima et al.
9,217,501 B2 * 12/2015 Deckard ............. F16H 57/0416
9,296,445 B2 3/2016 Kontani
9,327,587 B2 * 5/2016 Spindler .............. B62D 23/005
9,347,406 B2 5/2016 Abe et al.
9,347,408 B2 5/2016 Kontani et al.
9,518,504 B2 12/2016 Tanaka
9,566,858 B2 * 2/2017 Hicke .................... B60K 11/04
9,567,952 B2 2/2017 Nishimura et al.
9,580,142 B2 2/2017 Sasaki
9,587,600 B2 3/2017 Tsubone
9,638,149 B2 5/2017 Naruoka et al.
9,651,005 B2 5/2017 Naruoka et al.
9,669,704 B2 6/2017 Nakayama et al.
9,694,872 B2 * 7/2017 Laroche ................. B62K 5/027
9,713,976 B2 * 7/2017 Miller ....................... B60P 1/04
9,718,351 B2 * 8/2017 Ripley ................... B60K 17/08
9,725,023 B2 * 8/2017 Miller ....................... B60P 1/04
9,764,767 B2 * 9/2017 Proulx ..................... B60N 2/24
9,776,481 B2 * 10/2017 Deckard ............. B62D 21/183
9,850,863 B2 12/2017 Naruoka et al.
9,889,777 B2 * 2/2018 Proulx ................... B60N 2/305
9,932,073 B2 * 4/2018 Dube ................... B60K 15/063
9,944,177 B2 * 4/2018 Fischer .................... B60K 5/02
10,017,090 B2 * 7/2018 Franker ..................... B60P 1/04
10,124,709 B2 * 11/2018 Bohnsack ................ B60P 1/04
10,183,605 B2 * 1/2019 Weber ....................... B60P 1/04
10,207,555 B2 * 2/2019 Mailhot ............... B62D 23/005
10,300,786 B2 * 5/2019 Nugteren ............... B60K 13/04
10,315,510 B2 * 6/2019 Toupin ................ F16H 57/0475
2005/0126842 A1 6/2005 Rasidescu et al.
2005/0279552 A1 * 12/2005 Schuehmacher ...... B62M 27/02 180/190
2007/0251745 A1 11/2007 Codere et al.
2010/0155170 A1 * 6/2010 Melvin .................. B60K 11/08 180/339
2011/0240394 A1 * 10/2011 Hurd .................... B60K 5/1241 180/233
2011/0240395 A1 * 10/2011 Hurd .................... B60K 5/1241 180/291
2013/0319785 A1 * 12/2013 Spindler ............. B62D 23/005 180/292
2014/0131131 A1 5/2014 Marois et al.
2014/0202782 A1 7/2014 Tsukui
2014/0374179 A1 * 12/2014 Deckard ................ B60K 17/08 180/68.3
2015/0259011 A1 * 9/2015 Deckard ............. B62D 21/183 280/781
2016/0061162 A1 3/2016 Watanabe et al.
2016/0061163 A1 3/2016 Watanabe et al.
2016/0069306 A1 3/2016 Soeda et al.
2016/0176283 A1 * 6/2016 Hicke .................... B60K 11/04 180/292
2016/0176284 A1 * 6/2016 Nugteren ............... B60K 13/04 180/309
2016/0176287 A1 * 6/2016 Ripley ................... B60K 17/08 180/365
2016/0221636 A1 * 8/2016 Laroche ................. B62K 5/027
2016/0258395 A1 9/2016 Ishii et al.
2016/0332495 A1 * 11/2016 Franker ..................... B60P 1/04
2016/0332519 A1 * 11/2016 Bohnsack ................ B60P 1/04
2016/0332536 A1 * 11/2016 Weber ....................... B60P 1/04
2016/0332553 A1 * 11/2016 Miller ....................... B60P 1/04
2016/0332676 A1 * 11/2016 Miller ....................... B60P 1/04
2016/0375757 A1 * 12/2016 Danielson ................ B60K 5/02 180/68.1
2017/0015382 A1 1/2017 Takakuwa et al.
2017/0028881 A1 * 2/2017 Proulx ................... B60N 2/305
2017/0029035 A1 * 2/2017 Dube ................... B60K 15/063
2017/0029036 A1 * 2/2017 Proulx ..................... B60N 2/24
2017/0089307 A1 3/2017 Arai et al.
2017/0114731 A1 4/2017 Ichi et al.
2017/0166255 A1 * 6/2017 Peterson ................. B60R 21/13
2017/0174027 A1 * 6/2017 Mailhot ............... B62D 23/005
2017/0246952 A1 * 8/2017 Danielson ................ B60K 5/02
2017/0349227 A1 * 12/2017 Spindler .............. B62D 23/005
2018/0222311 A1 * 8/2018 Toupin ................ F16H 57/0475
2019/0023123 A1 * 1/2019 Laberge ................. B60K 13/02
2019/0039668 A1 * 2/2019 Laberge ................... B60K 5/02
2019/0047652 A1 * 2/2019 Laberge ................... B62M 9/06
2019/0071141 A1 * 3/2019 Spindler .............. B62D 23/005
2019/0078679 A1 * 3/2019 Leclair ................ F16H 57/0416
2019/0118883 A1 * 4/2019 Spindler .............. B62D 23/005

(56) References Cited

U.S. PATENT DOCUMENTS

| | | | | |
|---|---|---|---|---|
| 2019/0118884 | A1* | 4/2019 | Spindler | B62D 23/005 |
| 2019/0120366 | A1* | 4/2019 | Leclair | F16H 57/0416 |
| 2019/0143871 | A1* | 5/2019 | Weber | B60P 1/04 |

OTHER PUBLICATIONS

International Search Report of PCT/IB2017/050494; dated May 9, 2017; Shane Thomas.

* cited by examiner

VEHICLE HAVING DUAL AIR INTAKE SYSTEMS

CROSS-REFERENCE

The present application claims priority to U.S. Provisional Patent Application No. 62/664,639 filed on Apr. 30, 2018, and is a continuation-in-part of International Patent Application No. PCT/IB2017/050492 filed on Jan. 30, 2017 which claims priority to U.S. Provisional Patent Application No. 62/289,155 filed on Jan. 29, 2016, the entirety of each of which is incorporated herein by reference.

FIELD OF TECHNOLOGY

The present technology relates to vehicles having dual air intake systems.

BACKGROUND

Vehicles that include an internal combustion engine and a continuously variable transmission (CVT) typically require air flow to both the engine and the CVT. Notably, the engine requires air for performing combustion of fuel, while the CVT requires air for cooling its components (e.g., a fiber-reinforced rubber belt). However, providing an air intake system for each of the engine and the CVT can be challenging given the usually limited space available for such air intake systems, particularly in on-road straddle seat vehicles. Moreover, engines with higher power require an increased volumetric flow rate of air both for combustion and CVT cooling and thus efficient air intake systems for the engine and the CVT are desirable.

There is thus a need for a vehicle with efficient yet compact engine and CVT air intake systems.

SUMMARY

It is an object of the present technology to ameliorate at least some of the inconveniences mentioned above.

In accordance with one aspect of the present technology, there is provided a vehicle including a frame, a plurality of ground-engaging members, a steering assembly operatively connected to at least one ground-engaging member of the plurality of ground-engaging members for steering the vehicle, an internal combustion engine supported by the frame, and a continuously variable transmission (CVT) operatively connecting the engine to at least one of the plurality of ground-engaging members. The engine defines an engine air inlet for receiving air therein. The CVT defines a cooling air inlet for receiving air therein. The vehicle also includes an engine air intake system fluidly communicating with the engine air inlet for providing air to the engine, and a CVT air intake system fluidly communicating with the cooling air inlet for providing air to the CVT. The engine air intake system includes a first air inlet facing generally forwardly, and a first rearwardly-extending conduit portion extending rearwardly from the first air inlet located on a first lateral side of a longitudinal centerplane of the vehicle and fluidly communicating with the engine air inlet. The CVT air intake system includes a second air inlet facing generally forwardly, and a second rearwardly-extending conduit portion extending rearwardly from the second air inlet located on a second lateral side of the longitudinal centerplane of the vehicle and fluidly communicating with the cooling air inlet. The engine is disposed at least in part laterally between the first and second rearwardly-extending conduit portions.

In some implementations, the first air inlet and the second air inlet are disposed on opposite lateral sides of the engine.

In some implementations, the engine air intake system also includes a first transversely-extending conduit portion fluidly communicating the first rearwardly-extending conduit portion to the engine air inlet and extending laterally across the longitudinal centerplane.

In some implementations, the first transversely-extending conduit portion is located in front of the CVT.

In some implementations, the engine air intake system also includes a throttle body fluidly communicating the first transversely-extending conduit portion to the engine air inlet.

In some implementations, the throttle body and the engine air inlet are located on the second lateral side of the longitudinal centerplane.

In some implementations, the engine air intake system also includes an air filter.

In some implementations, the air filter is disposed between the first rearwardly-extending conduit portion and the engine air inlet.

In some implementations, at least one of the first and second rearwardly-extending conduit portions is openable for providing access to an engine component.

In some implementations, the first rearwardly-extending conduit portion is removable for providing access to the air filter.

In some implementations, the first rearwardly-extending conduit portion comprises a Helmholtz resonator.

In some implementations, the first transversely-extending conduit portion comprises a Helmholtz resonator.

In some implementations, the CVT includes a primary pulley operatively connected to the engine, a secondary pulley, a belt interconnecting the primary pulley to the secondary pulley, and a housing for enclosing the primary pulley, the secondary pulley and the belt therein. The housing defines the cooling air inlet. The housing defines an air outlet located on an opposite lateral side of the longitudinal centerplane than the cooling air inlet.

In some implementations, the CVT air intake system also includes a second transversely-extending conduit portion fluidly communicating the second rearwardly-extending conduit portion to the cooling air inlet and extending, laterally towards the longitudinal centerplane from the second rearwardly-extending conduit portion.

In some implementations, the second transversely-extending conduit portion extends downwardly and laterally inwardly toward the cooling air inlet.

In some implementations, the engine air intake system also includes a plenum fluidly communicating the throttle body to the engine air inlet.

In some implementations, the vehicle also includes a straddle seat. The first and second air inlets are located forwardly of the straddle seat.

In some implementations, the steering assembly includes a handlebar for steering the vehicle. The first and second air inlets are positioned forwardly of the handlebar.

In some implementations, the vehicle also includes first and second footrests located on either lateral side of the vehicle for resting a driver's feet. The first and second air inlets are positioned forwardly of and vertically higher than the footrests.

In some implementations, the plurality of ground-engaging members includes two front ground-engaging members. The vehicle also includes front suspension assemblies connecting the front ground-engaging members to the frame.

The first and second air inlets are positioned rearwardly of the front suspension assemblies.

In some implementations, the plurality of ground-engaging members is a plurality of wheels. The plurality of wheels includes a single rear wheel.

In some implementations, the second rearwardly-extending conduit portion is pivotable for providing access to an oil dipstick of the engine.

For the purpose of this application, terms related to spatial orientation such as downwardly, rearward, forward, front, rear, left, right, above and below are as they would normally be understood by a driver of the vehicle sitting thereon in an upright position with the vehicle in a straight ahead orientation (i.e. not steered left or right), and in an upright position (i.e. not tilted).

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1A:
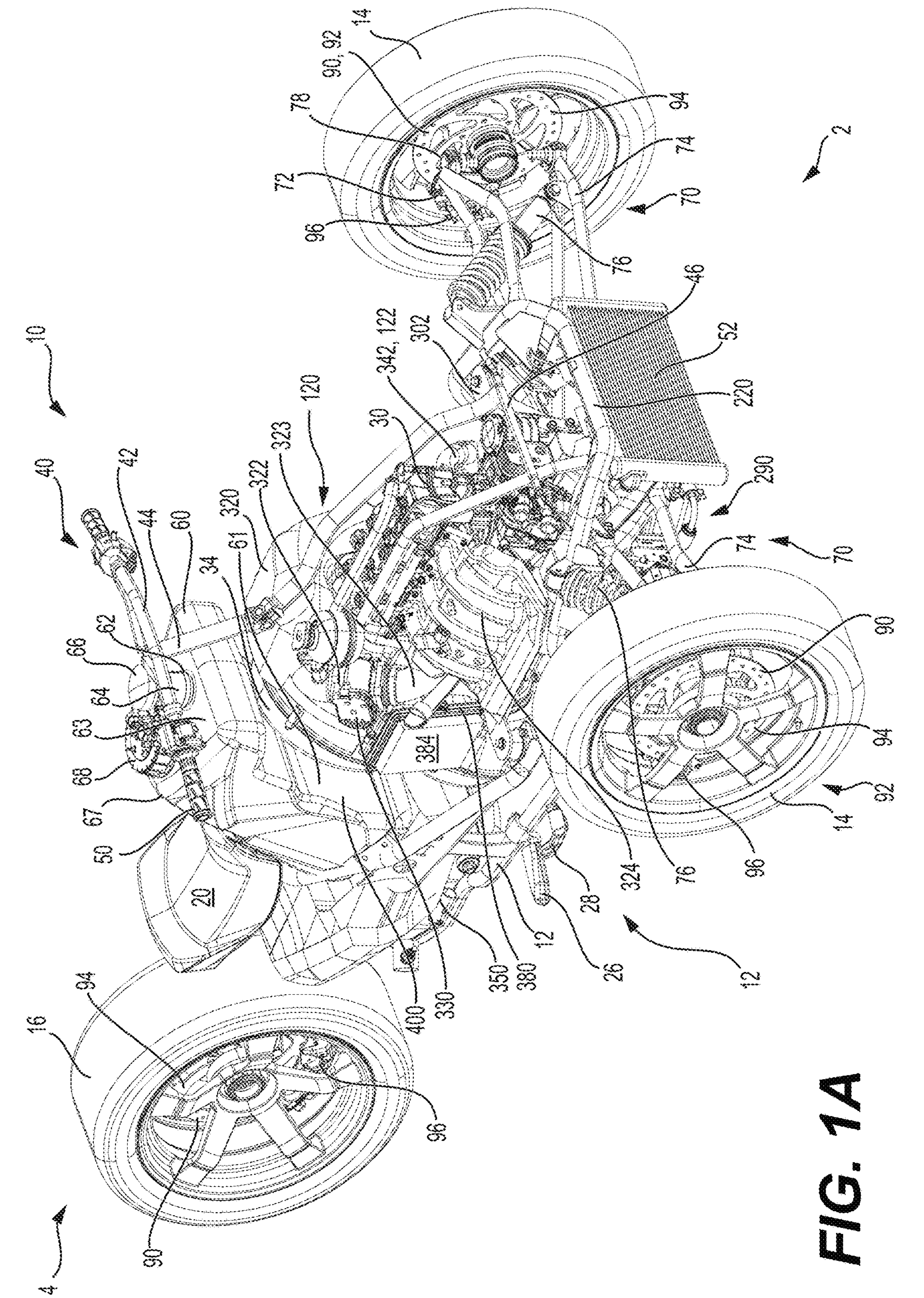
FIG. 1A is a perspective view, taken from a front, top and right side, of a three-wheeled straddle-seat vehicle in accordance with one implementation of the present technology with the fairings thereof being removed for clarity.

The present technology is being described with respect to a three-wheeled straddle-type vehicle 10.

General Description

With reference to FIGS. 1A to 1H, a vehicle 10 has a front end 2 and a rear end 4 defined consistently with the forward travel direction of the vehicle 10. The vehicle 10 has a frame 12 defining a longitudinal centerplane 3 (FIGS. 1D to 1G).

The vehicle 10 is a three-wheeled vehicle 10 including a left front wheel 14 mounted to the frame 12 by a left front suspension assembly 70, a right front wheel 14 mounted to the frame 12 by a right front suspension assembly 70, and a single rear wheel 16 mounted to the frame 12 by a rear suspension assembly 80. The left and right front wheels 14 and the rear wheel 16 each have a tire secured thereto. It is contemplated that both front wheels 14 and/or the rear wheel 16 could have more than one tire secured thereto. The front wheels 14 are disposed equidistant from the longitudinal centerplane 3, and the rear wheel 16 is centered with respect to the longitudinal centerplane 3. The front wheels 14 each rotate about a corresponding rotation axis 14*a*. The rear wheel 16 rotates about a rotation axis 16*a*. In the illustrated implementation of the vehicle 10, each of the rotation axes 14*a*, 16*a* of the wheels 14, 16 is disposed horizontally. When the vehicle 10 is placed on level ground and without a driver, passenger, and/or any cargo loaded thereon, the rotation axes 14*a*, 16*a* of the wheels 14, 16, are all contained in a common plane 15 extending generally horizontally, referred to hereinafter as a rotation plane 15 (FIG. 1B, 1C). It is contemplated that each of the rotation axes 14*a* of the front wheels 14 could be disposed at an angle with respect to the horizontal, and therefore not disposed in the common generally horizontal plane 15. It is contemplated that the rotation axis 16*a* of the rear wheel 16 could be vertically higher than the axes of rotation 14*a* of the front wheels 14. In this case, the rotation plane 15 is defined as a plane perpendicular to the longitudinal centerplane 3 and passing through the centers of the wheels 14, 16. A front wheel plane 18 is defined as a plane extending normal to the longitudinal centerplane 3 and being disposed tangentially to the rear edges of the left and right front wheels 14 when the vehicle 10 is steered straight ahead.

In the illustrated implementation, each front suspension assembly 70 is a double A-arm type suspension, also known as a double wishbone suspension. It is contemplated that other types of suspensions, such as a McPherson strut suspension, or swing arm could be used. Each front suspension assembly 70 includes an upper A-arm 72, a lower A-arm 74 and a shock absorber 76. The right front suspension assembly 70 is a mirror image of the left front suspension assembly 70, and as such only the left front suspension assembly 70 will be described herein. Each A-arm 72, 74 has a front member and a rear member. The laterally outer ends of the front and rear members are connected to each other while the laterally inner ends of the front and rear members of each A-arm 72, 74 are spaced apart from each other. The lower end of the shock absorber 76 is connected to the front and rear members of the lower A-arm 74 slightly laterally inward of the laterally outer ends. The laterally inner ends of the upper and lower A-arms 72, 74 are pivotally connected to the frame 12 as will be described below. The laterally outer ends of the upper and lower A-arms 72, 74 are pivotally connected to the top and bottom respectively of a spindle 78 (FIG. 2A) as can be seen best in FIGS. 1A and 2A. The spindle 78 also defines a steering arm 79 which extends rearwardly and laterally inwardly from the top of the spindle 78. The spindle 78 pivots, relative to the A-arms 72, 74, about a steering axis extending generally vertically. The front wheel 14 is connected to a hub 71 (FIG. 2A) that is connected to the spindle 78 such that the hub 71 and the corresponding front wheel 14 can rotate about the generally vertical steering axis. A sway bar 86 is connected to the front members of both lower A-arms 74 to reduce motion of one of the left and right front wheels 14 with respect to the other of the left and right front wheels 14, and to thereby reduce rolling motion of the vehicle 10.

The rear suspension assembly 80 includes a swing arm 82 and a shock absorber 84. The swing arm 82 is pivotally mounted at a front thereof to the frame 12. The rear wheel 16 is rotatably mounted to the rear end of the swing arm 82 which extends on a left side of the rear wheel 16. The shock absorber 84 is connected between the swing arm 82 and the frame 12.

The vehicle 10 is a straddle-type vehicle having a straddle seat 20 mounted to the frame 12 and disposed along the longitudinal centerplane 3. The straddle seat is disposed longitudinally forward of the rear wheel 16. In the illustrated implementation, the straddle seat 20 is intended to accommodate a single adult-sized rider, i.e. the driver. It is however contemplated that the straddle seat 20 could be configured to accommodate more than one adult-sized rider (the driver and one or more passengers). A driver footrest 26 is disposed on either side of the vehicle 10 and vertically lower than the straddle seat 20 to support the driver's feet. In the implementation of the vehicle 10 illustrated herein, the driver footrests 26 are in the form of foot pegs disposed longitudinally forward of the straddle seat 20. It is also contemplated that the footrests 26 could be in the form of footboards. It is contemplated that the vehicle 10 could also be provided with one or more passenger footrests disposed rearward of the driver footrest 26 on each side of the vehicle 10, for supporting a passenger's feet when the seat 20 is configured to accommodate one or more passengers in addition to the driver. A brake operator 28, in the form of a foot-operated brake pedal, is connected to the right driver footrest 26 for braking the vehicle 10. The brake operator 28 extends upwardly and forwardly from the right driver footrest 26 such that the driver can actuate the brake operator 28 with a front portion of the right foot while a rear portion of the right foot remains on the right driver footrest 26.

A handlebar 42, which is part of a steering assembly 40, is disposed in front of the seat 20. The handlebar 42 is used by the driver to turn the front wheels 14 to steer the vehicle 10. A central portion of the handlebar 42 is connected to an upper end of a steering column 44. From the handlebar 42, the steering column 44 extends downwardly and leftwardly. A lower end of the steering column 44 is connected to a left pitman arm 46 and a right pitman arm 46. A left steering rod 48 connects the left pitman arm 46 to the steering arm 79 of the left suspension assembly 70 and a right steering rod 48 connects the right pitman arm 46 to the steering arm 79 of the right suspension assembly 70 such that turning the handlebar 42 turns the steering column 44 which, through the pitman arm 46 and the steering rods 48, turns the wheels 14. In the illustrated implementation of the vehicle 10, the steering assembly 40 includes a power steering unit (not shown) to facilitate steering of the vehicle 10. It is contemplated that the power steering unit could be omitted.

A left hand grip is placed around the left side of the handlebar 42 near the left end thereof and a right hand grip is placed respectively right sides of the handlebar 42 near the right end to facilitate gripping for turning the handlebar 42 and thereby steering the vehicle 10. In the illustrated implementation, the right hand grip is a throttle operator 50, in the form of a rotatable hand grip, which can be rotated by the driver to control power delivered by the engine 30. It is contemplated that the throttle operator could be in the form of a thumb-operated or finger-operated lever and/or that the throttle operator 50 could be connected near the right end of the handlebar 42. The handlebar 42 has connected thereto various controls such as an engine start-up button and an engine cut-off switch located laterally inwardly of the left and right grips.

The frame 12 supports and houses a motor 30 located forwardly of the straddle seat 20. In the illustrated implementation of the vehicle 10, the motor 30 is in the form of an internal combustion engine. It is however contemplated that the motor 30 could be other than an internal combustion engine. For example, the motor 30 could be an electric motor, a hybrid or the like. The motor 30 will be referred to hereinafter as engine 30 for convenience. In the illustrated implementation of FIG. 1, the engine 30 is an inline three-cylinder four-stroke internal combustion engine. Another implementation of a vehicle 10' having an inline two-cylinder four-stroke internal combustion engine will be discussed later. It is contemplated that other types of internal combustion engines could be used. The engine 30 has a crankshaft 31 (FIGS. 5C and 5D) which rotates about a crankshaft axis 31*a* (FIGS. 5C and 5D) disposed generally longitudinally and horizontally.

The engine 30 is operatively connected to the rear wheel 16 to drive the rear wheel 16. The rear wheel 16 is operatively connected to the crankshaft 31 of the engine 30 via an engine output shaft 32 (FIGS. 5C and 5D), a continuously variable transmission (CVT) 34, a transfer case 36 and a driveshaft 38. It is contemplated that the engine 30 could be connected to the front wheels 14 instead of, or in addition to, the rear wheel 16. The engine 30, engine output shaft 32, continuously variable transmission (CVT) 34, transfer case 36 and driveshaft 38 form part of a vehicle powertrain 100 which will be described below in further detail. As can be seen, the transfer case 36 is disposed rearward of the engine 30, and the CVT 34 is disposed rearward of the transfer case 36. The CVT 34 and the transfer case 36 form a transmission assembly 400 of the vehicle 10. It is contemplated that the vehicle 10 could have a transmission assembly 400 in which the CVT 34 and the transfer case 36 are replaced by a discrete gear transmission.

As can be seen in FIGS. 1A to 1E, a fuel tank 60 disposed behind the CVT 34 supplies fuel to the engine 30. The fuel tank 60 is disposed longitudinally rearward of the CVT 34 and overlapping therewith in the lateral and vertical directions. The straddle seat 20 is disposed behind the fuel tank 60. The straddle seat 20 is disposed longitudinally rearward of the fuel tank 60 and overlapping therewith in the lateral and vertical directions. The fuel tank 60 is mounted rearward of the CVT 34 and spaced therefrom. A front wall 61 of the fuel tank 60 extends rearwardly of the CVT 34 and is formed so as to be congruous with a rear cover 156 thereof. An upper portion of the front wall 61 extends forwardly above the CVT 34 and then upwardly above the CVT 34 to an upper wall 63 of the fuel tank 60. The upper wall 63 of the fuel tank 60 extends rearwardly and generally horizontally. The fill opening 62 of the fuel tank 60 is formed in the upper wall 63 and disposed above the CVT 34. A filler neck 64 extends upwardly from the fill opening 62 and is covered by a cap 66. The fuel pump 68 is mounted to the upper wall 63 of the fuel tank 60 rearward of the filler neck 64 and forward of a rear surface 67 of the fuel tank 60. The straddle seat 20 is disposed rearwardly of the fuel tank 60 in contact with the rear wall 67 thereof. The rear wall 67 slopes rearwardly and downwardly from the upper wall 63 thereof to the straddle seat 20, and then gently forwardly and downwardly below the straddle seat 20.

A radiator 52 is mounted to the vehicle frame 12 and disposed in front of the engine 30. The radiator 52 is disposed longitudinally forward of the engine 30 and overlapping therewith in the lateral and vertical directions. The radiator 52 is fluidly connected to the engine 30 for cooling the engine 30. The radiator 52 is disposed longitudinally forward of the front suspension assemblies 70, 80. The radiator 52 is disposed between the front left and right suspension assemblies 70, 80 in the lateral directions. The front left and right suspension assemblies 70, 80 extend vertically higher than the radiator 52.

Figure 1B:
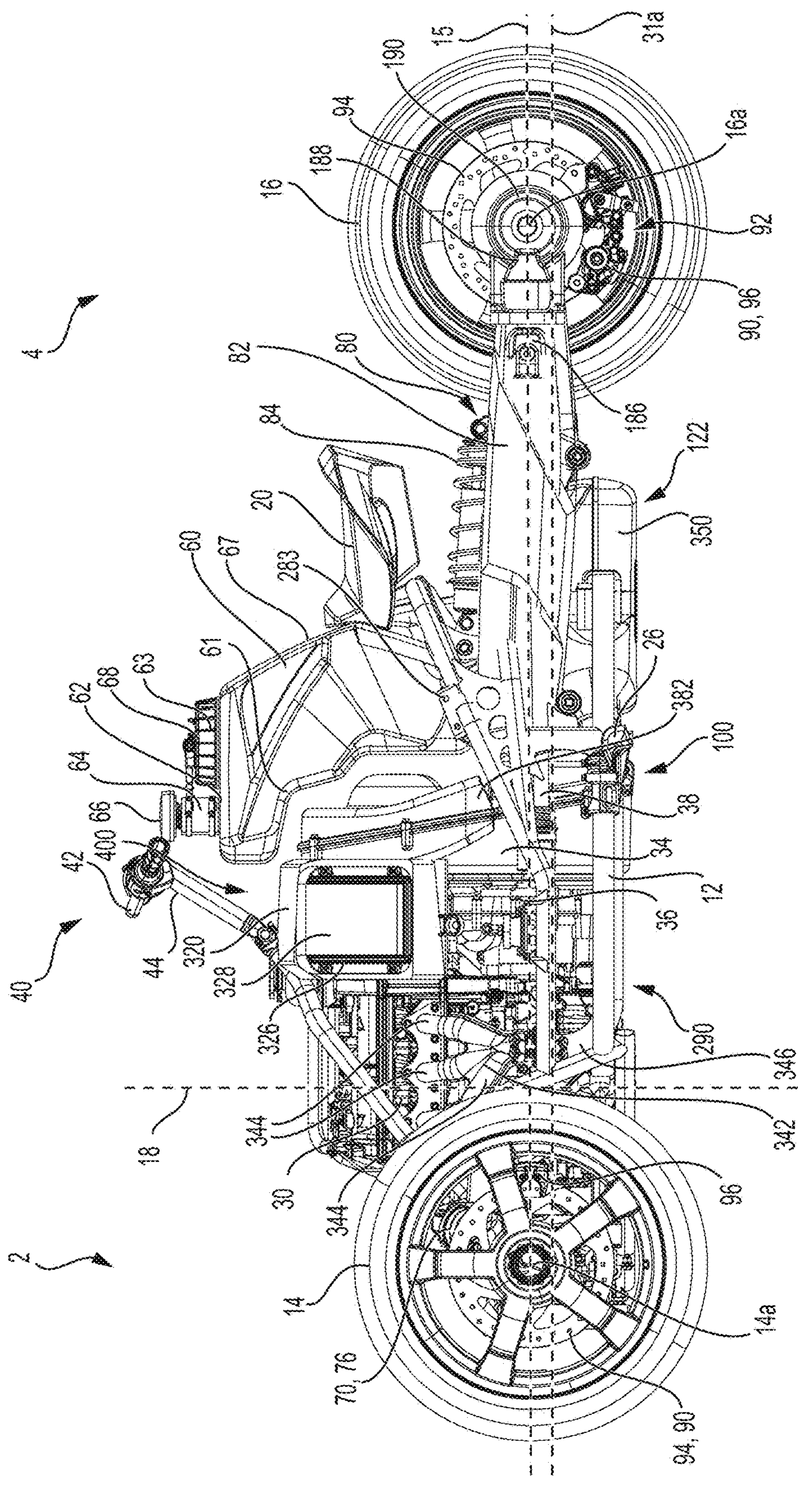
FIG. 1B is a left side elevation view of the vehicle of FIG. 1A.
Figure 1C:
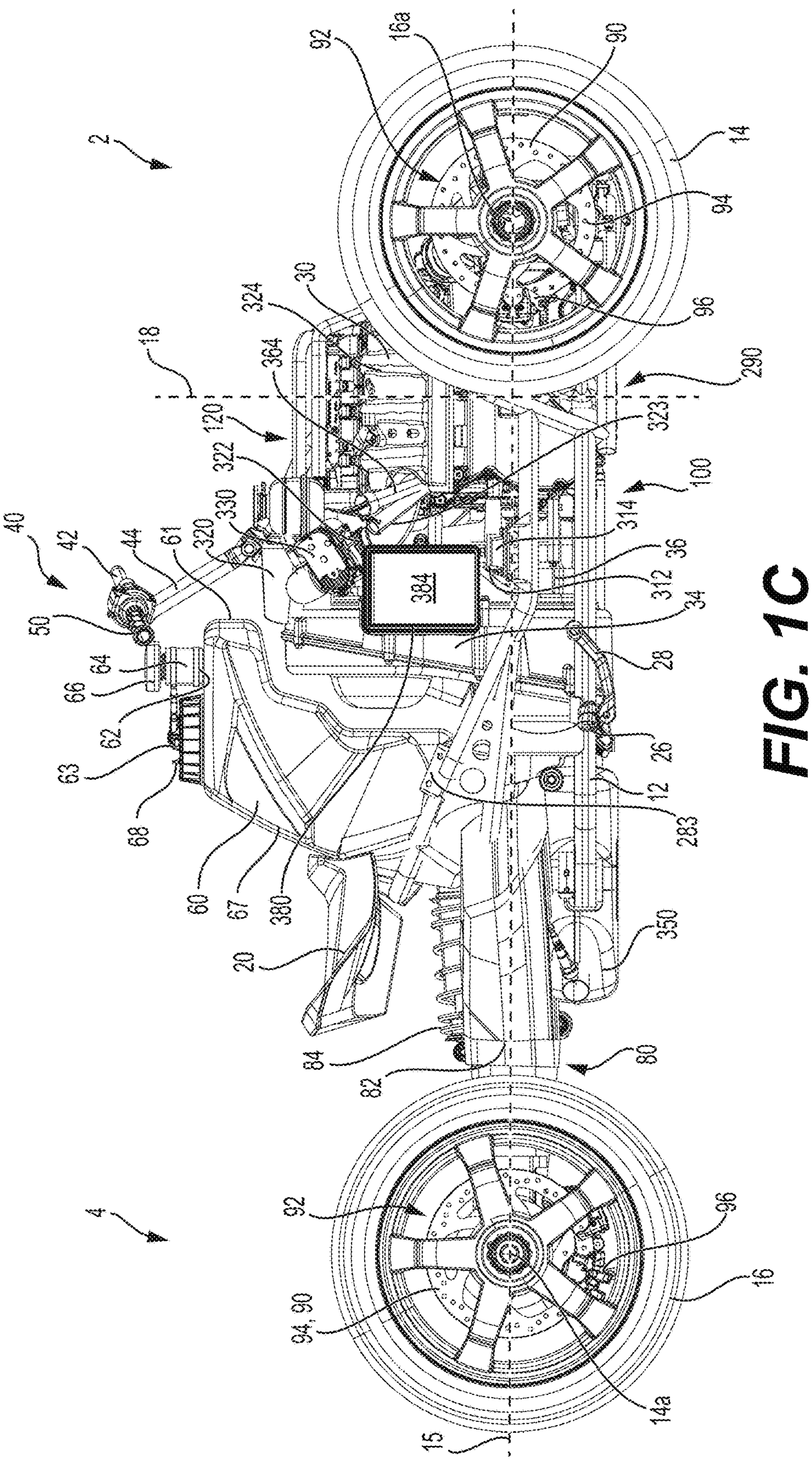
FIG. 1C is a right side elevation view of the vehicle of FIG. 1A.
Figure 1D:
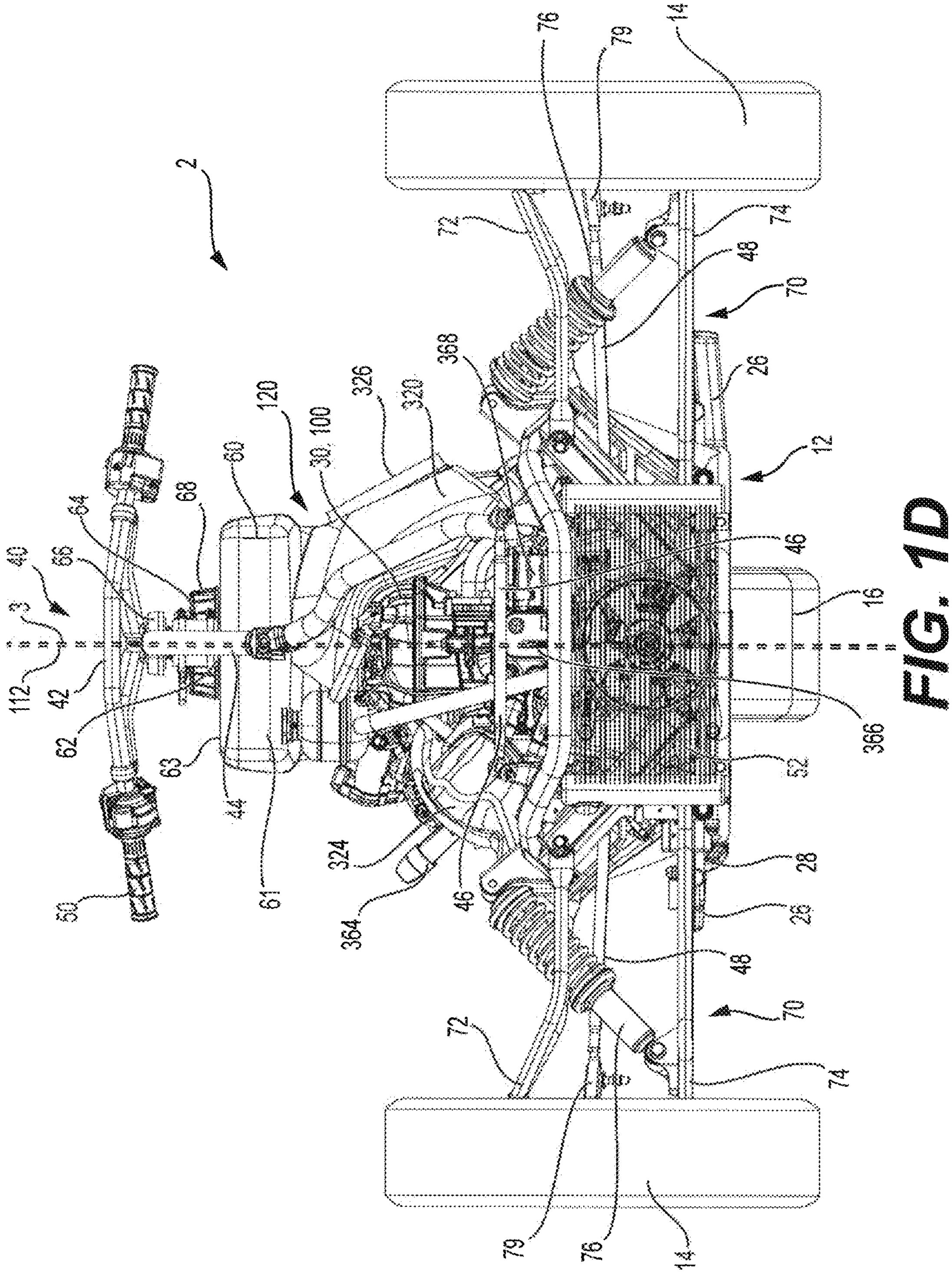
FIG. 1D is a front elevation view of the vehicle of FIG. 1A.
Figure 2A:
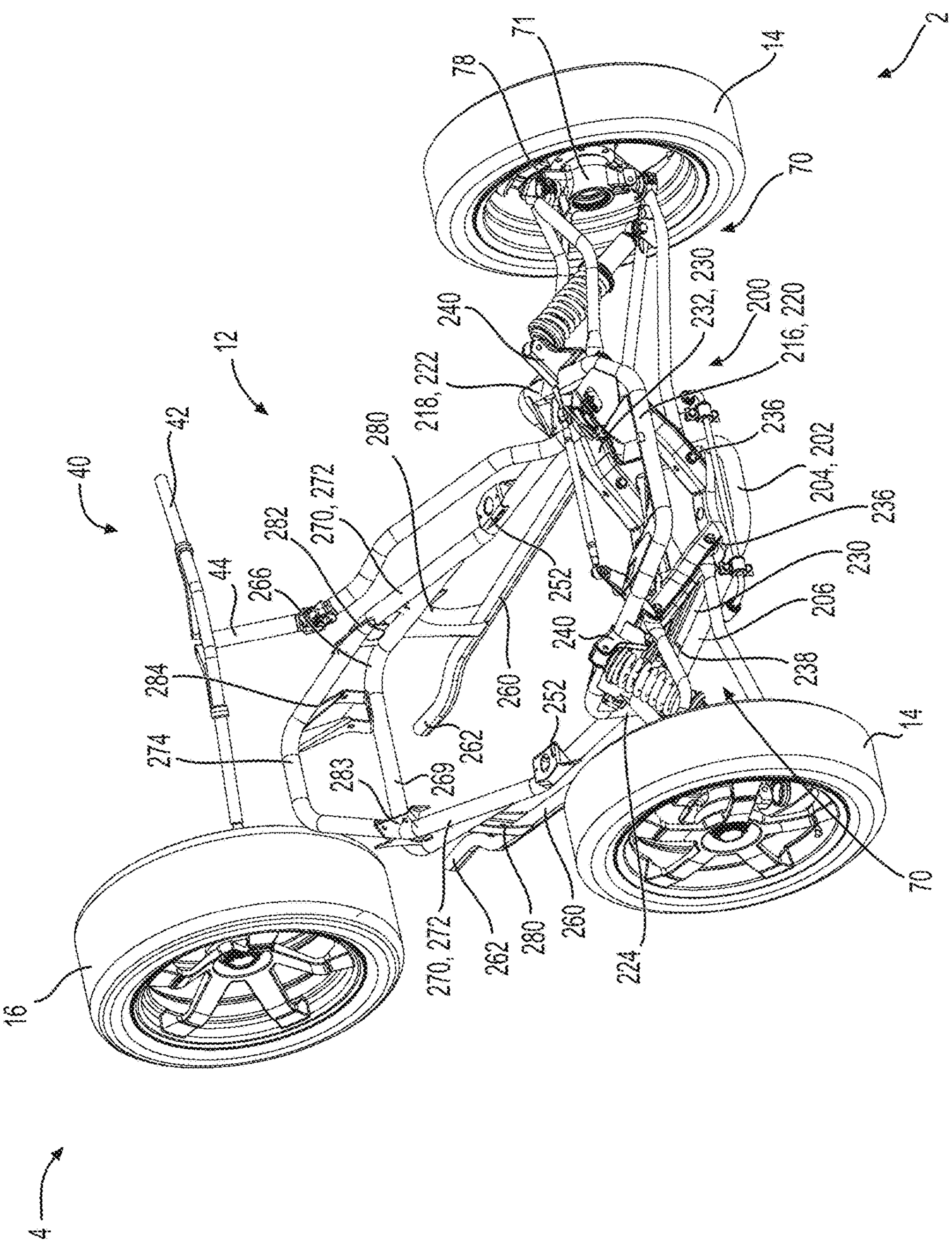
FIG. 2A is a perspective view, taken from a front, top and right side, of the vehicle frame, front and rear wheels, front suspension assemblies, and steering assembly of the vehicle of FIG. 1A.
Figure 2B:
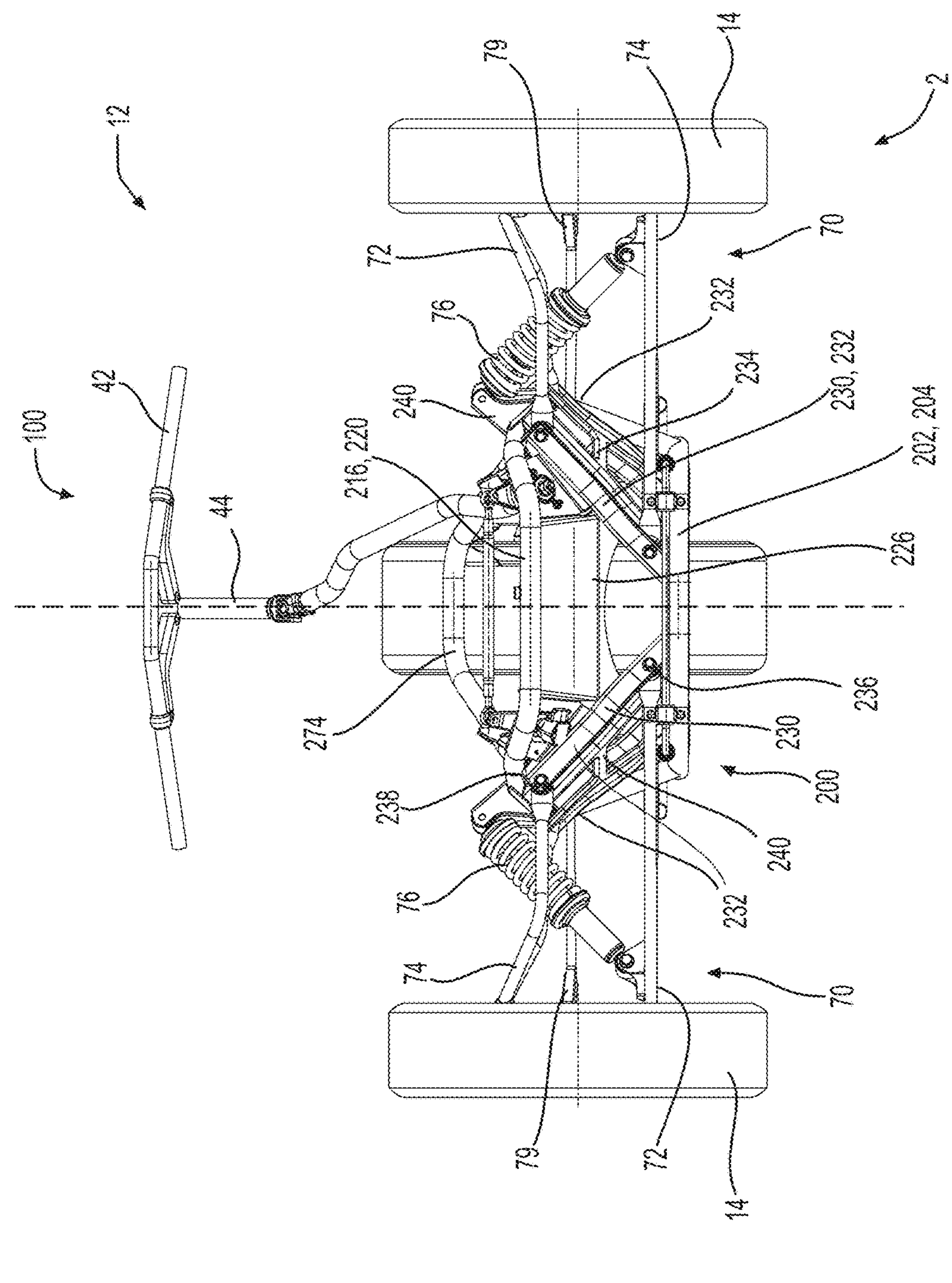
FIG. 2B is a front plan view of the vehicle frame, front and rear wheels, front suspension assemblies, and steering assembly of FIG. 2A.

With reference to FIGS. 1A to 1C, each of the two front wheels 14 and the rear wheel 16 is provided with a brake 90. The brakes 90 of the three wheels 14, 16 form a brake assembly 92. Each brake 90 is a disc-type brake mounted onto a hub of the respective wheel 14 or 16. Other types of brakes are contemplated. Each brake 90 includes a rotor 94 mounted onto the wheel hub and a stationary caliper 96 straddling the rotor 94. The brake pads (not shown) are mounted to the caliper 96 so as to be disposed between the rotor 94 and the caliper 96 on either side of the rotor 45*a*. The foot-operated brake operator 28 is operatively connected to the brakes 90 provided on each of the two front wheels 14 and the rear wheel 16. It is contemplated that the brake operator 28 could be in the form of a hand-operated brake lever connected to the handlebar 42 instead of the foot-operated brake pedal as shown herein. It is contemplated that the brake assembly 92 could be connected to a hand-operated brake lever mounted to the handlebar 42 in addition to the foot-operated brake pedal 28 mounted to the right footrest 26. The brake operator 28 is connected to a hydraulic cylinder (not shown) which is hydraulically connected to a hydraulic piston (not shown) of each brake caliper 96 via brake lines (not shown). When the brake operator 28 is actuated by the driver, hydraulic pressure is applied to the hydraulic cylinder and thereby to the piston of each caliper 96, causing the brake pads to squeeze their respective rotors 94 which, through friction, brakes the wheels 14 and 16. The hydraulic cylinder is also connected to a hydraulic reservoir (not shown) which ensures that adequate pressure is maintained in the brake lines and the hydraulic cylinder. The vehicle 10 also includes a vehicle stability system (not shown) operable to, inter alia, actuate each brake 90 individually in order to improve handling and stability. The vehicle stability system includes a hydraulic pump in fluidic connection with the hydraulic cylinder and each brake caliper 96. The vehicle stability system further includes an on-board computer that controls operation of the hydraulic pump in response to signals received from sensors such as a longitudinal acceleration sensor, a lateral acceleration sensor, a yaw rate sensor, an engine speed sensor or a wheel speed sensor. Examples of such a vehicle stability system are described in U.S. Pat. Nos. 8,086,382, 8,655,565 and 9,043,111, the entirety of which are incorporated herein by reference.

Although not shown, the vehicle 10 includes fairings which are connected to the frame 12 to enclose and protect the internal components of the vehicle 10 such as the engine 30. The fairings include a hood disposed at the front of the vehicle 10 between the front wheels 14, a rear deflector disposed over the rear wheel 16.

Frame

The vehicle frame 12 will now be described with reference to FIGS. 2A to 3D. For simplicity, all of the individual frame members of the vehicle frame 12 have been labeled only in FIGS. 2A to 3D. In the remaining figures, the frame 12 has been indicated generally but the specific labels for the individual frame members have been omitted to avoid crowding the figures.

The vehicle frame 12 includes a forward portion 200 and a rearward portion 201. The forward portion 200 includes a U-shaped lower frame member 202 formed of a tubular brace. The U-shaped frame member 202 has a central portion 204 (FIGS. 2A and 3C) extending generally laterally and horizontally. A left arm 206 (FIG. 3B) of the U-shaped frame member 202 extends rearwardly and laterally outwardly (leftwardly) from the left side of the central portion 204. A right arm 206 (FIG. 3A) of the U-shaped frame member 202 extends rearwardly and laterally outwardly (rightwardly) from the right side of the central portion 204. The left and right arms 206 of the U-shaped frame member 202 extend generally horizontally.

Figure 3A:
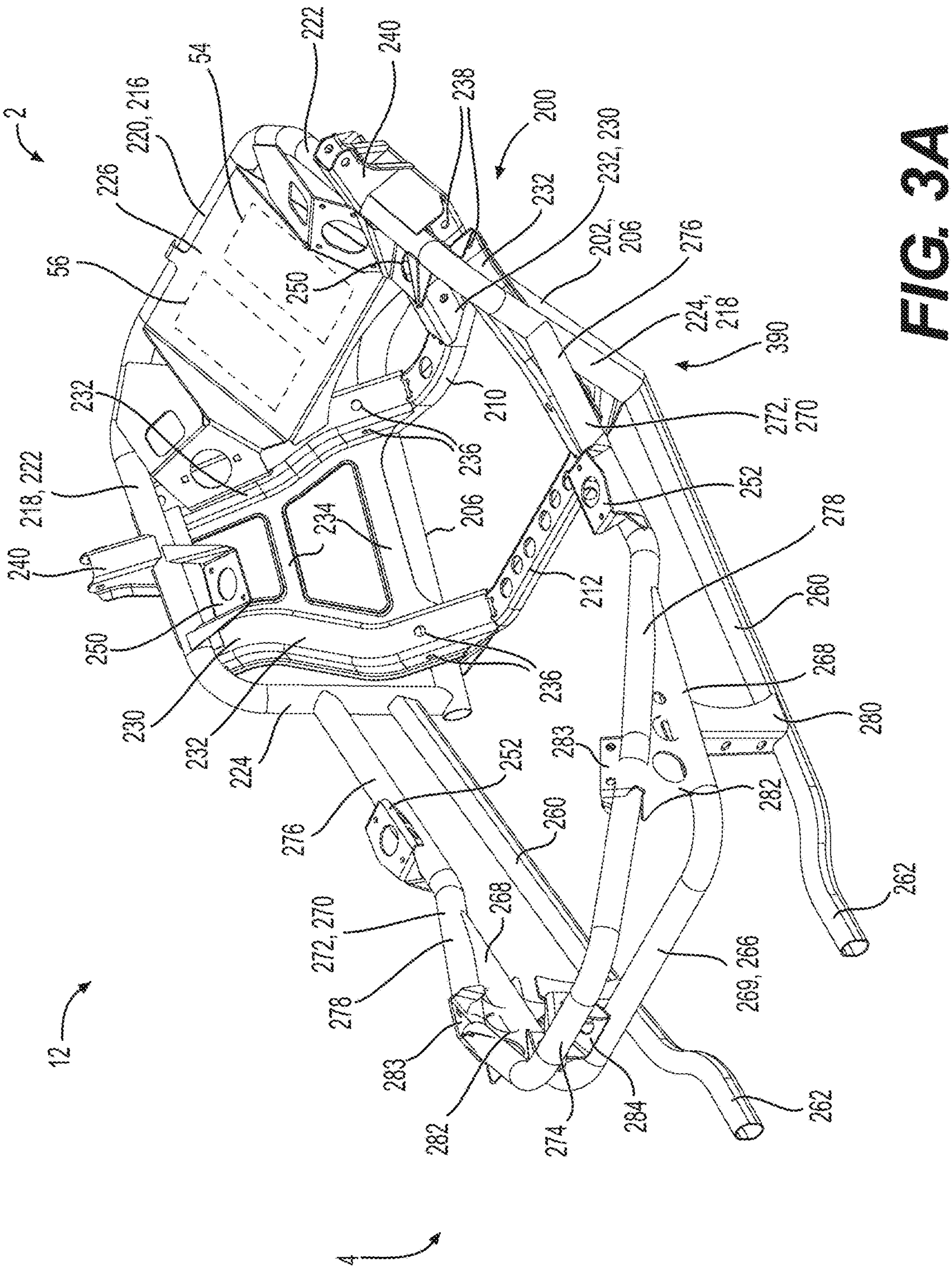
FIG. 3A is a perspective view, taken from a rear, top and right side, of the vehicle frame of FIG. 2A shown in isolation.
Figure 3B:
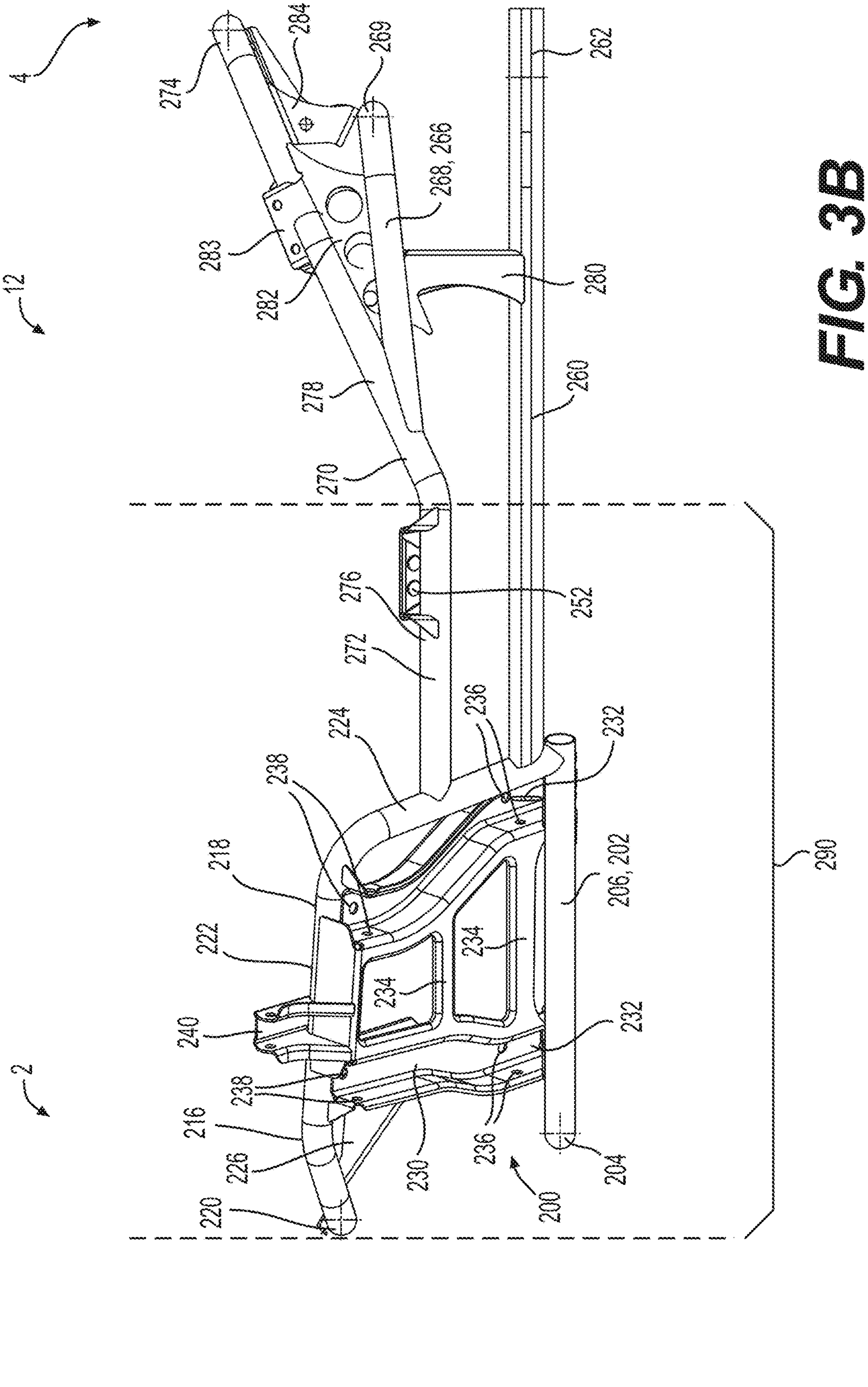
FIG. 3B is a left side elevation view of the vehicle frame of FIG. 3A.
Figure 3C:
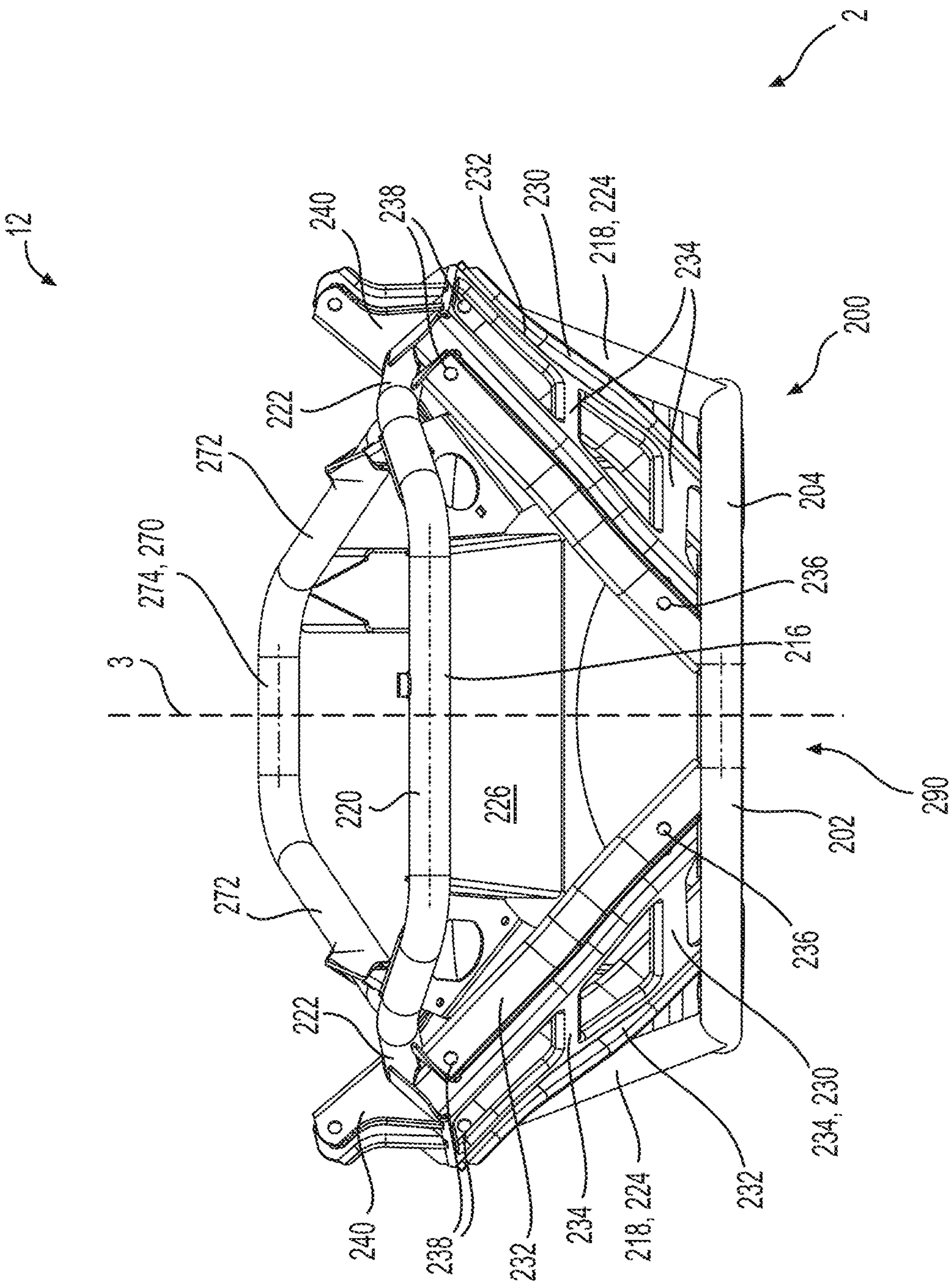
FIG. 3C is a front elevation view of the vehicle frame of FIG. 3A.
Figure 3D:
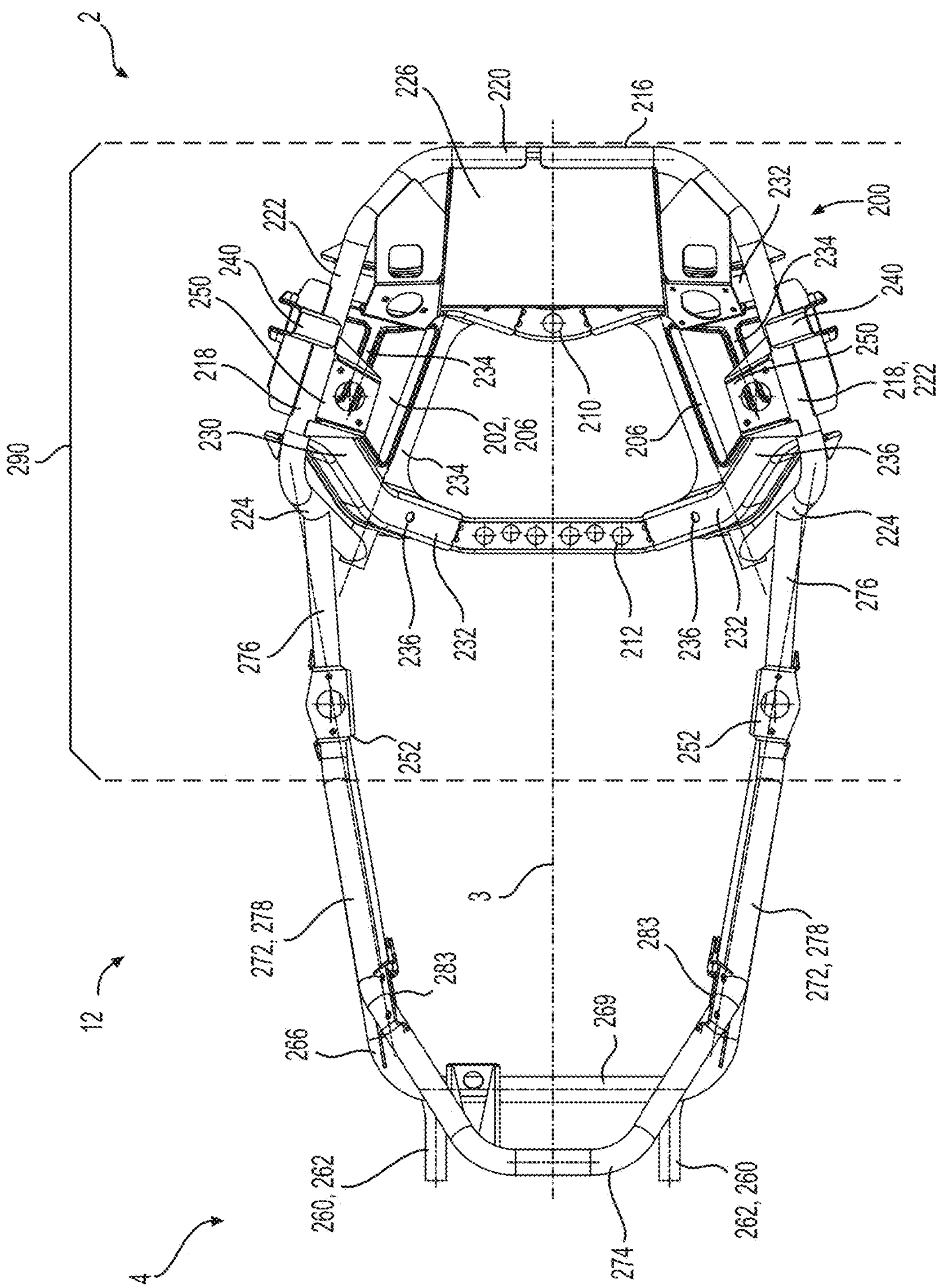
FIG. 3D is a top plan view of the vehicle frame of FIG. 3A.

As can be seen best in FIG. 3A, a front cross-member 210 and a rear cross-member 212 extend laterally between the left and right arms 206 of the U-shaped frame member 202. A left end of the front cross-member 210 is connected to the left arm 206 just rearwardly of the central portion 204 and a right end of the front cross-member 210 is connected to the right arm 206 just rearwardly of the central portion 204. The rear cross-member 212 has a left end connected to the left arm 206 near the rear end thereof and a right end connected to the right arm 206 near the rear end thereof. The cross-members 210, 212 enhance rigidity of the frame 12. The cross-members 210, 212 are made of stamped metal portions and have holes to reduce weight.

The forward portion 200 also includes an upper frame member 216 extending above the lower frame member 202. The upper frame member 216 has a left arm 218 and a right arm 218 connected together by central portion 220 extending laterally and horizontally at the front end. The left arm 218 has a horizontal portion 222 extending rearwardly and laterally outwardly from the left end of the central portion 220 to a vertical portion 224 of the left arm 218. The vertical portion 224 of the left arm 218 extends downwardly and laterally inwardly to the upper surface of left arm 206 of the lower frame member 202 near the rear end thereof. The right arm 218 has a horizontal portion 222 extending rearwardly and laterally outwardly from the right end of the central portion 220 to a vertical portion 224. The vertical portion 224 of the right arm 218 extends downwardly and laterally inwardly to the upper surface of right arm 206 of the lower frame member 202 near the rear end thereof. The lower ends of the left and right vertical portions 218 are respectively connected to the upper surfaces of the left and right arms 206 by welding. The horizontal 220 and vertical portions 218 are formed from a single tubular brace bent to form the structure describe above. The radiator 52 is mounted to the central portions 204 and 220 as can be seen in FIG. 1A.

A plate member 226 is connected to the horizontal portion 222 and extends downwardly and rearwardly therefrom. The plate member 226 is used to mount various components of the vehicle 10 such as the power steering unit, a battery 54 (shown schematically in FIG. 3A), a fuse box 56 (shown schematically in FIG. 3A), and the like.

The forward portion 200 also includes a left front suspension mounting bracket 230 and a right front suspension mounting bracket 230. The right front suspension mounting bracket 230 is generally a mirror image of the left front suspension mounting bracket 230, and as such, only the left front suspension mounting bracket 230 will be described herein. The left front suspension mounting bracket 230 includes two vertical members 232 connected together by three cross-members 234 extending horizontally therebetween. The members 232, 234 are formed by stamping metal sheets. The upper ends of the front and rear vertical members 232 are connected to the horizontal portion of the left arm 218 of the upper frame member 216. From their respective upper ends, the front and rear vertical members 232 each extend downwardly and laterally inwardly. The lower end of the front vertical member 232 is connected to the front cross-member 210 near the left end thereof. The lower end of the rear vertical member 232 is connected to the rear cross-member 212 near the left end of One of the cross-members 234 extends between the front and rear vertical members 232 just above the left arm 206 of the lower frame member 202. Bolt holes 236 are defined in each of the front and rear vertical members 232 near the connection with the cross-member 234 for pivotally connecting the lower A-arm 74 of the left front suspension 70. Bolt holes 238 are defined in each of the front and rear vertical members 232 near their respective upper ends for connecting the upper A-arm 72 of the left front suspension 70.

A left shock absorber mounting bracket 240 is connected to the horizontal portion 222 of the left arm 218 of the upper frame member 216 between the front and rear vertical members 232 for connecting the upper end of the shock absorber 76 of the left front suspension assembly 70. The left shock absorber mounting bracket 240 is connected to the upper and laterally outer surface of the horizontal portion 222. The left shock absorber mounting bracket 240 extends upwardly and laterally outwardly from the horizontal portion 222. The left shock absorber mounting bracket 240 is U-shaped in cross-section with two spaced apart generally planar flanges extending parallel to each another and another planar flange extending between the two parallel flanges. A throughhole is defined in each of the two parallel flanges. The upper end of the shock absorber 76 is pivotally connected to the shock absorber mounting bracket 240 by a bolt inserted through the throughholes and the upper end of the shock absorber 76 disposed therebetween. A right shock absorber mounting bracket 240 is similarly connected to the horizontal portion 222 of the right arm 218 of the upper frame member 216 between the front and rear vertical members 232 for connecting the upper end of the shock absorber 76 of the right front suspension assembly 80. The right shock absorber mounting bracket 240 is generally a mirror image of the left shock absorber mounting bracket 240, and as such, will not be described herein.

A front left bracket 250 is connected to the horizontal portion 222 of the left arm 218 of the upper frame member 216 just rearwardly of the left shock absorber mounting bracket 240. The front left bracket 250 extends laterally inwardly from the horizontal portion 222. The front left bracket 250 has two vertical spaced apart flanges connected together at their lower ends by a horizontal plate having a central aperture. Similarly, a front right bracket 250 is connected to the horizontal portion of the right arm 218 of the upper frame member 216 just rearwardly of the right shock absorber mounting bracket 240. The front right bracket 250 is generally a mirror image of the front left bracket 250, and as such will not be described herein in detail. The brackets 250 are formed by stamping metal sheets. The brackets 250 are connected to the horizontal portion 222 by welding. A front portion of the engine 30 is connected to the left and right brackets 250 as will be described below in further detail.

The rearward portion 201 of the vehicle frame 12 includes a lower left frame member 260 extending rearwardly from the vertical portion 224 of the left arm 218 of the lower frame member 202 and a lower right frame member 260 extending rearwardly from the vertical portion 224 of the right arm 218 of the lower frame member 202. The lower left frame member 260 is formed of a tubular brace and extends generally horizontally. The front end of the lower left frame member 260 is connected to the vertical portion 224 just above the lower end thereof. From the front end, the lower left frame member extends generally horizontally and laterally inwardly towards a rear end portion 262. Just forward of the rear end portion 262, the lower left frame member 260 curves sharply laterally inwardly. The lower right frame member 260 is generally a mirror image of the lower left frame member 260 and as such, only the lower left frame member 260 will be described herein.

The rearward portion 201 includes a generally U-shaped rear upper frame member 270 disposed above the lower left frame member 260. The rear upper frame member 270 includes a left arm 272, a right arm 272 and a central portion 274 extending therebetween. The right arm 272 is generally a mirror image of the left arm 272 and as such, only the left arm will be described herein. The front end of the left arm 272 is connected to the vertical portion 224 of the left arm 218 of the lower frame member 202 above the lower left frame member 260. From the front end, left arm 272 extends generally longitudinally and laterally inwardly toward the central portion 274. A front portion 276 of the left arm 272 extends generally horizontally. A rear portion 278 of the left arm 272 extends upwardly and rearwardly away from the horizontal front portion 276 thereof. The central portion 274 extends generally laterally between the rear ends of the left and right arms 272. The central portion 274 is disposed vertically higher than the central portion 220. The rear upper frame member 270 is formed of a single tubular brace bent to form the portions 272, 274 described above.

Another U-shaped rear member 266 of the rearward portion 201 is connected to the rear portion 278 of the rear upper frame member 270. The rear member 266 is disposed below the upper frame member 270 and above the lower left and right frame members 260. The rear member 266 has a left arm 268, a right arm 268 and a central portion 269 connecting therebetween. A front end of the left arm 268 is connected to the rear portion 278 of the upper frame member left arm 272 and a front end of the right arm 268 is connected to the rear portion 278 of the upper frame member right arm 272. Each of the left and right arms 268 extend rearwardly and gently upwardly from the respective front ends to the central portion 269. The central portion 269 is disposed longitudinally forwardly of the rear upper frame member central portion 274. The rear member 266 is formed of a single tubular brace bent to form the portions 268, 269 described above.

A rear left bracket 252 is connected to the horizontal front portion 276 of the left arm 272 of the rear upper frame member 270 just forward of the bend where the left arm 272 begins to extend upwardly. Similarly, a rear right bracket 252 is connected to the horizontal front portion 276 of the right arm 272 of the rear upper frame member 270 just forward of the bend where the right arm 272 begins to extend upwardly. The transfer case 36 is mounted to the rear left and right brackets 252 as will be described below in further detail.

A left bracket 280 is connected between the left arm 268 of the rear member 266 and the lower left frame member 260. A left bracket 282 is connected between the left arm 268 of the rear member 266 and the left arm 272 of the upper frame member 270. A left bracket 283 extends upwardly from the left arm 272 above the left bracket 282. The vehicle frame 12 similarly includes a right bracket 280 connected between the right arm 268 of the rear member 266 and the lower right frame member 260. A right bracket 282 is connected between the right arm 268 of the rear member 266 and the right arm 272 of the upper frame member 270. A right bracket 283 extends upwardly from the right arm 272 above the right bracket 282. The brackets 280, 282 enhance the rigidity of the vehicle frame 12. The left and right bracket 283 are connected to the left and right sides respectively of the fuel tank 60 for mounting the fuel tank 60 to the vehicle frame 12 as can be seen in FIGS. 1B and 1C. A bracket 284 having a U-shaped cross-section extends downwardly from the central portion 274 of the rear upper frame member 270 for connecting a front end of the rear suspension assembly 24.

Figure 1E:
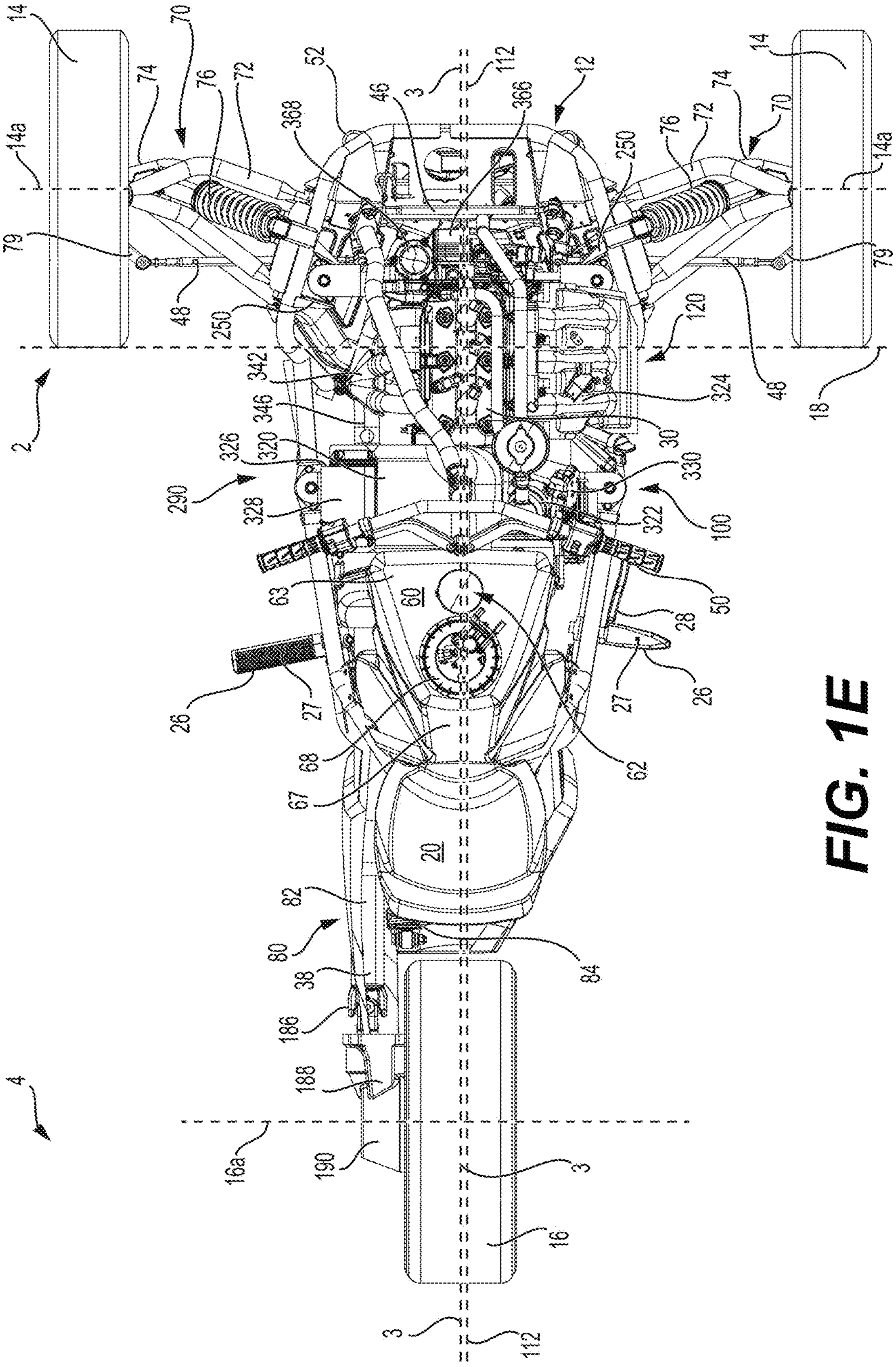
FIG. 1E is a top plan view of the vehicle of FIG. 1A.
Figure 1F:
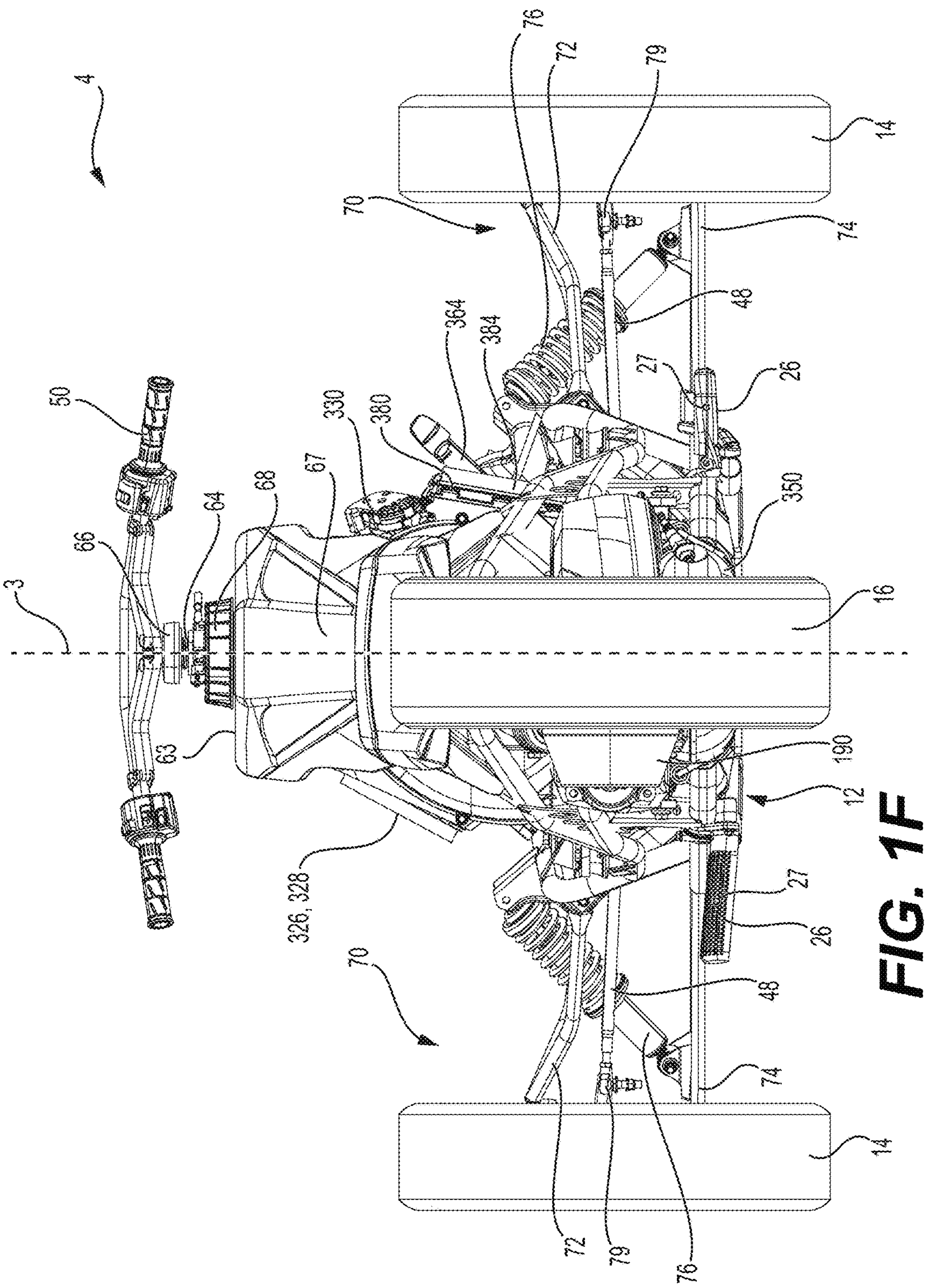
FIG. 1F is a rear elevation view of the vehicle of FIG. 1A.
Figure 1G:
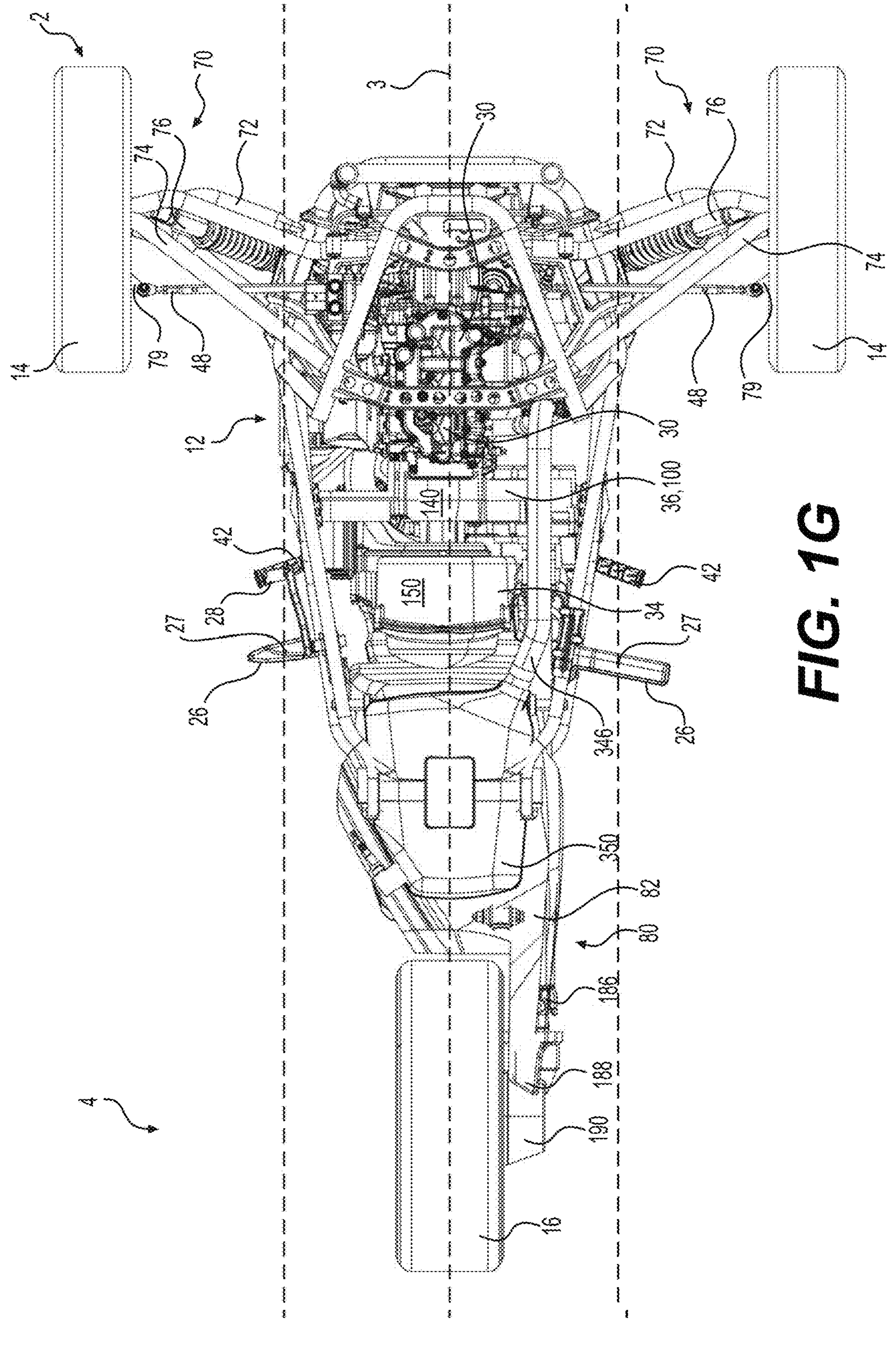
FIG. 1G is a bottom plan view of the vehicle of FIG. 1A.
Figure 1H:
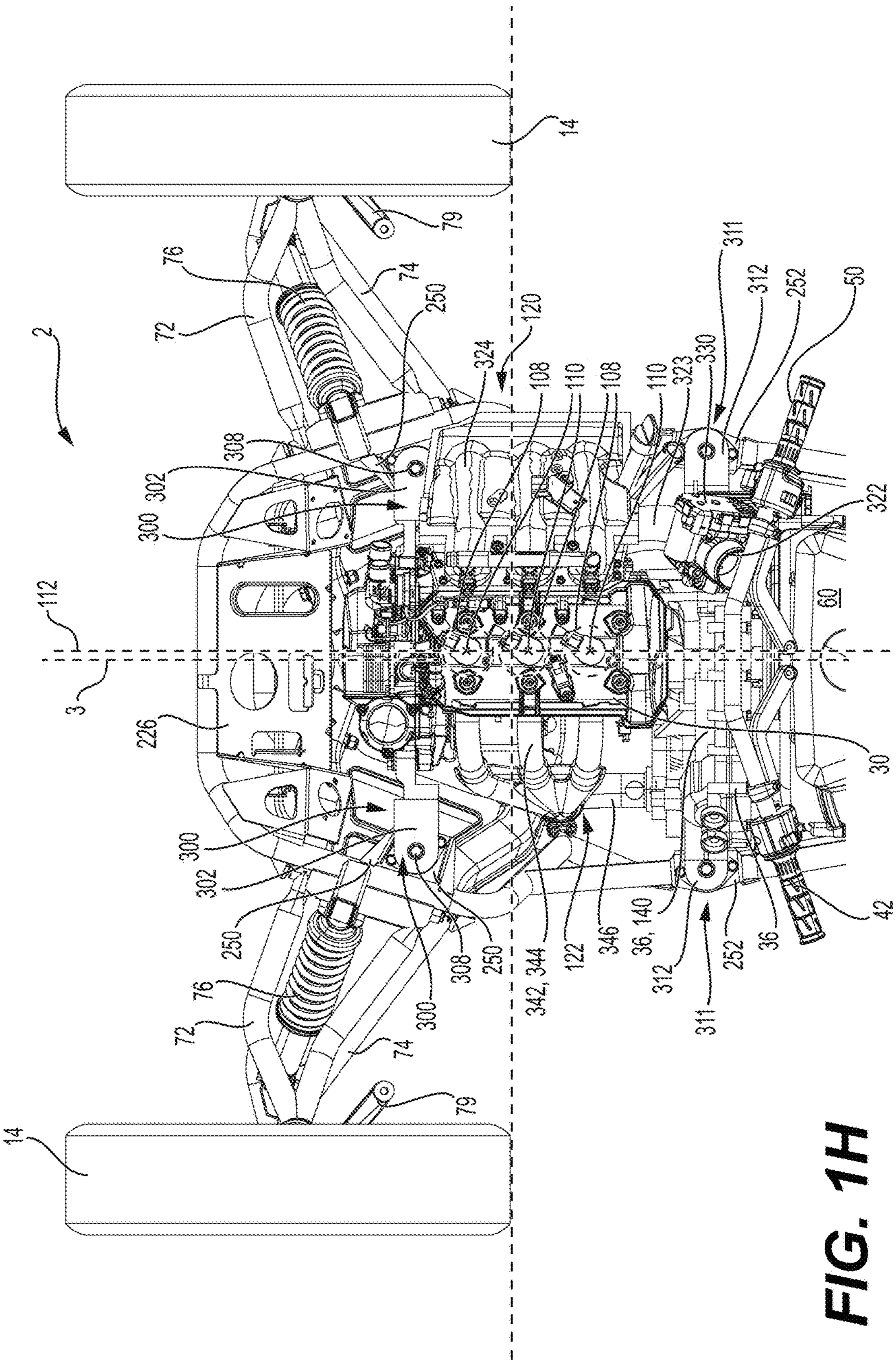
FIG. 1H is a close-up top plan view of a front portion of the vehicle of FIG. 1A.

The vehicle frame 12 defines an engine cradle 290. The engine cradle 290 is defined by the forward frame portion 200, the front portions 276 of the left and right upper frame members 270 and the respective front portions of the left and right lower frame members 260. The engine 30 is disposed in the engine cradle 290 and mounted to the vehicle frame 12 via the front left and right brackets 250 as can be seen in FIGS. 1E and 1H and described below in further detail. The rear brackets 252 are connected to the transfer case 36 as can be seen in FIGS. 1E and 1H and described below in further detail.

Powertrain

The powertrain 100 now be described with reference to FIGS. 1B, 1H, and 4A to 5E.

As mentioned above, the vehicle powertrain 100 is formed by the engine 30, the engine output shaft 32, the CVT 34, the transfer case 36 and the driveshaft 38 in the illustrated implementation of the vehicle 10.

The engine 30 has a crankcase 102, a cylinder block 104 disposed on and connected to the crankcase 102, and a cylinder head assembly 106 disposed on and connected to the cylinder block 104. The crankshaft 31 (shown schematically in FIGS. 5C and 5D) is housed in the crankcase 102.

The cylinder block 104 defines three cylinders 108 (shown schematically in FIG. 5A) d, including a rear cylinder 108, a middle cylinder 108, and a front cylinder 108, defined in the cylinder block 104. Each cylinder 108 defines a cylinder axis 110. A piston (not shown) is disposed inside each cylinder 108 for reciprocal movement therein along the cylinder axis 110. The lower end of each piston is linked by a connecting rod (not shown) to the crankshaft 31. A combustion chamber is defined in the upper portion of each cylinder 108 by the walls of the cylinder 108, the cylinder head assembly 106 and the top of the piston. Explosions caused by the combustion of an air/fuel mixture inside the combustion chambers cause the pistons to reciprocate inside the cylinders 108. The reciprocal movement of the pistons causes the crankshaft 31 to rotate, thereby allowing power to be transmitted from the crankshaft 31 to the rear wheel 16. The cylinder head assembly 106 also includes a fuel injector (not shown) for each cylinder. The fuel injectors receive fuel from a fuel tank 60 via a fuel rail 116. The engine 30 receives air from an air intake system 120 which will be described in further detail below. A spark plug 114 is provided in the cylinder head assembly 106 for each cylinder 108 ignite the air/fuel mixture in each cylinder 108. The exhaust gases resulting from the combustion of the air-fuel mixture in the combustion chamber are removed from the engine 30 and then released to the atmosphere via an exhaust system 122, also described below in further detail.

As can be seen in FIG. 1B, the engine 30 is mounted to the vehicle frame 12 such that in a projection of the vehicle 10 onto a plane extending vertically and longitudinally, the crankshaft rotation axis 31*a* is disposed below the rotation plane 15 defined by the wheels 14, 16.

As can be seen in FIGS. 1H and 4B to 5B, the cylinders 108 are arranged in an inline configuration such that the cylinder axes 110 of the three cylinders 108 define a cylinder plane 112 extending generally vertically and longitudinally. In the illustrated implementation, the rotation axis 31*a* of the crankshaft 31 is contained in the cylinder plane 112. It is contemplated that the crankshaft axis 31*a* could be offset from the cylinder plane 112. It is also contemplated that the engine 30 could have more than three cylinders 108 or fewer than three cylinders 108. In general, the cylinder plane 112 is defined as a plane containing the respective cylinder axes 110 of the cylinders 108 and either extending parallel to the crankshaft axis 31*a* or containing the crankshaft axis 31*a*.

In the illustrated implementation, the cylinder plane 112 is parallel to the longitudinal centerplane 3 and laterally offset therefrom. The cylinder plane 112 is disposed slightly to the right of the longitudinal centerplane 3. It is contemplated that the lateral offset of the cylinder plane 112 with respect to the longitudinal centerplane 3 could be different from that shown herein. For example, the cylinder plane 112 could be disposed on a left side of the longitudinal centerplane 3, or aligned therewith, instead of being on a right side thereof. It is also contemplated that the cylinders 108 could be arranged in an inline configuration such that the cylinder plane 112 could be disposed at an angle with respect to the longitudinal centerplane 3.

As can be seen in FIG. 1H, the engine 30 is mounted to the vehicle frame 12 such that the forwardmost cylinder 108 and a forward portion of the middle cylinder 108 are disposed forward of the front wheel plane 18. It is contemplated that the longitudinal position of the cylinders 108 could be different from that shown herein as long as at least a portion of at least one cylinder 108 is disposed forward of the front wheel plane 18. In the illustrated implementation of the vehicle 10, the footrests 26 and the handlebar 42 are both disposed longitudinally rearwardly of the engine 30.

In the lateral direction, the cylinders 108 of the engine 30 are entirely disposed between the connection of the left footrest 26 to the vehicle frame 12 and the connection of the right footrest 26 to the vehicle frame 12 as can be seen in FIG. 1E. In general, the entire engine 30 is disposed between a center 27 of the left footrest 26 and a center 27 of the right footrest 26. The cylinders 108 of the engine 30 are disposed laterally between the front left and right suspension assemblies 70 in the illustrated implementation of the vehicle 10. In general, at least a portion of at least one cylinder 108 is disposed between the front left and right suspension assemblies 70.

Figure 5A:
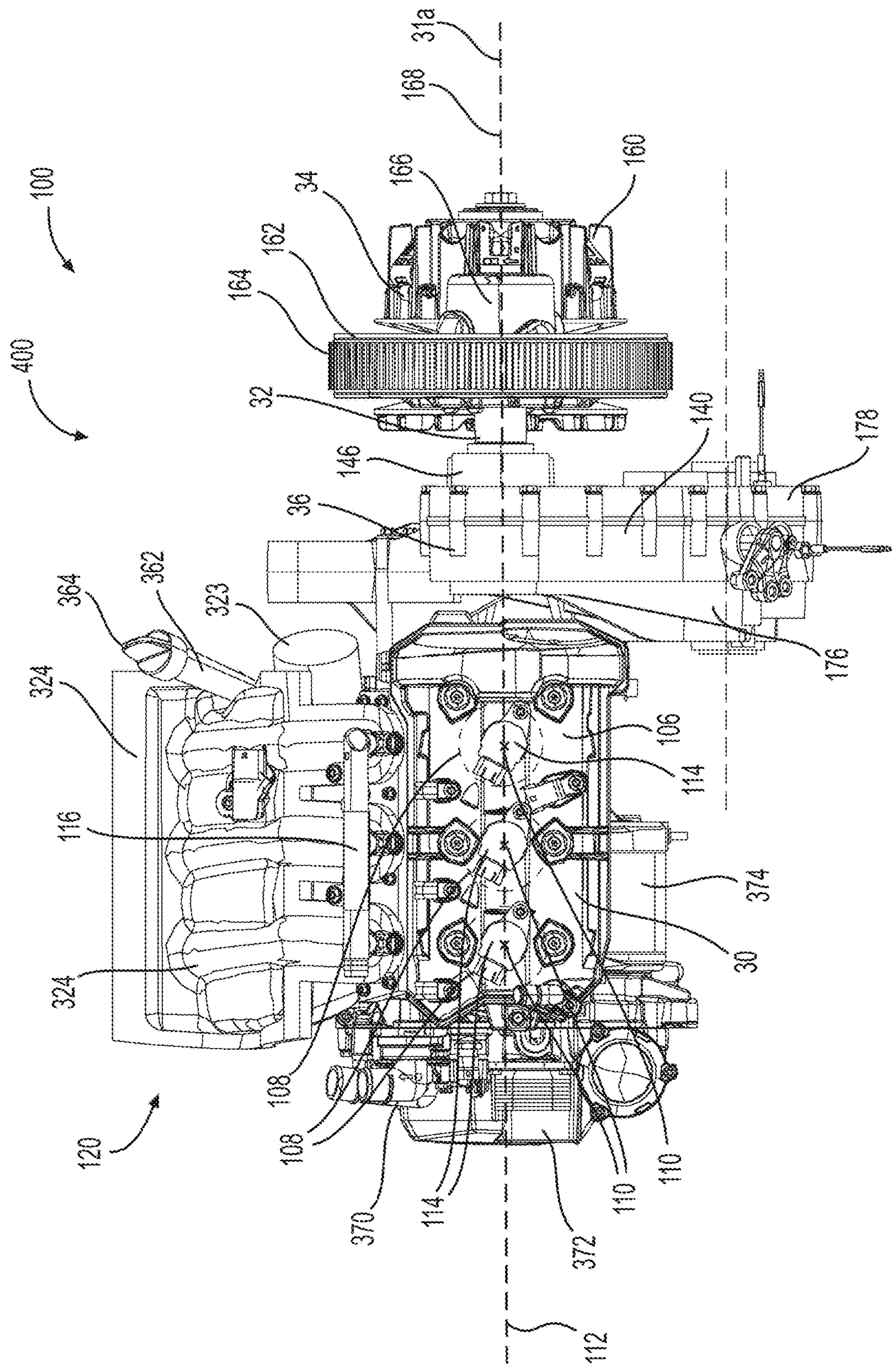
FIG. 5A is a top plan view of a portion of the powertrain of FIG. 4A showing the engine, engine output shaft, transfer case and continuously variable transmission (CVT) of the powertrain of FIG. 4A with the CVT housing being removed for clarity.
Figure 5B:
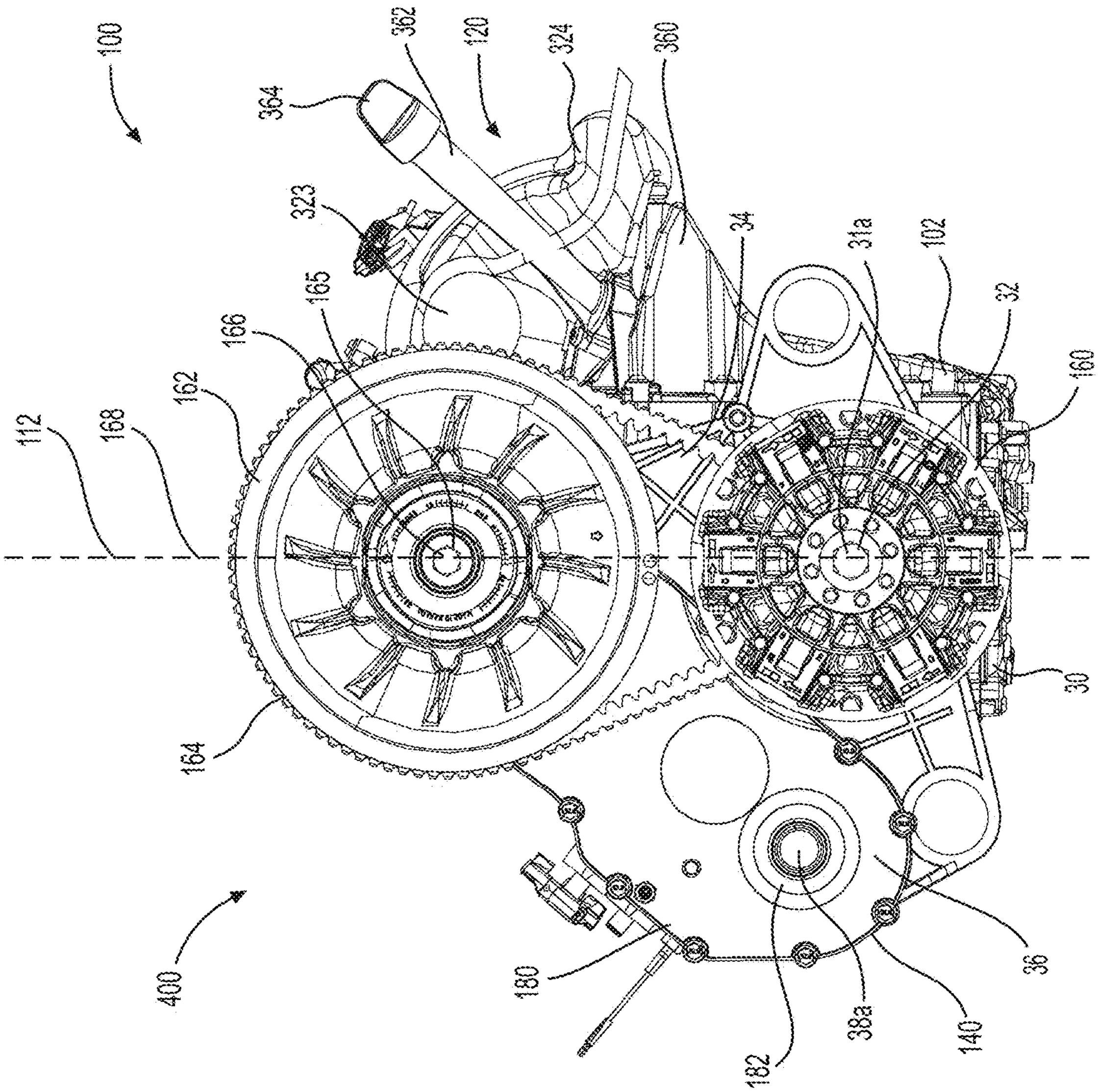
FIG. 5B is a rear elevation view of the powertrain portion of FIG. 5A.
Figure 5C:
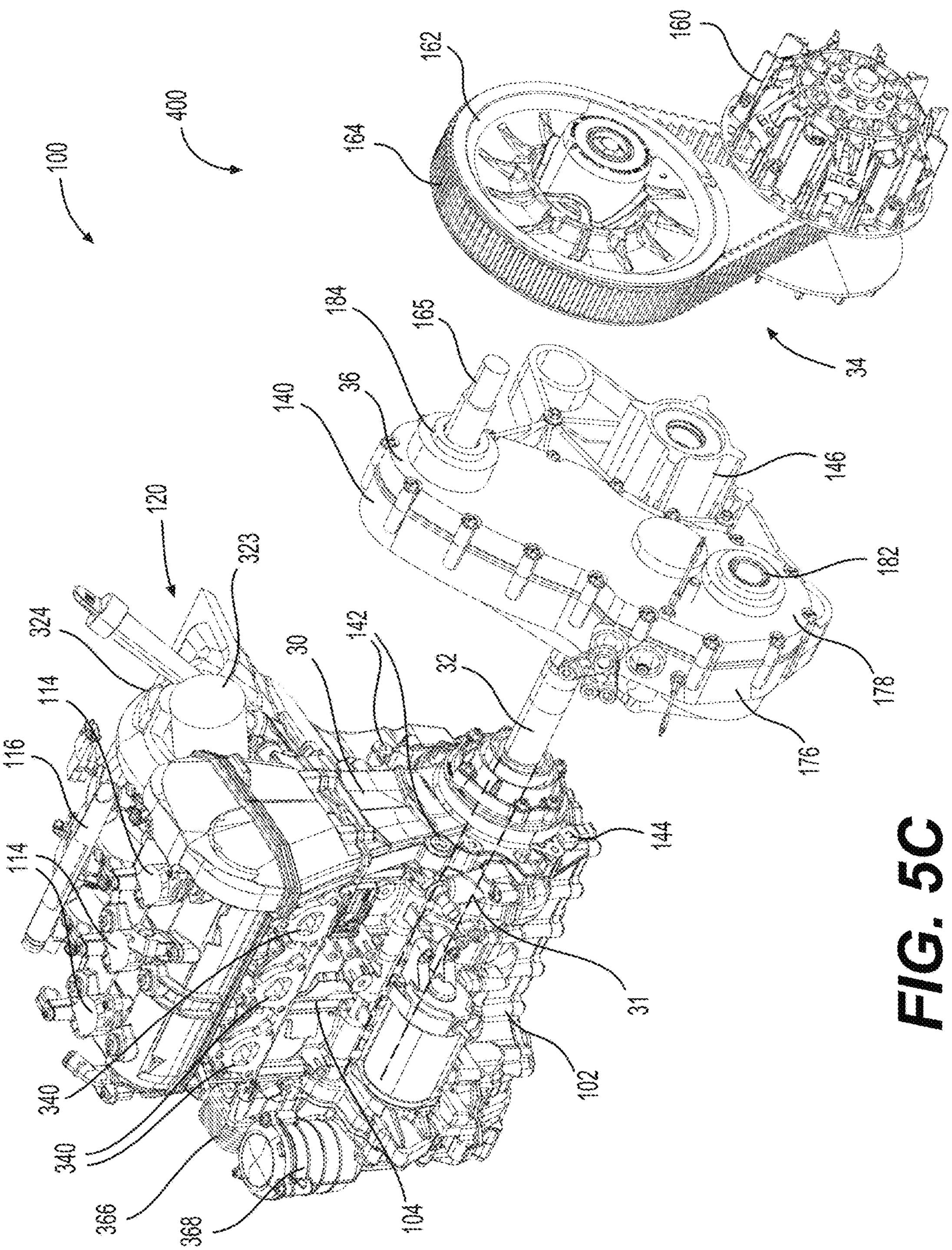
FIG. 5C is an exploded perspective view, taken from a rear, top and left side, of the powertrain portion of FIG. 5A.
Figure 5D:
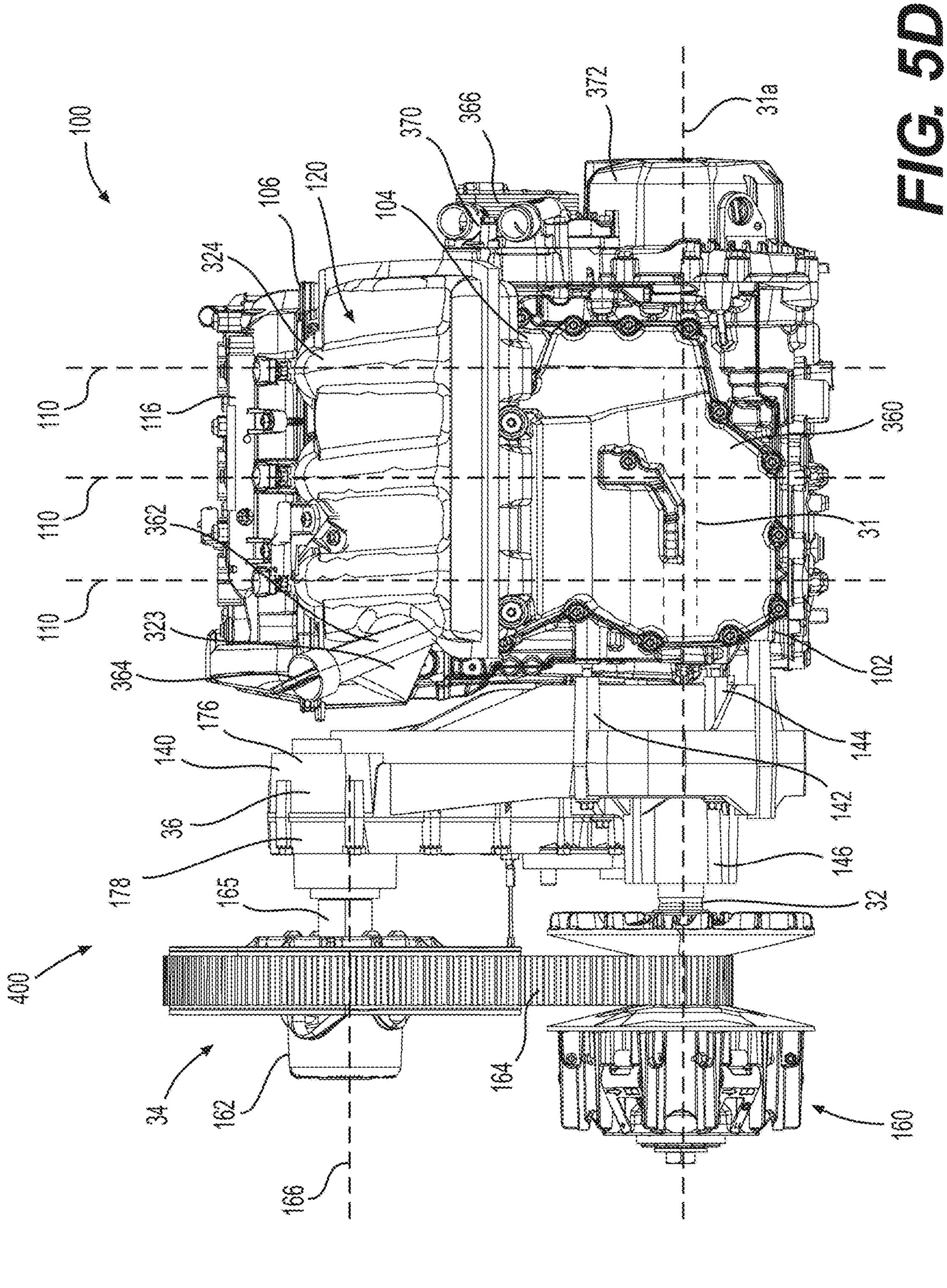
FIG. 5D is right side elevation view of the powertrain portion of FIG. 5A.

With reference to FIGS. 1H, 5C and 5D, the transfer case 36 is disposed longitudinally rearwardly of the engine 30. The transfer case 36 is disposed such that there is an overlap between the transfer case and the engine 30 in the lateral and vertical directions (i.e. when viewed from the rear or from a side). The transfer case 36 includes a transfer case housing 140 which is mounted to the rear end of the engine 30 via boltholes 142 of the cylinder block 104 and boltholes 144 of the crankcase 102 as can be seen in FIGS. 5C and 5D.

With reference to FIG. 5D, the engine output shaft 32 extends rearwardly from the rear end of the crankcase 102, through an engine output shaft housing 146 connected to the transfer case housing 140 to connect to the CVT 34. In the illustrated implementation, the engine output shaft 32 is connected directly to the crankshaft 31 and serves as an extension thereof, but it is contemplated that the engine output shaft 32 could be operatively connected to the crankshaft 31 via one or more gears. It is also contemplated that the engine output shaft 32 could be integrally formed with the crankshaft 31.

With reference to FIGS. 5D and 11D to 11F, the CVT 34 includes a CVT housing 150 disposed longitudinally rearwardly of the transfer case 36. The CVT 34 is disposed such that there is an overlap between the transfer case 36 and the CVT 34 in the lateral and vertical directions (i.e. when viewed from the rear or from a side). The CVT housing 150 includes a front cover 152 and a rear cover 156. The front cover 152 is mounted to the transfer case and the rear cover 156 is removably mounted to the front cover 152. The CVT housing 150 defines a CVT chamber 154 (FIGS. 11E and 11F) between the front and rear covers 152, 156. The front cover 152 includes a rearwardly extending rim that is bolted to a forwardly extending rim of the rear cover 156 by bolts. Two openings 158, 159 (FIG. 11D) are defined in the front cover 152. The engine output shaft 32 extends through the lower opening 158 of the front cover of the CVT housing 150.

With reference to FIGS. 5A to 5D and 11D to 11F, the CVT 34 includes a primary pulley 160 (which may be referred to as a "drive pulley"), a secondary pulley 162 (which may be referred to as a "driven pulley"), and a belt 164 wrapped around the primary pulley 160 and the secondary pulley 162 for rotating the secondary pulley 162. The primary pulley 160 is mounted to the rear end of the engine output shaft 32 extending rearwardly from the crankcase 102 so as to rotate therewith. The engine output shaft 32 and the primary pulley 160 are coaxial with the crankshaft 31 and rotate about the crankshaft rotation axis 31*a*. The primary pulley 160 is disposed in the lower portion of the chamber 154 enclosed by CVT housing 150. The secondary pulley 162 is mounted on the rear end of a shaft 165 (FIG. 5C) which extends through an upper opening 169 of the front cover 152. The secondary pulley 162 rotates about a rotation axis 166 extending parallel to the crankshaft rotation axis 31*a*. The secondary pulley 162 is disposed above the primary pulley 160 in the illustrated implementation of the vehicle 10. It is however contemplated that the secondary pulley 162 could be disposed in a different position with respect to the primary pulley 160. It is contemplated that the secondary pulley 162 could be disposed lower than the primary pulley 160, for example, if the primary pulley 160 was connected to the engine output shaft 32 indirectly instead of directly as shown herein. A CVT plane 168 (FIG. 5B) containing the respective rotation axes 31*a*, 166 of the primary pulley 160 and the secondary pulley 162 is disposed parallel to the longitudinal centerplane 3 and on a right side thereof. It is contemplated that the CVT plane 168 could coincide with the longitudinal centerplane 3 and not be laterally offset therefrom. It is contemplated that the CVT 34 could be configured such that the CVT plane 168 extends generally longitudinally and vertically but at a non-zero angle with respect to the longitudinal centerplane 3. In the illustrated implementation of the vehicle 10, the CVT plane 168 coincides with the cylinder plane 112. It is however contemplated that the CVT plane 168 could not coincide with the cylinder plane 112. For example, the CVT plane 168 could be disposed at an angle with respect to the cylinder plane 112. It is also contemplated that other types of continuously variable transmission be used.

As is known, each of the pulleys 160, 162 includes a movable sheave that can move axially relative to a fixed sheave to modify an effective diameter of the corresponding pulley 160, 162. The moveable sheave of the primary pulley 160 has centrifugal weights such that the effective diameter of the primary pulley 160 increases with the rotational speed of the primary pulley. The effective diameters of the pulleys 160, 162 are in inverse relationship. In the illustrated implementation, the CVT 34 is a purely mechanical CVT 34, in which the effective diameter of the primary pulley 160 depends on the rotational speed of the engine output shaft 32 and the crankshaft 31. The belt 164 is made of a fiber-reinforced rubber but it is contemplated that the belt 164 could be made of metal or other suitable material. The rear cover 156 is disposed spaced from the fuel tank 60 so that the rear cover 156 can be easily removed to access the components inside for maintenance and repair.

Figure 11A:
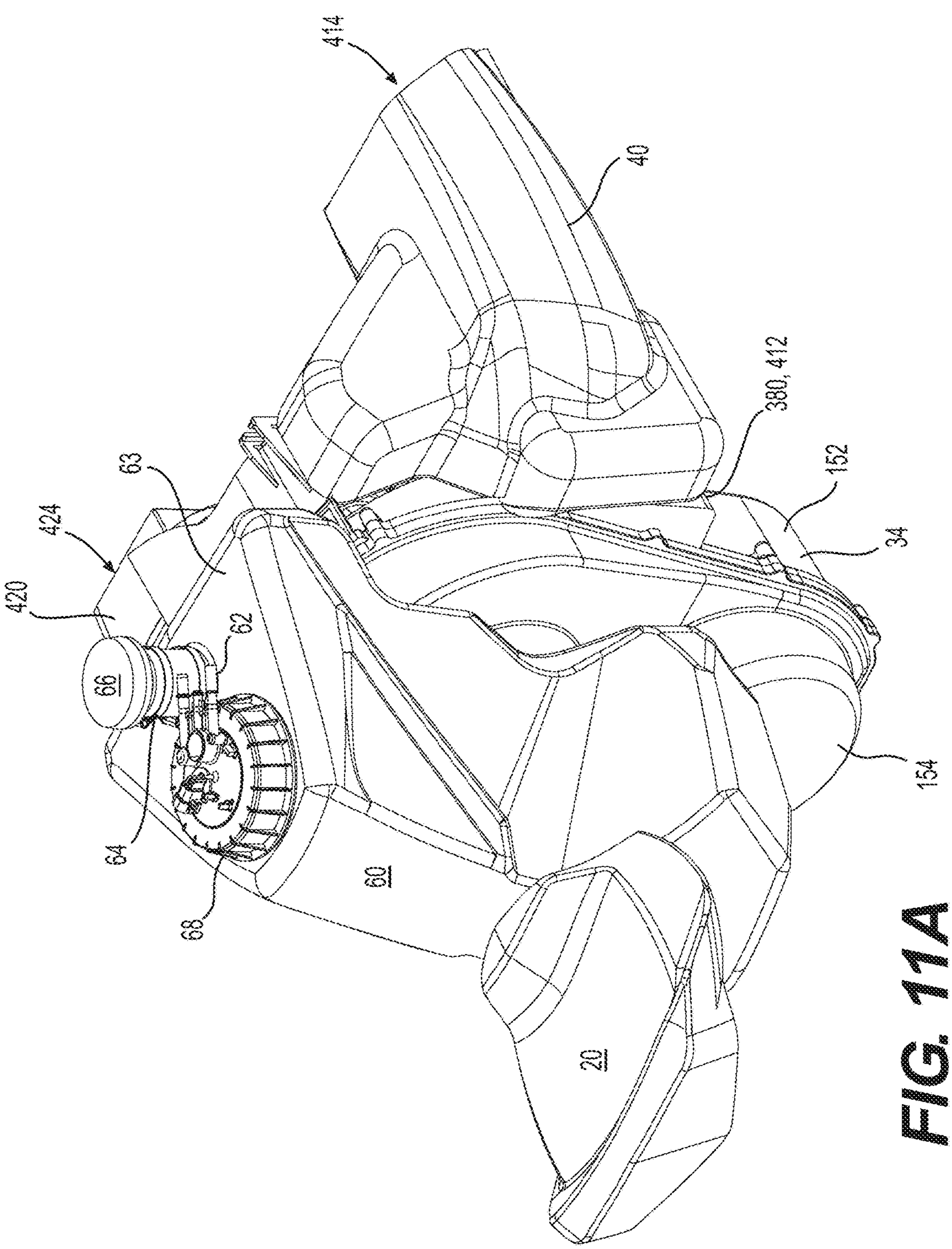
FIG. 11A is a perspective view, taken from a rear, top and right side, of the seat, fuel tank, CVT, a CVT air duct and an engine air duct of the vehicle of FIG. 1A.
Figure 11B:
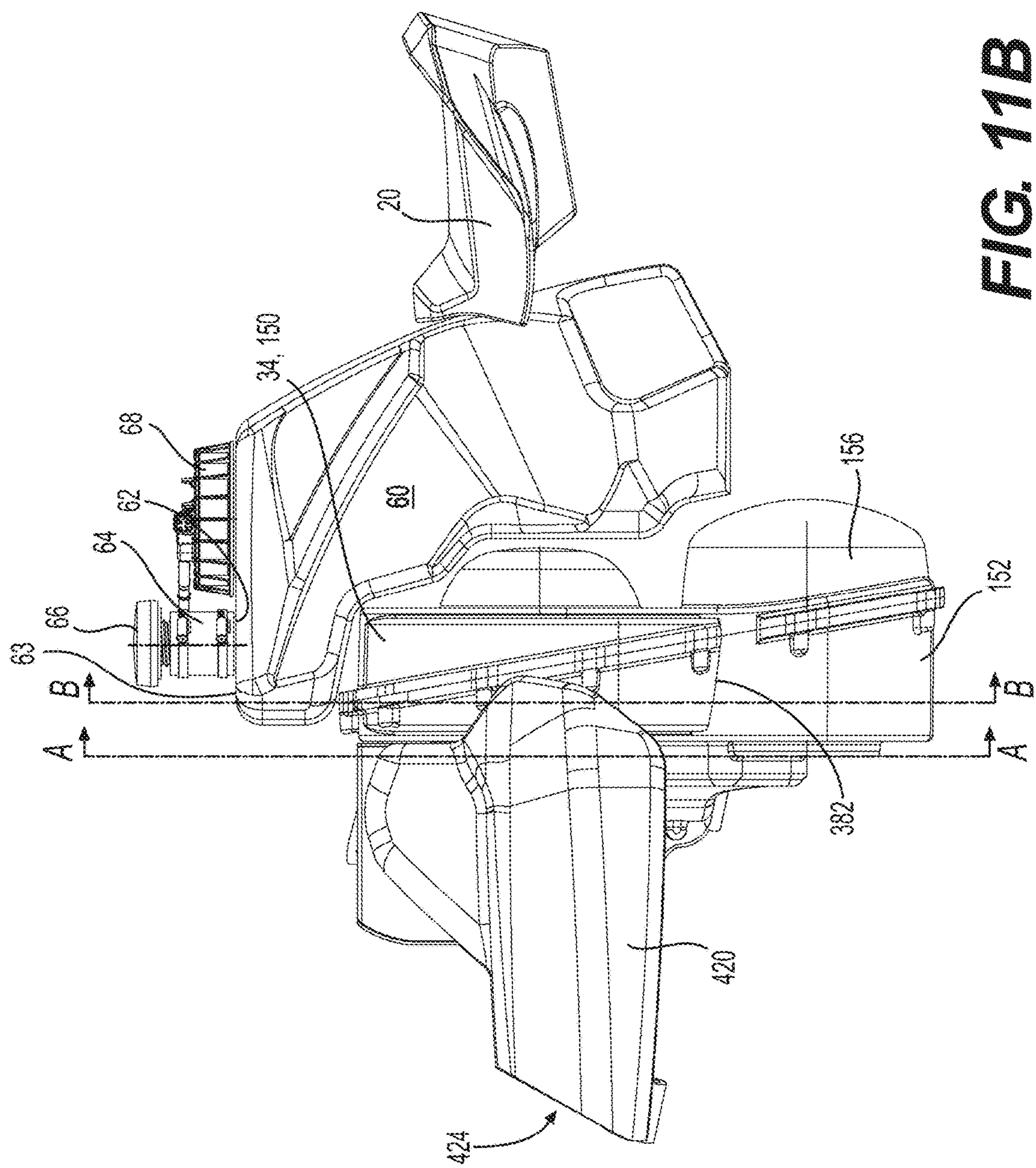
FIG. 11B is a left side elevation view of the seat, fuel tank, CVT, CVT air duct and engine air duct of FIG. 11A.
Figure 11C:
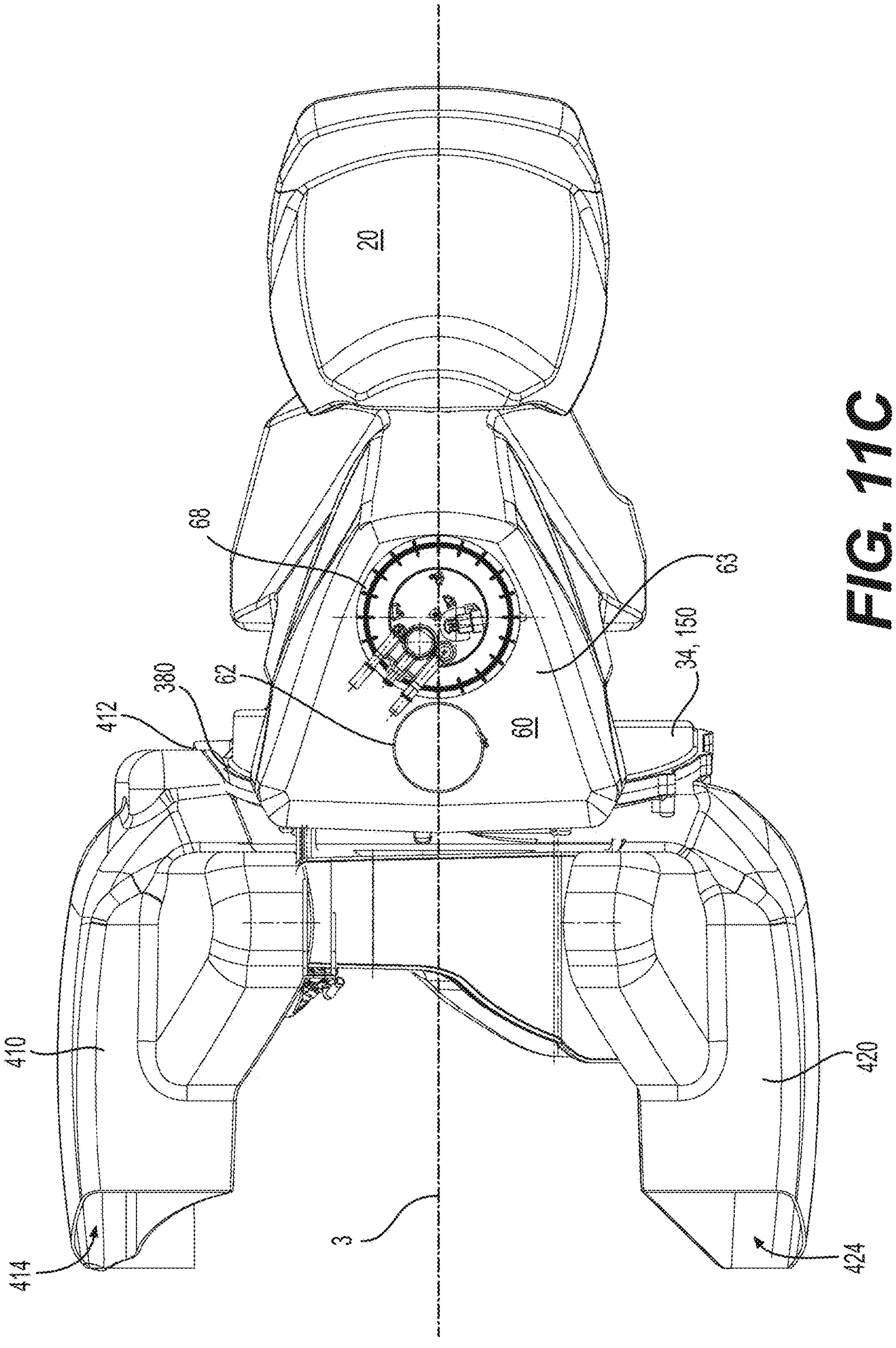
FIG. 11C is a top plan view of the seat, fuel tank, CVT, CVT air duct and engine air duct of FIG. 11A.
Figure 11D:
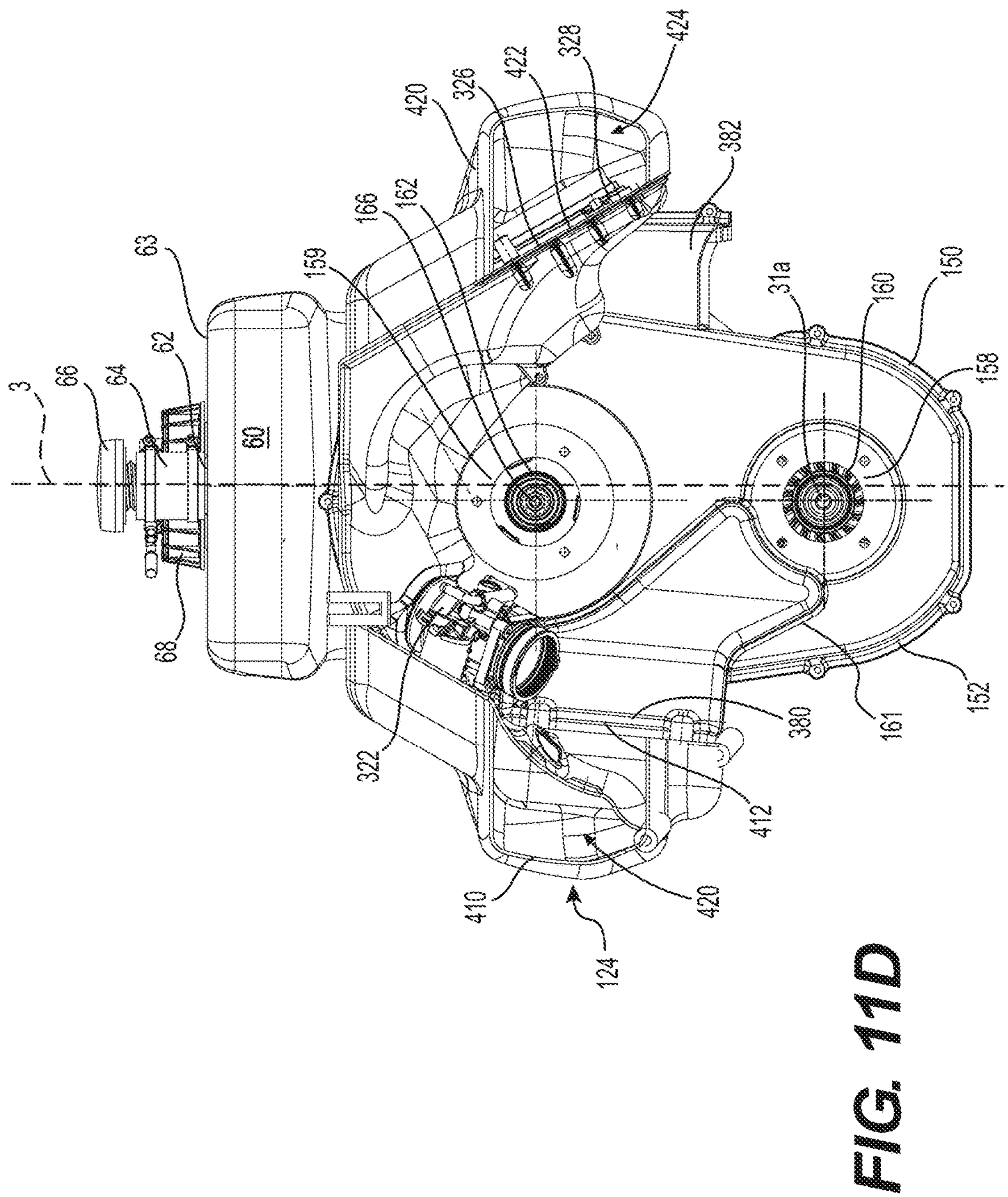
FIG. 11D is a front elevation view of the seat, fuel tank, CVT, CVT air duct and engine air duct of FIG. 11A.
Figure 11F:
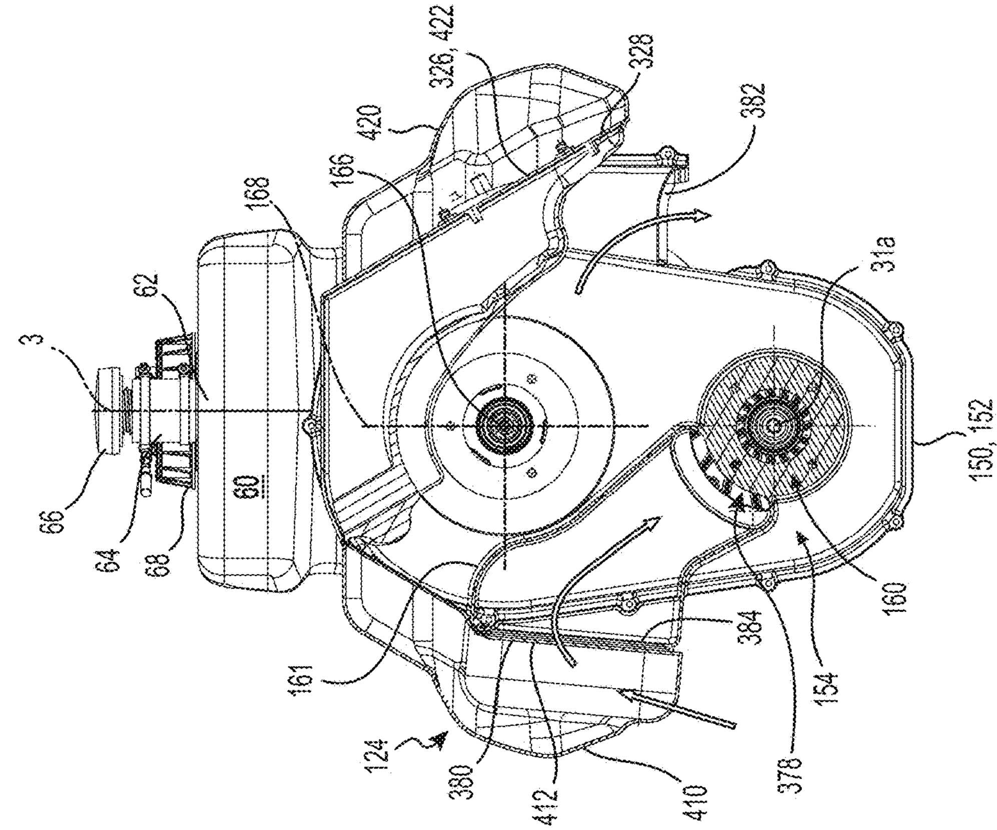
FIG. 11F is a cross-sectional view of the seat, fuel tank, CVT, CVT air duct and engine air duct of FIG. 11A, taken along the line B-B of FIG. 11B.
Figure 11E:
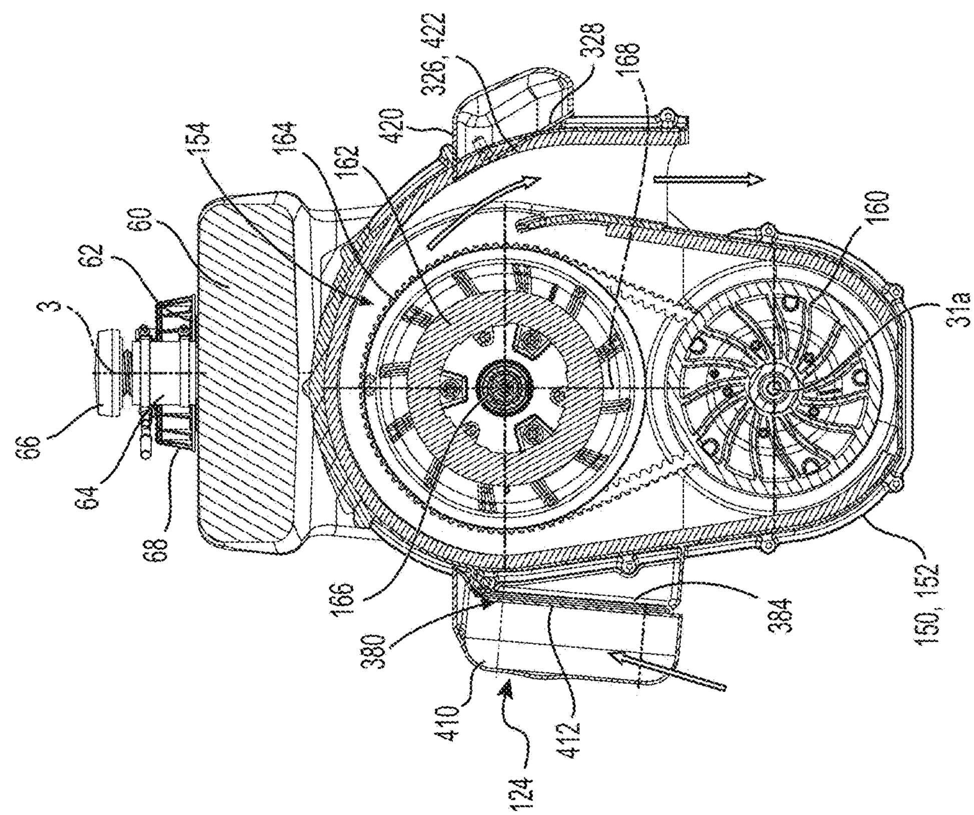
FIG. 11E is a cross-sectional view of the seat, fuel tank, CVT, CVT air duct and engine air duct of FIG. 11A, taken along the line A-A of FIG. 11B.

As can be seen in FIGS. 1A to 1D, 4A, 4B and 11D to 11F, the CVT housing 150 defines a rightwardly facing air inlet 380 disposed on a right side of the CVT housing 150 and a CVT air outlet 382 disposed on a left side of the CVT housing 150. A conduit 161 extends inside the CVT housing 150 from the air inlet 380 laterally towards the longitudinal centerplane 3. The conduit 161 defines a CVT air inlet 378 (which may be referred to as a "cooling air inlet"). As can be see in FIG. 11F, the CVT air inlet 378 is disposed on a right side of the longitudinal centerplane 3. The CVT air inlet and outlet 378, 382 are thus located on opposite lateral sides of the longitudinal centerplane 3. Air flows from the air inlet 380, through the conduit 161 and out of the CVT air inlet 378 into the CVT chamber 154. As shown in FIG. 11F, the CVT air inlet 378 is located adjacent to the primary pulley 160 such that, in use, air flowing through the conduit 161 and out of the CVT air inlet 378 is directed to the primary pulley 160. Air flows out of the CVT chamber 154 via the CVT air outlet 382 which is configured to direct air out of the CVT chamber 154 in a downward direction. The air inlet 380 of the conduit 161 is covered with an air filter 384 to prevent dust and debris from the entering the CVT chamber 154.

Figure 11G:
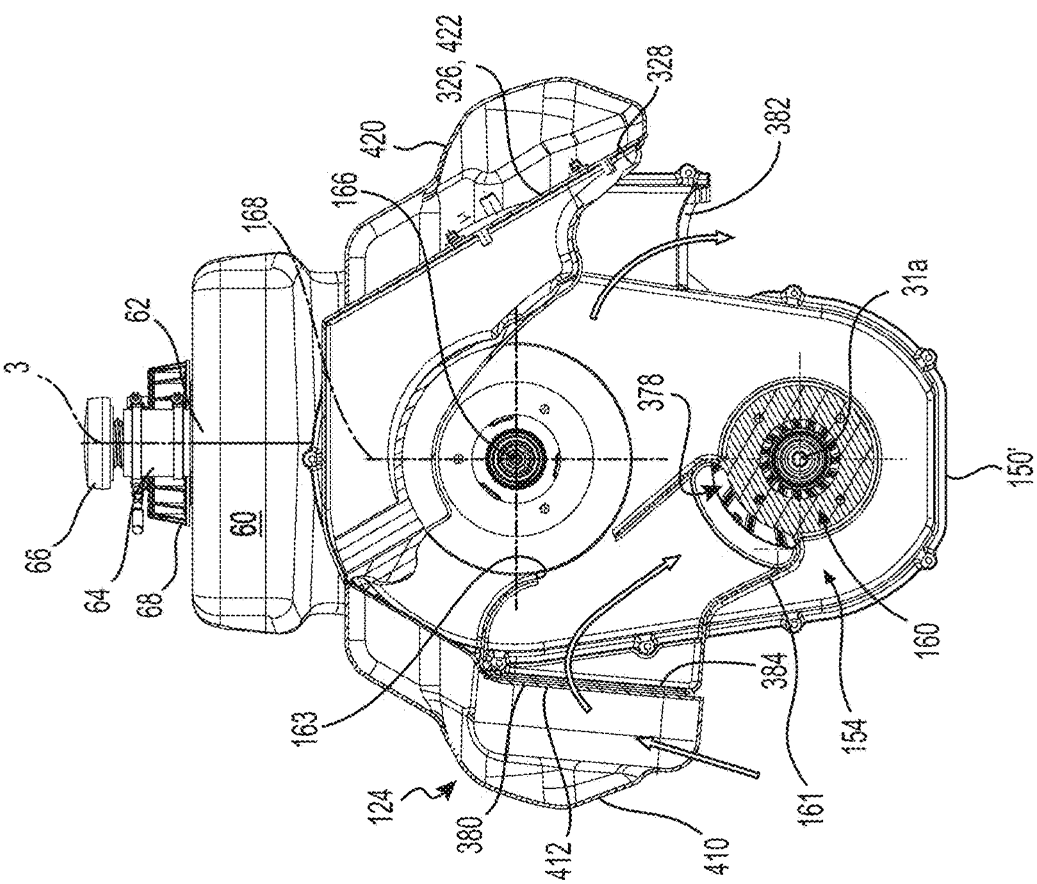
FIG. 11G is a cross-sectional view of the seat, fuel tank, CVT, CVT air duct and engine air duct of FIG. 11A, taken along the line B-B of FIG. 11B with another implementation of the CVT housing.
Figure 12:
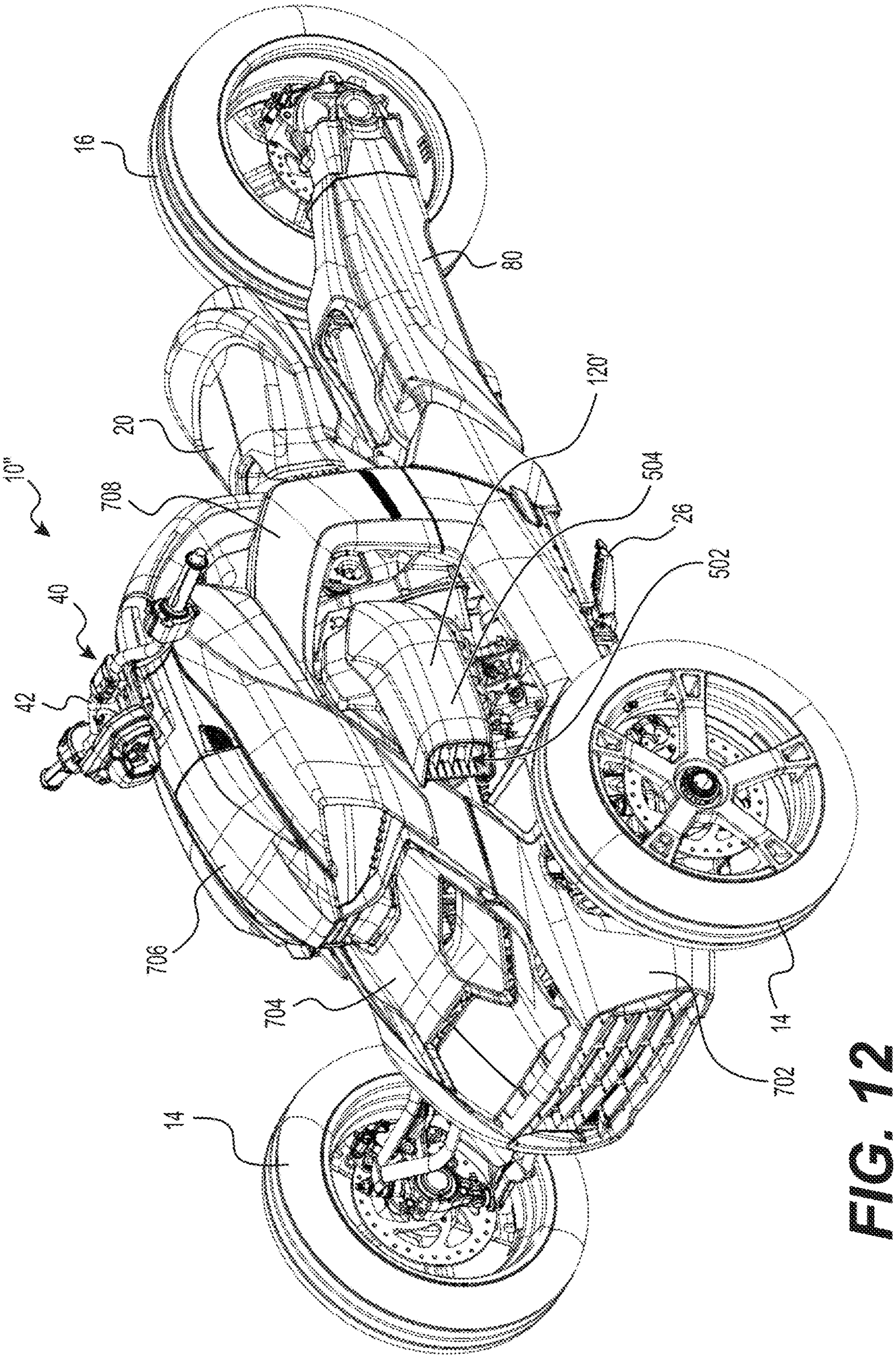
FIG. 12 is a perspective view, taken from a front, top and left side of an alternative implementation of the vehicle of FIG. 1 equipped with a CVT air intake system and an engine air intake system.
Figure 13:
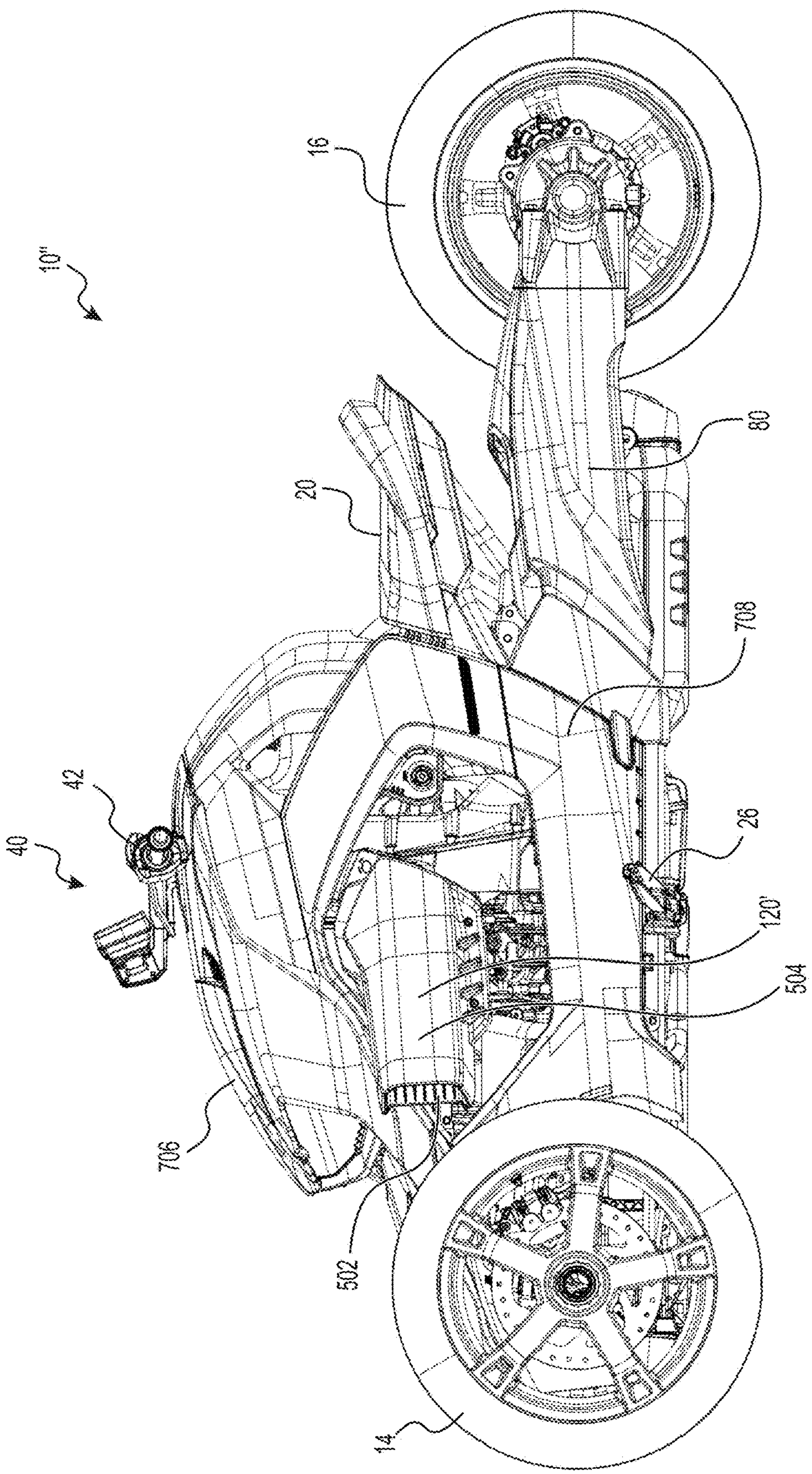
FIG. 13 is a left side elevation view of the vehicle of FIG. 12.

The CVT housing 150 may be configured differently in other implementations. For instance, FIG. 11G shows a CVT housing 150' that is configured to direct air towards both the primary pulley 160 and the secondary pulley 162. Notably, in such implementations, the conduit 161, which extends generally laterally inwardly and downwardly from the air inlet 380 towards the primary pulley 160, defines an aperture 163 to direct air flow upwardly towards the secondary pulley 162 (as illustrated by the arrows showing air flow within the CVT housing 150'). As such the conduit 161 defines the CVT air inlet 378 (which can be referred to as a "primary CVT air inlet" in this implementation) for directing air to the primary pulley 160 and a secondary CVT air inlet (defined by the aperture 163) for directing air to the secondary pulley 162.

The vehicle 10 includes a CVT air intake system 124 fluidly communicating with the CVT air inlet 378 for providing air to the CVT 34. More particularly, as shown in FIGS. 11A and 11C to 11G, the CVT air intake system 124 includes an air duct 410 that is fluidly connected to the CVT air inlet 378 to direct air from a front of the vehicle 10 into the CVT air inlet 378. More particularly, the CVT air duct 410 is connected to the CVT housing 150 such that an air outlet 412 of the CVT air duct 410 connects to the air inlet 380 of the conduit 161. The conduit 161 of the CVT housing 150 (or 150') is thus in fluid communication with the CVT air duct 410. As shown in FIG. 11C, from the air inlet 380, the CVT air duct 410 extends forwardly on a right side of the longitudinal centerplane 3 and the transfer case housing 140 to a generally forwardly facing air inlet 414 through which air enters the CVT air intake system 124. The air inlet 414 is said to face generally forwardly in that air from in front of the vehicle 10 can enter the air inlet 414 when the vehicle 10 is in motion and that a projection of the air inlet 414 onto a plane normal to a longitudinal axis of the vehicle 10 defines a surface area. The forwardly facing configuration of the air inlet 414 functions as a ram-air intake causing a static air pressure increase within the CVT air intake system 124 as a result of the dynamic pressure created by forward motion of the vehicle. This results in higher volumetric flow and pressure to the CVT 34. In the illustrated implementation, the CVT air duct 410 is formed integrally with an engine air duct 420 which will be described below in further detail.

In this implementation, the conduit 161 is formed by the CVT housing 150. However, it is contemplated that, in alternative implementations, the conduit 161 could form part of the CVT air intake system 124. In such implementations, the conduit 161 is separate from the CVT housing 150 and extends, from the CVT air duct 410, inside the CVT housing 150 laterally towards the longitudinal centerplane 3. Moreover, the conduit 161 is connected to the CVT housing 150 such that the CVT air inlet 378 of the conduit 161 opens into the CVT housing 150 adjacent to the primary pulley 160.

With reference to FIGS. 12 to 15, another member 10" of the family of vehicles is shown. The vehicle 10" has many features that correspond to features of the vehicle 10 above. Corresponding and similar features of the vehicles 10 and 10" have been labeled with the same reference numbers. Features of the vehicle 10" that are different from corresponding features of the vehicle 10 have been labeled with the same reference number followed by an apostrophe. The vehicle 10" will only be discussed in detail with regard to the differences from the vehicle 10. Notably, the vehicle 10" includes a CVT air intake system 124' that is an alternative implementation of the CVT air intake system 124 described above and an engine air intake system 120' that is an alternative implementation of the engine air intake system 120 described above.

As shown in FIGS. 14 to 17, 27 and 28, in this implementation, the CVT air intake system 124', which fluidly communicates with the CVT air inlet 378, includes a CVT air duct 610 (in place of the CVT air duct 410). The CVT air duct 610 is similar to the CVT air duct 410. Notably, the CVT air duct 610 defines an air inlet 602 facing generally forwardly. More specifically, the CVT air duct 610 includes a base member 606 and an outer cover 608 connected to the base member 606. The outer cover 608 defines the air inlet 602 while the base member 606 defines an air outlet 616 (FIG. 30) of the CVT air duct 610 in fluid communication with the air inlet 380.

Figure 17:
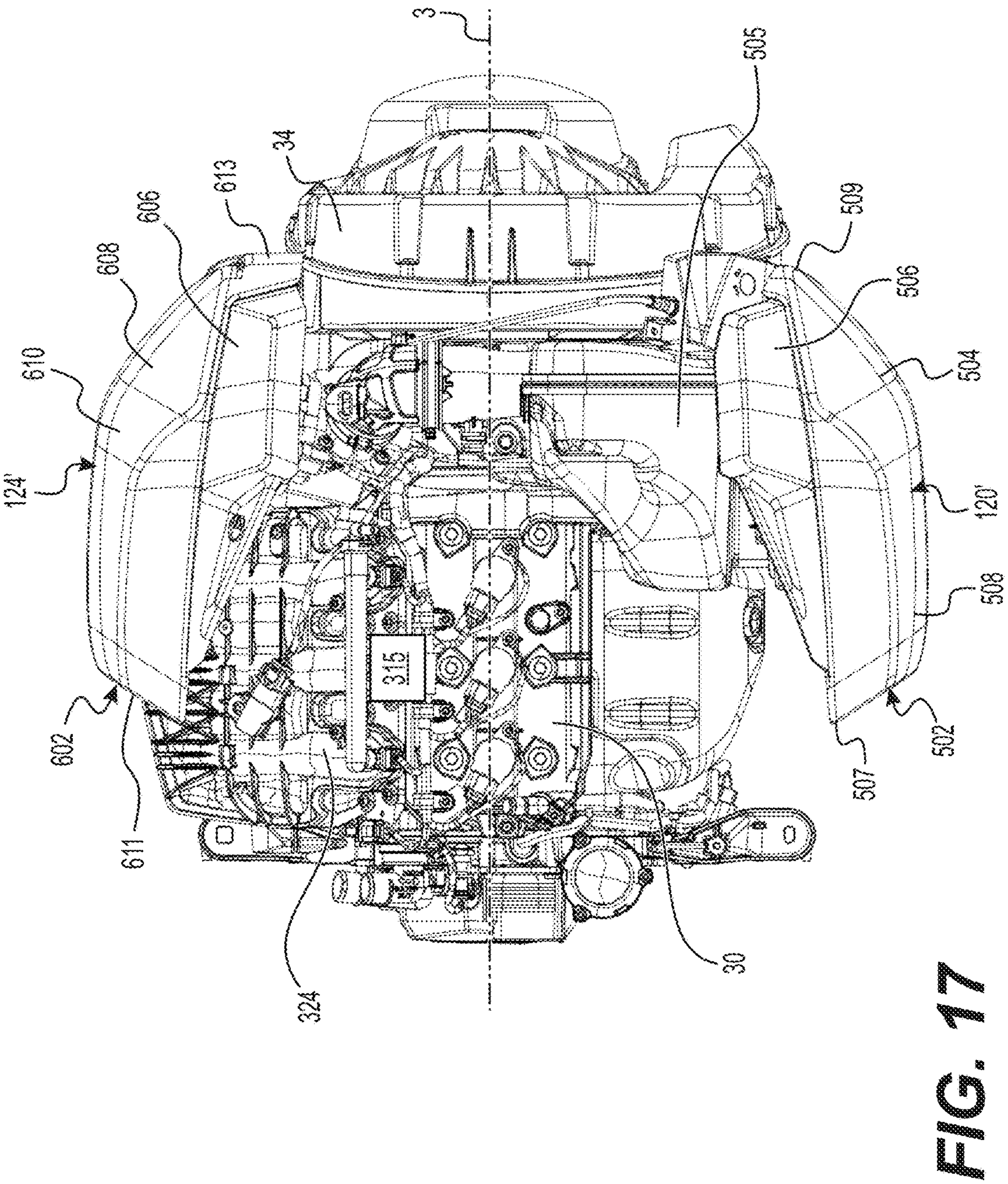
FIG. 17 is a top plan view of the engine and air intake systems of FIG. 16.
Figure 18:
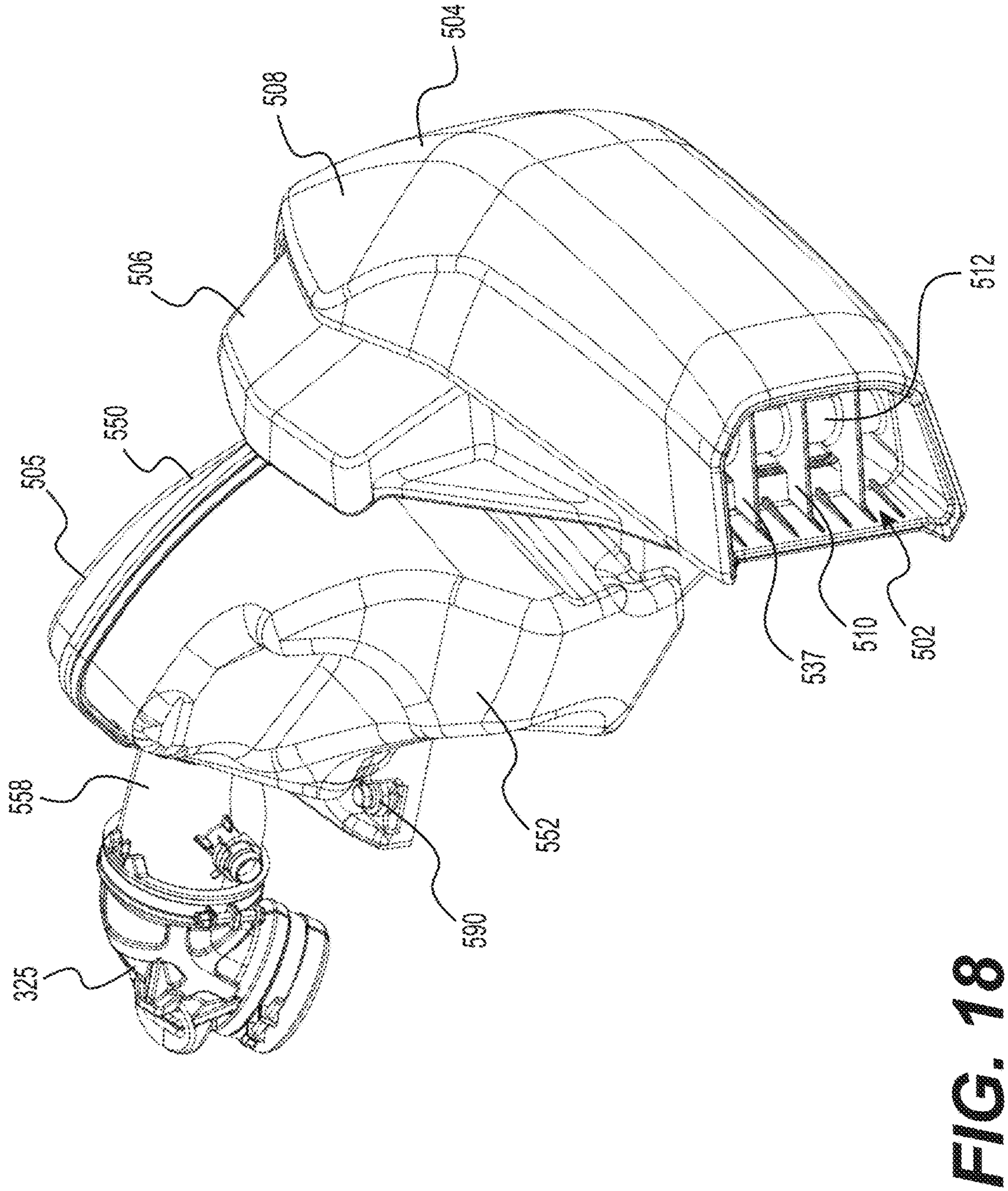
FIG. 18 is a perspective view, taken from a front, top and left side, of part of the engine air intake system of FIG. 16.
Figure 19:
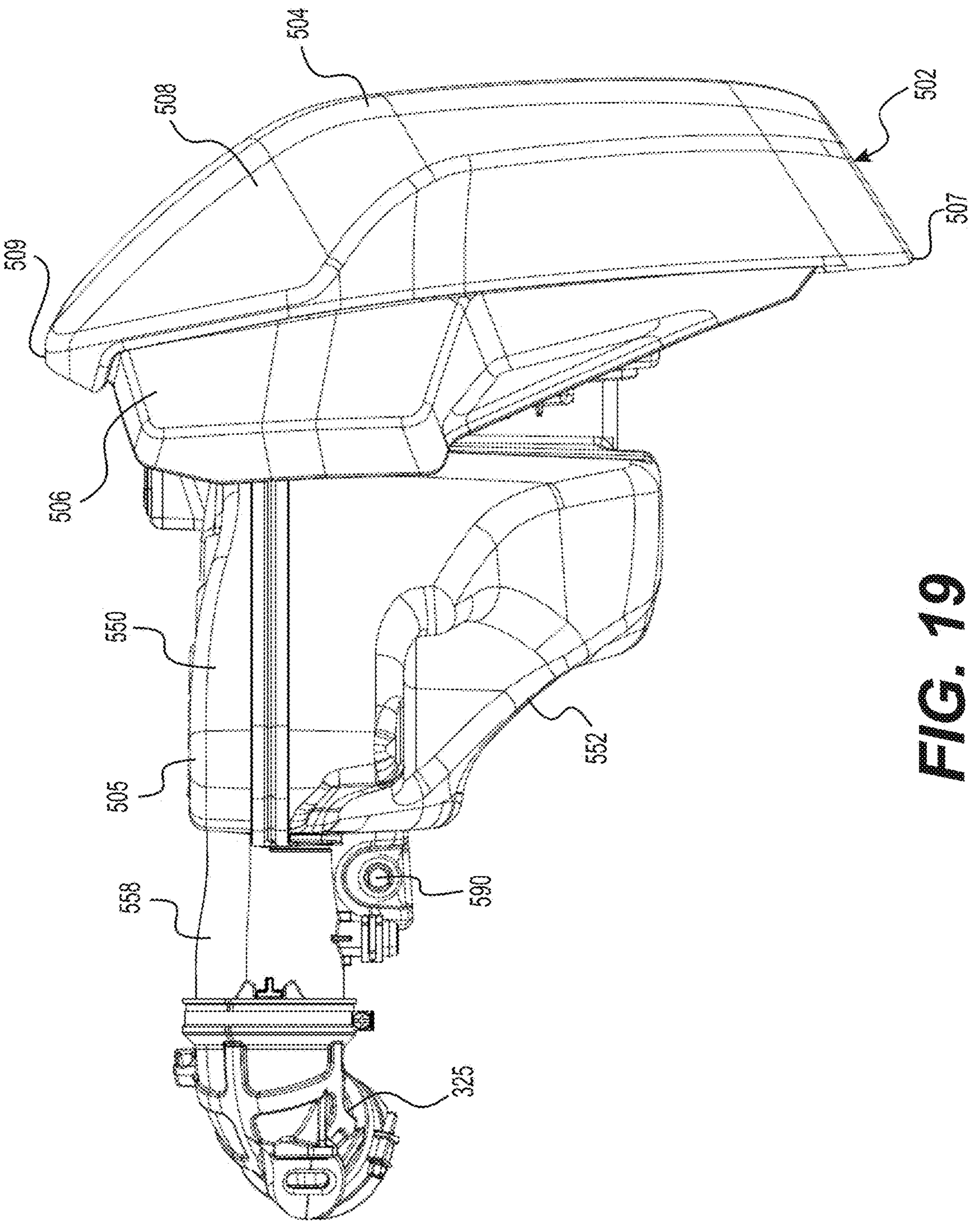
FIG. 19 is a top plan view of the engine air intake system of FIG. 18.
Figure 27:
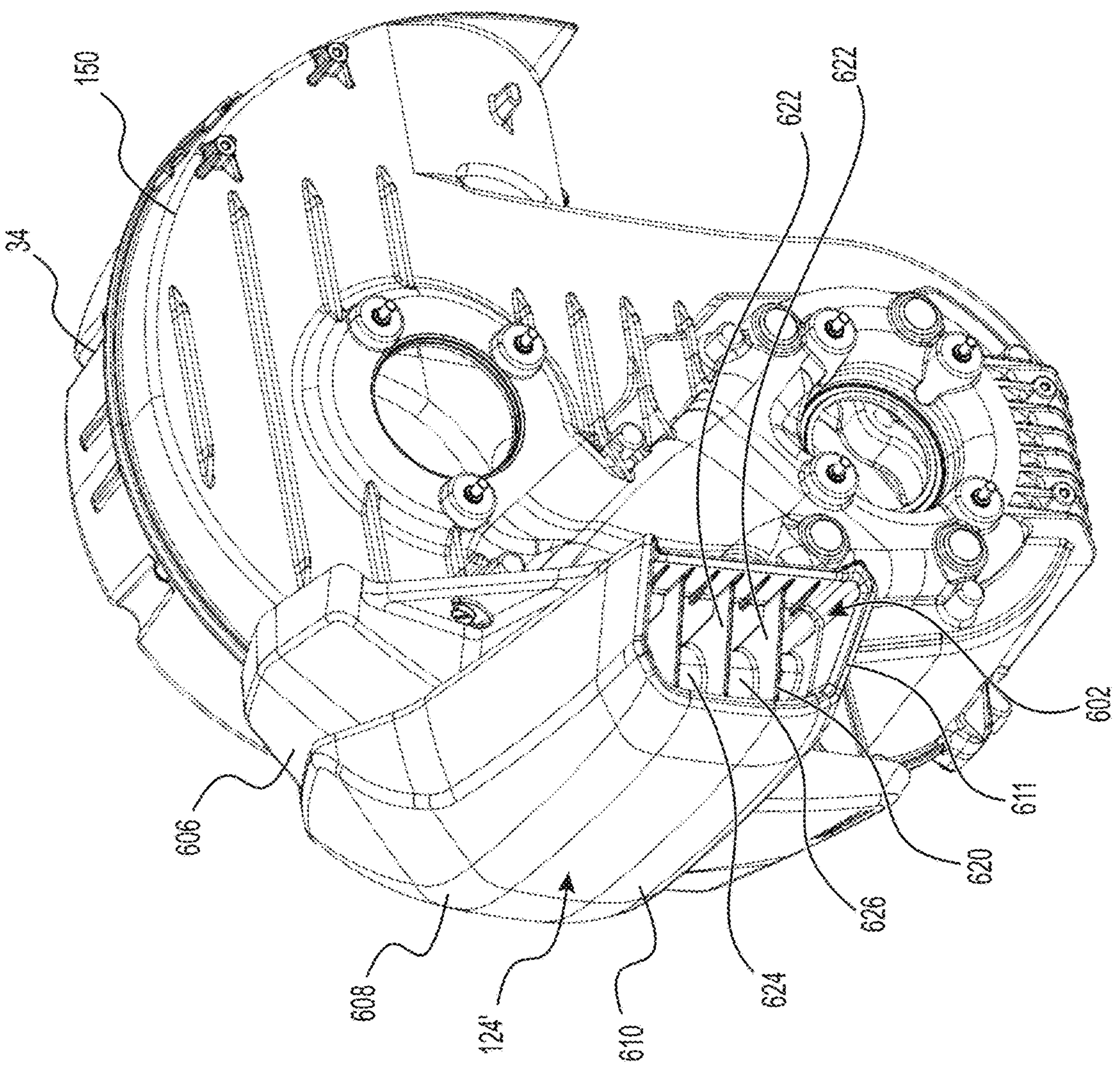
FIG. 27 is a perspective view, taken from a front, top and right side, of the CVT and the CVT air intake system.
Figure 28:
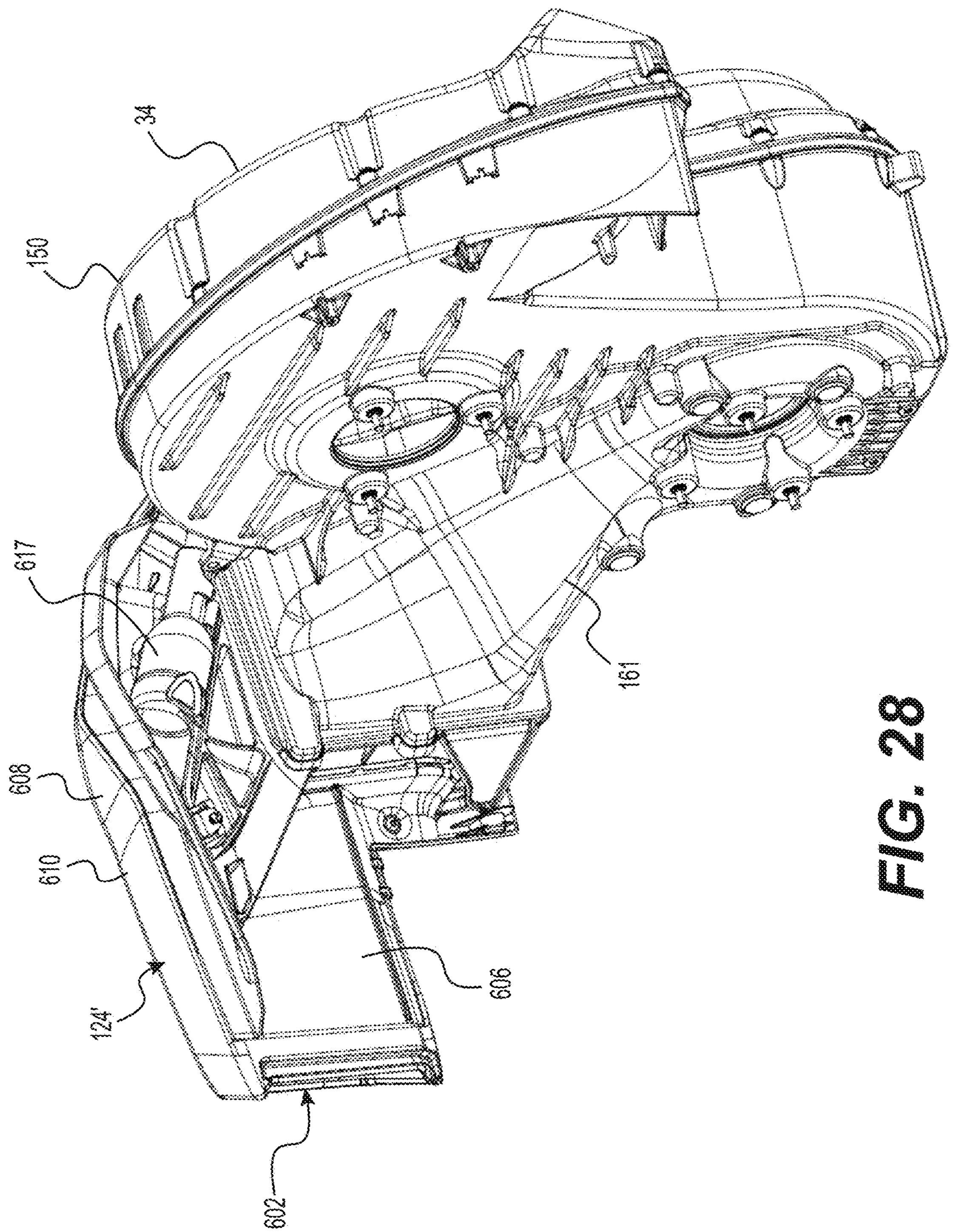
FIG. 28 is a perspective view, taken from a front, top, and left side, of the CVT and the CVT air intake system.

The outer cover 608 extends from a front end 611 defining the air inlet 602 to a rear end 613 (FIG. 17). The outer cover 608 has a convex outer side and a concave inner side facing laterally inward towards the base member 606. With reference to FIG. 27, the outer cover 608 includes a grille 620 at the air inlet 602 to prevent oversized debris from entering the CVT air intake system 124'. The grille 620 includes a plurality of generally horizontal slats 622 and a deflector 624 for removing at least some of the water entrained with air entering the CVT air duct 610. More specifically, while entering the air inlet 602, air deflects around the deflector 624. This deflecting causes at least some of the water entrained with the air to be separated from the air that will continue to flow toward the CVT 34. In this implementation, the deflector 624 extends generally vertically and has a rounded surface 626 facing frontwardly for promoting the smooth deflection of air. The deflector 624 is spaced apart from the lateral walls defining the air inlet 602 to allow air to deflect around both sides of the deflector 624.

Figure 29:
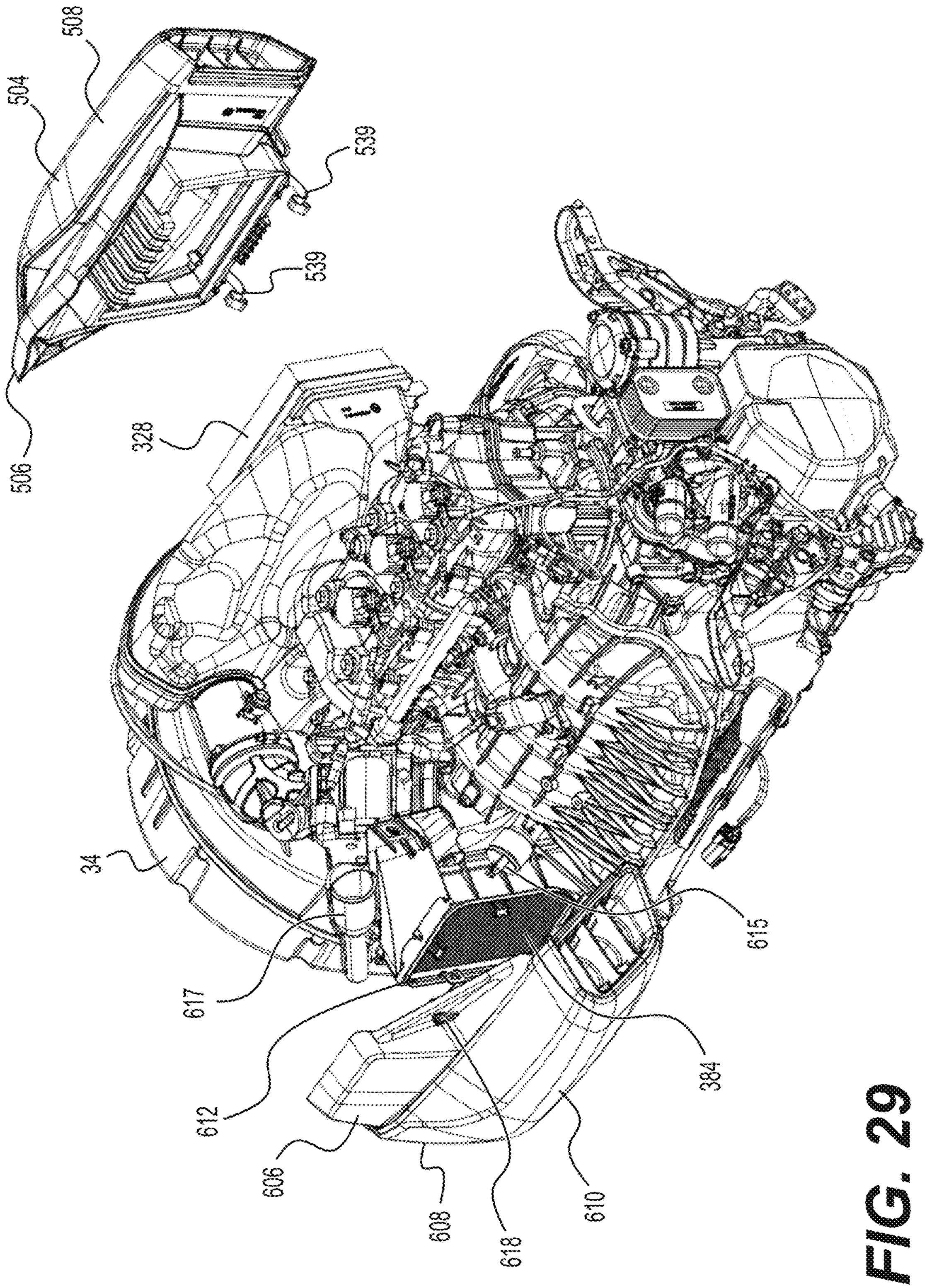
FIG. 29 is a perspective view, taken from a front, top and right side, of the engine, the CVT air intake system and the engine air intake system, in which air ducts of the CVT and engine air intake systems are in an open position and disconnected respectively.
Figure 30:
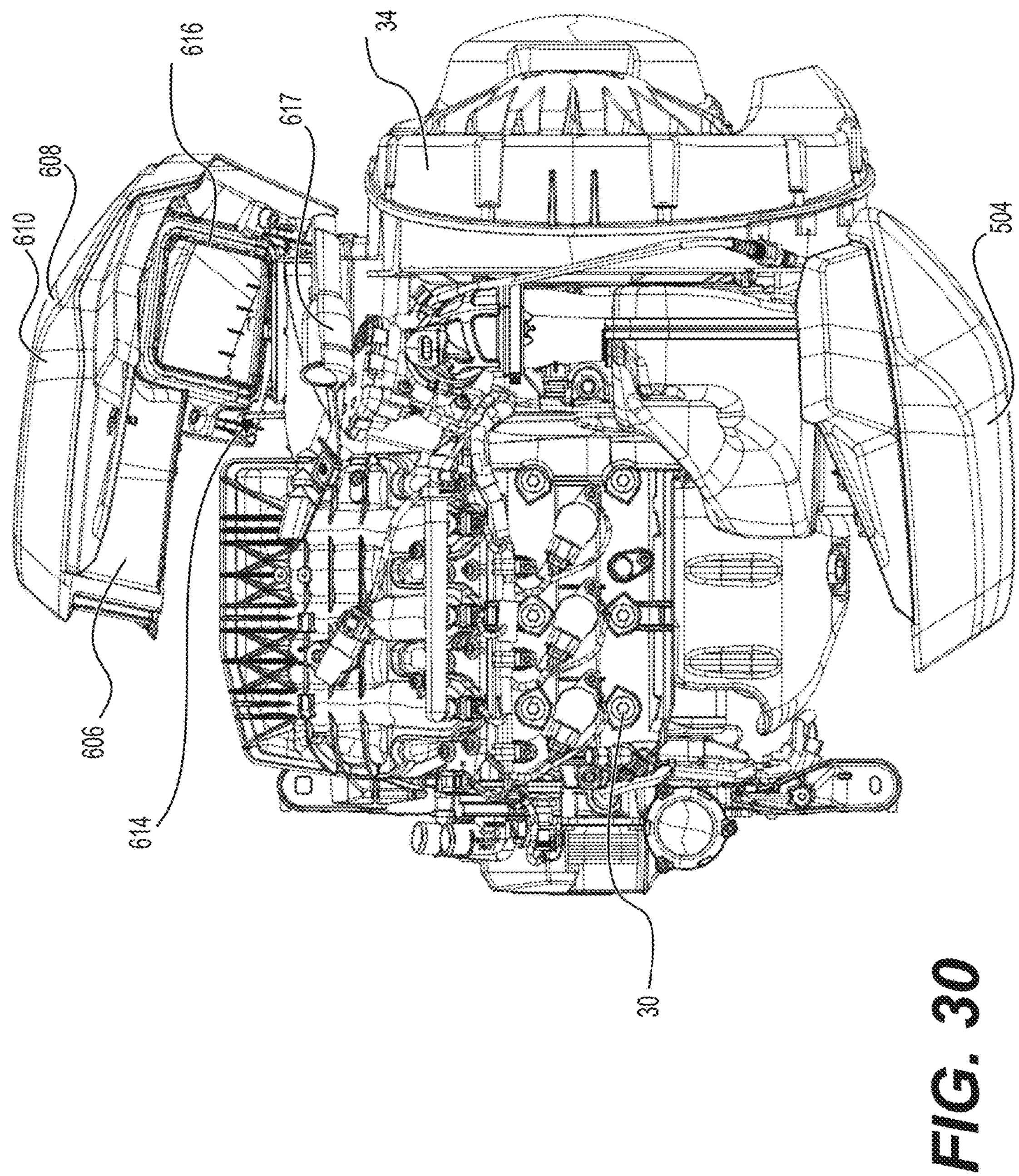
FIG. 30 is a top plan view of the engine and CVT air intake system in which the CVT air duct is in an open position.

As shown in FIGS. 29 and 30, the CVT air duct 610 is openable to access one or more engine components. More particularly, in this implementation, the CVT air duct 610 is pivotable between a closed position and an open position to provide access to an oil dipstick 615 and a funnel 617. The oil dipstick 615 is used for determining the level of oil in an oil tank 360 of a lubrication system of the engine 30 as will be described in more detail below. The funnel 617 is used for filling the fuel tank 60 with fuel (e.g., from a fuel can) and, when stored, is held by a clip to an outer side of the CVT housing 150. The funnel 617 is selectively removable from the clip. In addition, in its open position, the air filter 384 can be visually inspected. A retaining bracket 612 holds the air filter 384 in place across the air inlet 380 and, in the open position of the CVT air duct 610, can be removed from the conduit 161 of the CVT housing 150 (e.g., by unscrewing thereof) in order to replace the air filter 384. A sealing member (not shown), more particularly an O-ring, is provided around the air inlet 380. The retaining bracket 612 and the conduit 161 are sized and shaped such that they compress the O-ring when assembled, thereby ensuring the seal around the engine air filter 384, although it will be appreciated that various alternative ways of ensuring a seal around the filter 384 are available.

The CVT air duct 610 pivots about a hinge 614 (FIG. 30) to pivot relative to the air inlet 380 of the CVT housing 150 (or 150'). In this implementation, the hinge 614 is established between the CVT air duct 610 and the CVT housing 150. As the CVT air duct 610 is pivoted about the hinge 614, from the closed position to the open position, the air outlet 616 of the CVT air duct 610 pivots away from the air inlet 380 of the CVT housing 150. In this implementation, in order to move the CVT air duct 610 from its closed position to its open position, a quarter-turn fastener 618 (FIG. 29) provided on an outer side of the CVT air duct 610 is disengaged from the CVT housing 150 to unlock the CVT air duct 610 from the CVT housing 150. The CVT air duct 610 can then be pivoted back to its closed position and the quarter-turn fastener 618 engaged with the CVT housing 150 in order to lock the CVT air duct 610 to the CVT housing 150. The CVT air duct 610 is thus pivoted between its open and closed positions toollessly (i.e., without using any tools).

The CVT air duct 610 may be entirely removable in other implementations. Moreover, in other implementations, other engine components (i.e., components associated with the engine 30 and the vehicle 10") may be accessible when the CVT air duct 610 is in the open position. For example, any of a battery, a coolant reservoir, an oil filter, spark plugs, injectors, fuses and a diagnostic connector may be accessible in other implementations by moving the CVT air duct 610 to the open position.

In this implementation, the CVT air duct 610 is formed separately from the engine air duct 420.

Figure 5E:
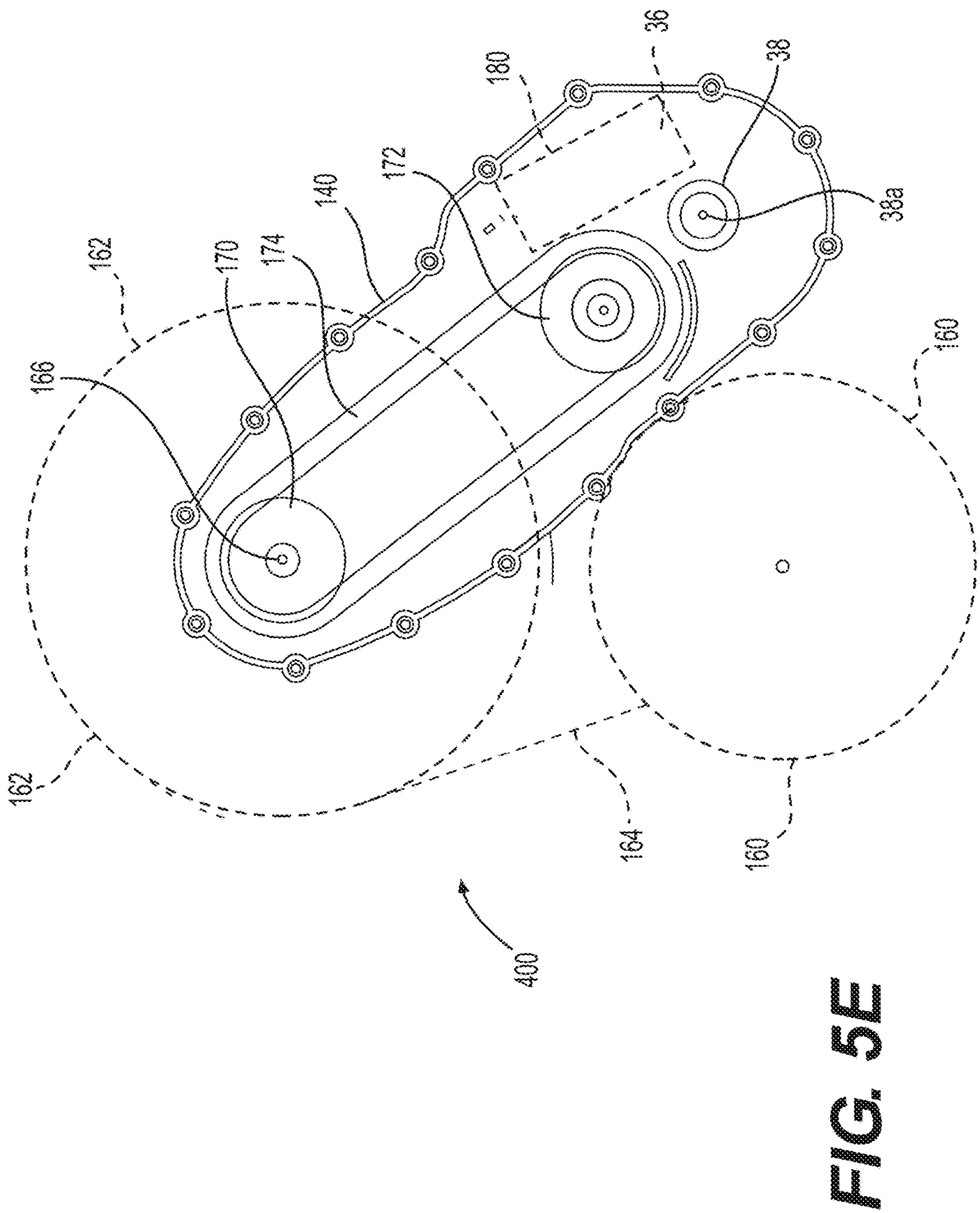
FIG. 5E is a schematic front elevation view of the transfer case, CVT, gear selection assembly and driveshaft of the powertrain of FIG. 4A.
Figure 6A:
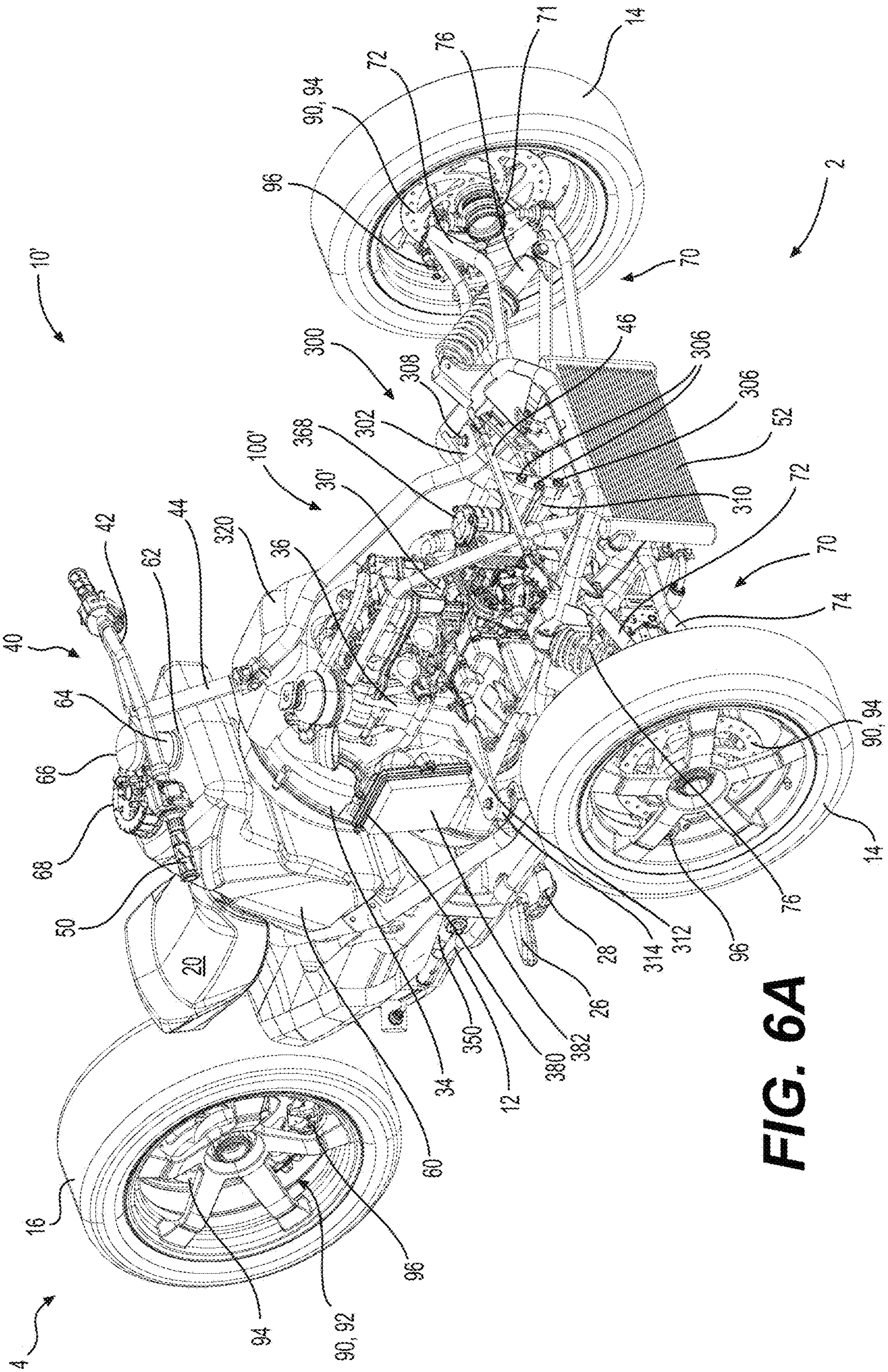
FIG. 6A is a is a perspective view, taken from a front, top and right side, of another three-wheeled straddle-seat vehicle in accordance with an implementation of the present technology with the fairings thereof being removed for clarity.
Figure 6B:
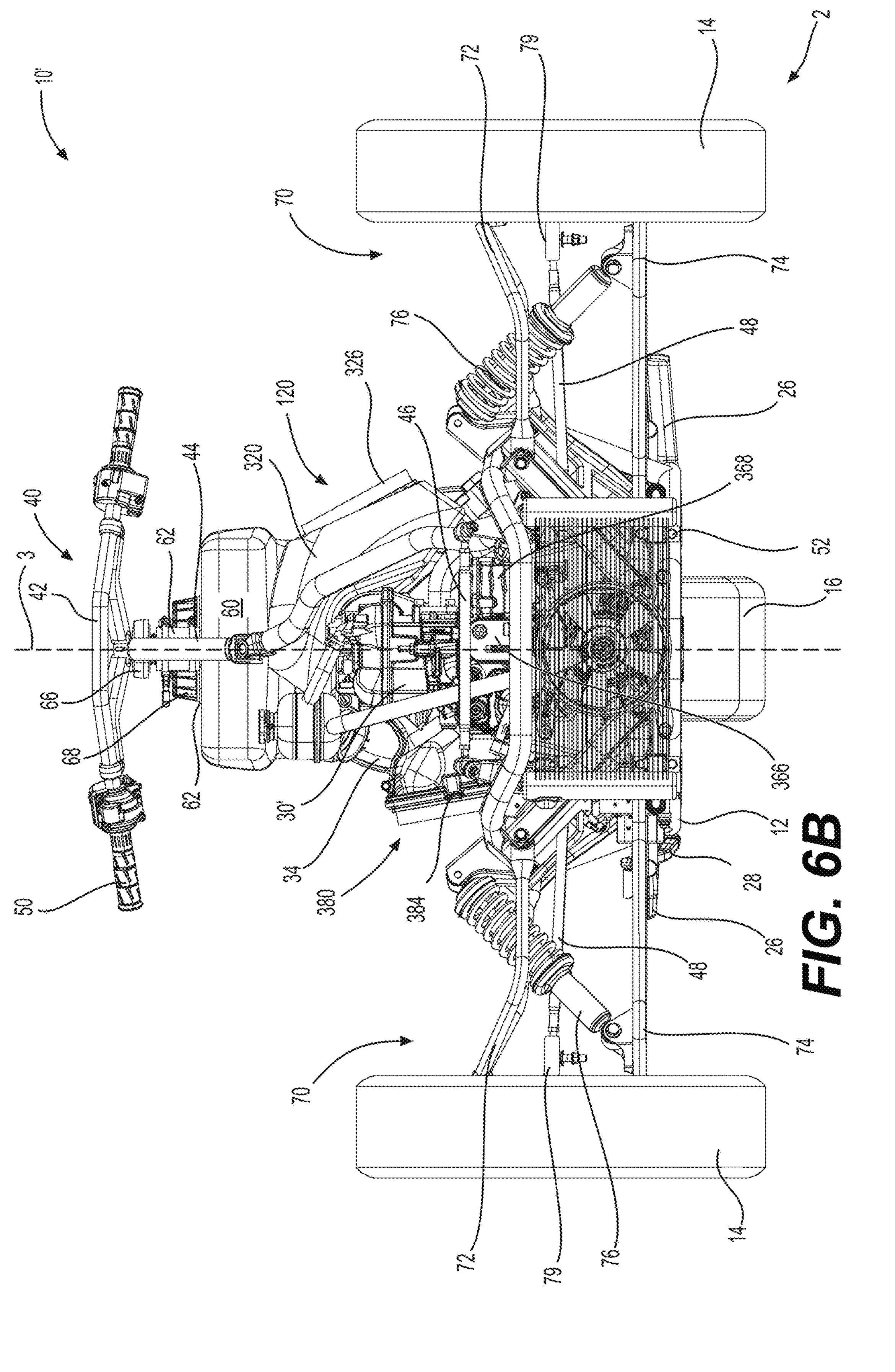
FIG. 6B is a front elevation view of the vehicle of FIG. 6A.

With reference now to FIG. 5E, the transfer case 36 includes an input sprocket 170, an output sprocket 172, and a chain 174 enclosed by the transfer case housing 140. The output sprocket 172 is operatively connected to the input sprocket 170 by the chain 174. It is also contemplated that the output sprocket 172 could be driven by the input sprocket 170 via a belt or a gear train. The input sprocket 170 is disposed coaxially with the secondary pulley 162 and forwardly thereof. The input sprocket 170 is mounted to the front end of the shaft 165 (FIG. 5C) so as to be driven by the secondary pulley 162. The output sprocket 172 is disposed vertically below the input sprocket 170 and laterally offset toward the left side thereof. As can be seen in FIGS. 5A and 5C, the transfer case housing 140 includes a front cover 176 that is bolted to the engine 30 and a rear cover 178 that is bolted to the front cover 152 of the CVT housing 150. The rear cover 178 has a forwardly extending rim that is bolted to a rearwardly extending rim of the front cover 176. The rear cover 178 defines an upper opening 184 (FIG. 5C) for receiving the shaft 165 and a lower opening 182 (FIGS. 5B and 5C) for receiving a front end of the driveshaft 38.

The output sprocket 172 selectively engages the driveshaft 38 via the gear selection assembly 180 (shown schematically in FIG. 5E) for rotating the driveshaft 38 and thereby the rear wheel 16. The gear selection assembly 180 is disposed inside the transfer case housing 140 in the illustrated implementation of the vehicle 10. It is however contemplated that the gear selection assembly 180 could be disposed outside the transfer case housing 140.

The front end of the driveshaft 38 is enclosed by the transfer case housing 140 and is splined to enable the gear selection assembly 180 to engage the driveshaft 38 for rotating the driveshaft 38. The driveshaft 38 extends longitudinally and rearwardly out of the opening 182 (FIGS. 5B and 5C) in the transfer case housing 140 towards the rear wheel 16.

Still referring to FIG. 5E, the gear selection assembly 180 causes selective engagement of the driveshaft 38 with the output sprocket 172 based on a gear selection operator (not shown). In the illustrated implementation of the vehicle 10, the gear selection operator is in the form of a paddle disposed near the left hand grip of the handlebar 42. The gear selection operator allows selection of one a forward gear, reverse gear and a neutral gear. It is contemplated that the gear selection operator could be in the form of a knob, a switch, one or more buttons, and the like. When the forward gear is selected, the output sprocket 172 engages the driveshaft 38 so as to rotate the driveshaft 38 in the same rotational direction as the output sprocket 172. When the reverse gear is selected, the output sprocket 172 engages the driveshaft 38 via an idler gear (not shown) so as to rotate the driveshaft 38 in the opposite direction as the output sprocket 172. When the neutral gear is selected, the output sprocket 172 is disengaged from the driveshaft 38. The gear selection assembly 180 therefore comprises a combination of gears, slidable sleeves, and the like for causing selective engagement of the driveshaft 38 by the output sprocket 172.

Figure 4A:
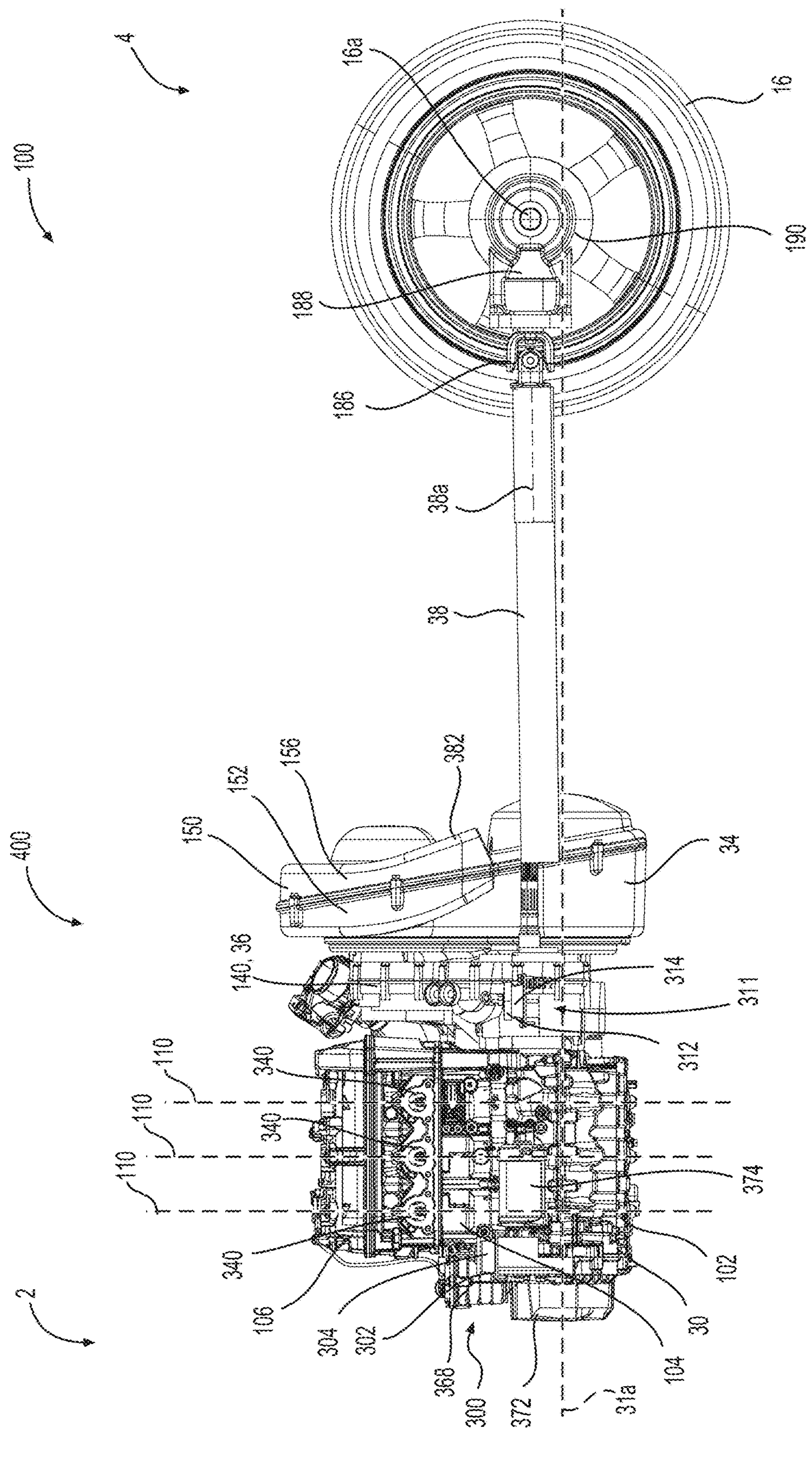
FIG. 4A is a left side elevation view of the powertrain, engine mounting assemblies, and rear wheel of the vehicle of FIG. 1A.
Figure 4B:
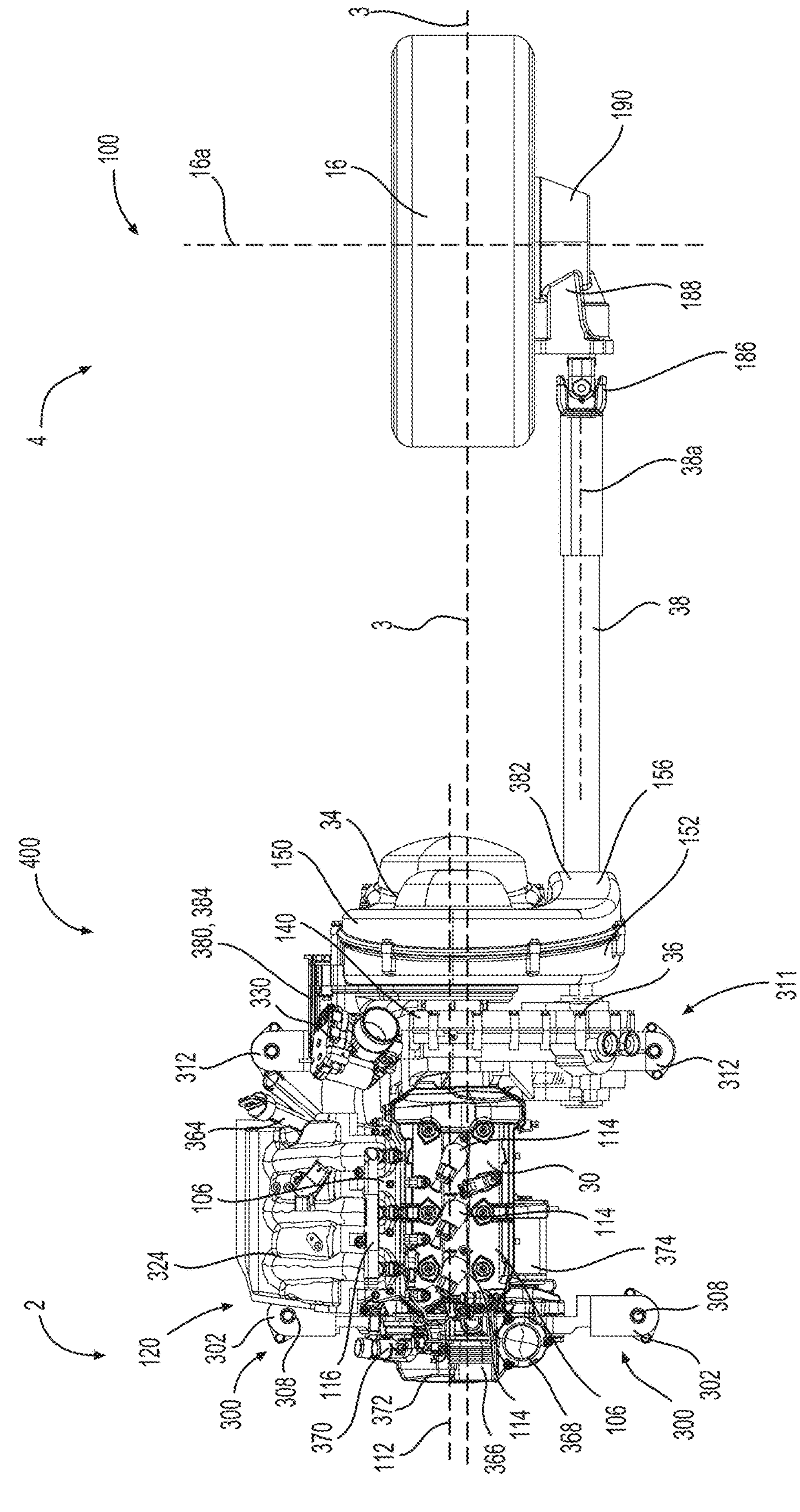
FIG. 4B is a top plan view of the powertrain, engine mounting assemblies, and rear wheel of FIG. 4A.

Referring now to FIGS. 4A and 4B, the driveshaft 38 extends longitudinally on a left side of the longitudinal centerplane 3. The rear end of the driveshaft 38 is connected via a universal joint 186 to a pinion 188. The pinion 188 engages a bevel gear 190 fixed to the hub of the rear wheel 16. It is contemplated that the universal joint 186 could be enclosed inside a flexible boot to prevent entry of dirt and debris into the joint. The universal joint 186 allows the rear end of the driveshaft 38 to drive the rear wheel 16 without inhibiting motion of the rear wheel 16 about the rear suspension assembly 80 as the vehicle 10 moves over uneven terrain. It is contemplated that the universal joint 186 could be connected to the front end of the driveshaft 38 instead of the rear end thereof. The pinion 188 transmits rotation of the driveshaft 38 about a generally longitudinal axis 38*a* to the rear wheel 16 which rotates about a generally lateral axis 16*a*.

With reference to FIG. 1B, the driveshaft 38 is disposed vertically higher than the footrests 26 when the vehicle 10 is placed on level ground with no driver, passengers, or cargo. With reference to FIG. 4A, a central rotational axis 38*a* of the driveshaft 38 is disposed vertically higher than a central rotational axis 31*a* of the engine output shaft 32 when the vehicle 10 is placed on level ground with no driver, passengers, and/or cargo.

It is contemplated that the driveshaft 38 could be omitted and the output sprocket 172 of the transfer case 36 could be connected to the rear wheel 16 via a chain or belt instead of the driveshaft 38.

In the illustrated implementation, the CVT 34, the transfer case 36 and the gear selection assembly 180 form a transmission assembly 400 of the vehicle 10. It is contemplated that the gear selection assembly 180 could be omitted from the vehicle 10. It is also contemplated that the vehicle 10 could have a transmission assembly 400 in which the CVT 34, the transfer case 36 and the gear selection assembly 180 are replaced by a discrete gear transmission.

Mounting of the Powertrain to the Vehicle Frame

The mounting of the powertrain 100 to the vehicle frame 12 will now be described with reference to FIGS. 1H, 4A, 4B and 10A.

As can be seen in FIG. 1H, a front portion of the engine 30 is mounted to the front left and right engine mounting brackets 250 of the vehicle frame 12 by a front left mounting assembly 300 and a front right mounting assembly 300 respectively.

Figure 4C:
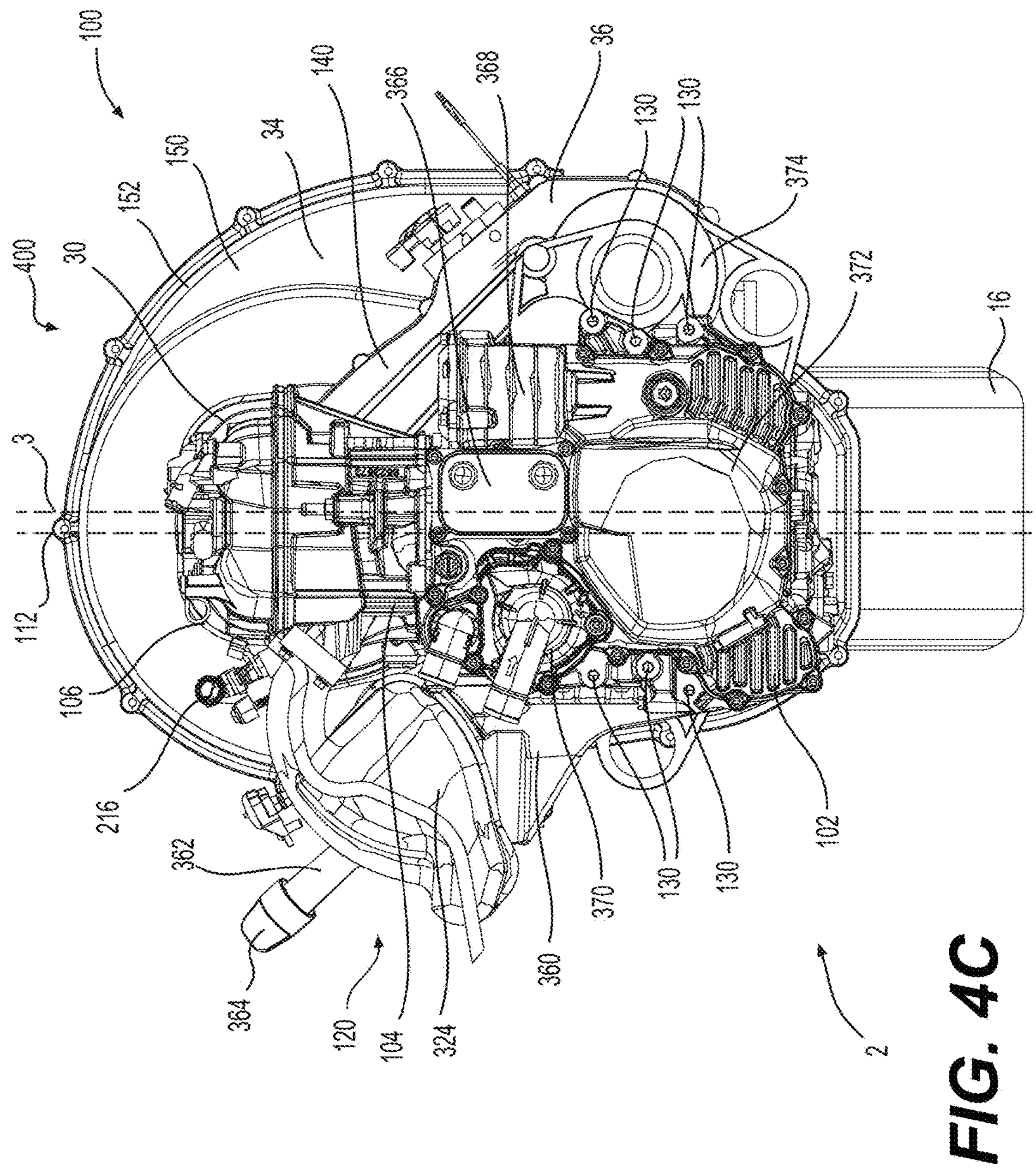
FIG. 4C is a front elevation view of the powertrain and rear wheel of FIG. 4A.

As can be seen in FIG. 4C, three left boltholes 130 are defined in the engine 30 in a front left portion of the crankcase 102 for connection to the left bracket 250 and three right boltholes 130 are defined in a front right portion of the crankcase 102 for connection to the right bracket 250.

Figure 10A:
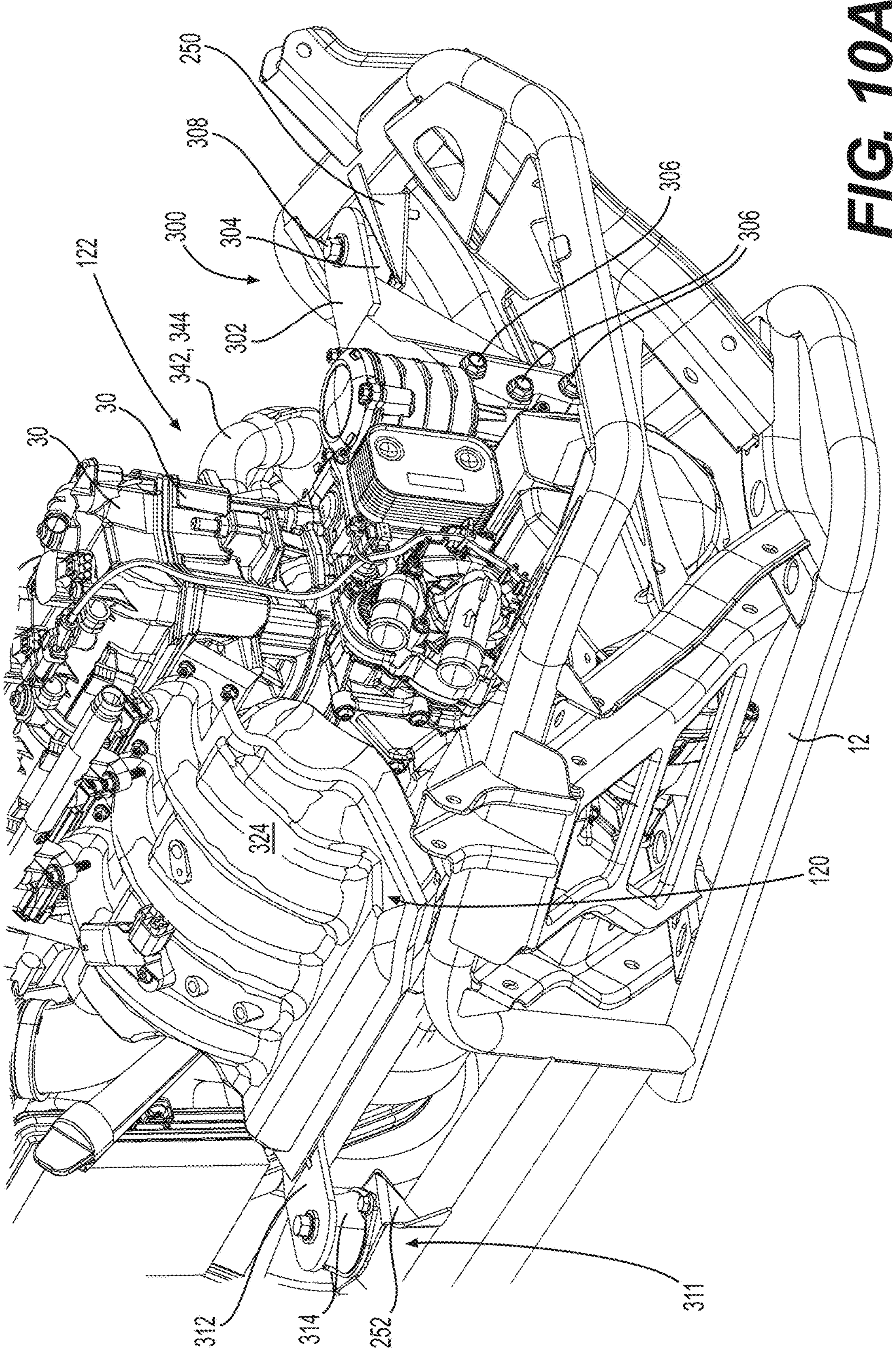
FIG. 10A is a close-up perspective view, taken from a front, top and right side, of a portion of the vehicle of FIG. 1A showing the mounting of the engine and transmission assembly to the vehicle frame.
Figure 10B:
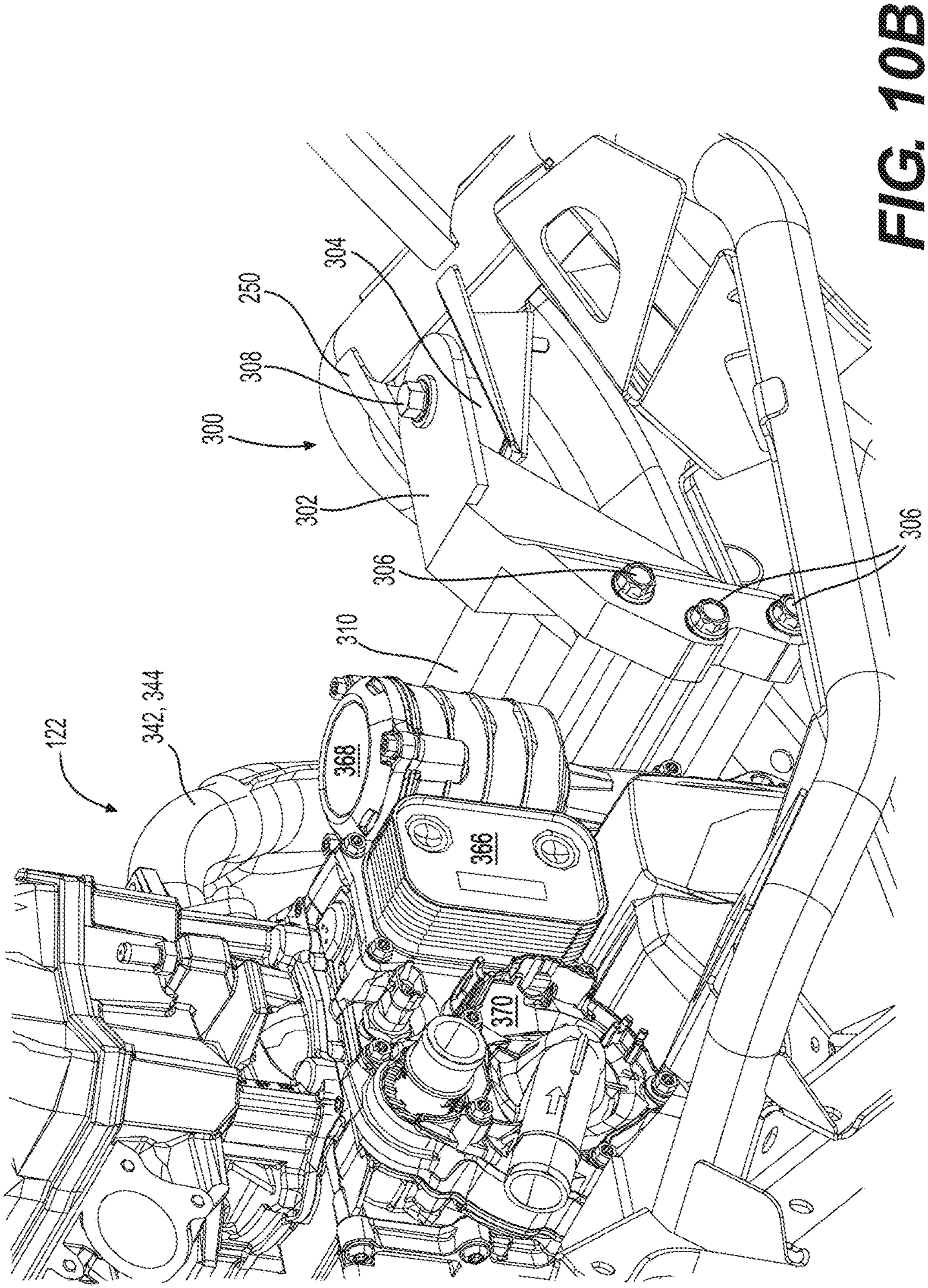
FIG. 10B is a close-up perspective view, taken from a front, top and right side, of a portion of the vehicle of FIG. 6A showing the mounting of the engine to the vehicle frame.

With reference to FIG. 10A, the front left mounting assembly 300 comprises a bracket 302, a vibration damping element 304, three engine bolts 306 and a frame bolt 308. The bracket 302 has a horizontally extending flange with a central bolthole and a vertical flange (not shown) having three boltholes corresponding to the left boltholes 130 of the engine 30. The bracket 302 is made of metal or other suitable material. The vibration damping element 304 is in the form of a ring made of rubber. It is however contemplated that the vibration damping element 304 could be made of other suitable material. The vibration damping element is commonly referred to as a “motor mount”.

The vibration damping element 304 is sandwiched between the engine mounting bracket 250 and the bracket 302 in order to isolate the engine 30 from the vehicle frame 12. The frame bolt 308 connects the vibration damping element 304 to the bracket 302 and the vibration damping element 304 is connected to the front left bracket 250 of the vehicle frame 12 by other bolts (not shown).

The engine 30 is disposed in the engine cradle 290 such that the left boltholes 130 are aligned with corresponding boltholes of the vertical flange of the bracket 302. The engine bolts 306 are inserted through the aligned boltholes of the bracket 302 and the left boltholes 130 of the engine 30 to secure the engine 30 to the vehicle frame 12.

The front right mounting assembly 300 comprises a bracket 302, a vibration damping element 304, three engine bolts 306 and a frame bolt 308 similar to the corresponding components of the front left mounting assembly 300. The front right mounting assembly 300 secures the engine 30 to the front right bracket 250 of the vehicle frame 12 in the same manner as described above for the front left assembly 300. As such, the front right mounting assembly 300 will not be described herein in detail.

It is contemplated that configuration of the left boltholes 130 on the left side of the crankcase 102 and/or the right boltholes 130 on the right side of the crankcase 102 could be different from that shown herein. It is also contemplated that the front portion of the engine 30 could be mounted to the vehicle frame 12 by a single bracket 250 disposed laterally centrally and a single mounting assembly 300 including a single vibration damping element 304 rather than the pair of left and right brackets 250 and the corresponding pair of left and right mounting assemblies 300 as shown herein.

With reference to FIGS. 1H, 4A and 4B, the left side of the transfer case housing 140 is connected to the rear left bracket 252 of the vehicle frame 12 using a bracket 312 and a vibration damping element 314 similar to the vibration damping element 304 described above. The vibration damping element 314 is disposed on the rear left bracket 252. The bracket 312 and the vibration damping element 314 form a rear left mounting assembly 311 which are secured to the rear left bracket 252 in the same manner as described above for the front left and right assemblies 300.

The right side of the transfer case housing 140 is connected to the rear right bracket 252 of the vehicle frame via a bracket 312 and a vibration damping element 314 of a rear right mounting assembly 311 similarly as described above for the left side of the transfer case housing 140, and as such will not be described again herein in detail.

In the illustrated implementation of the vehicle 10, the components of the powertrain 100, i.e., the engine 30, the CVT 34 and the transfer case 36, are all secured to the vehicle frame 12 via the four mounting points provided by the brackets 250, 252. It is contemplated that the CVT housing 150 and/or a rear portion of the engine 30 could be secured to the vehicle frame 12 instead of the transfer case housing 140. It is also contemplated that the rear portion of the engine 30 and/or the CVT housing 150 could be connected to the vehicle frame 12 in addition to the transfer case housing 140.

Air Intake System for Engine

The air intake system 120 connected to the engine 30 will now be described with reference to FIGS. 1A to 1C, and 11A to 11D.

As can be seen in FIG. 1C, the air intake system 120 includes an engine air intake conduit 320, a throttle body 322, and an airbox (also known as a plenum) 324. The engine air intake conduit 320 receives air from an air inlet 326 disposed on a left side of the cylinder block 104. An engine air filter 328 is disposed over the air inlet 326 to prevent dust and debris from entering the engine 30. The engine air intake conduit 320 extends upwardly and then rightwardly between the engine 30 and the CVT 34. On the right side of the engine 30, the engine air intake conduit 320 connects to a rear end of a cylindrical throttle body 322 located on the right side of the longitudinal centerplane 3. A throttle valve (not shown) disposed inside the throttle body 322 regulates the flow of air through the throttle body to the cylinders 108 of the engine 30. The throttle valve is operatively connected to a throttle actuator 330 in the form of an electric motor which is configured to control a position of the throttle valve based on a position of the throttle operator 112. The throttle actuator 330 controls the position of the throttle valve based in part on the position of the throttle operator 50. The front end of the throttle body 322 is connected via a conduit 323 to an inlet in the rear end of the airbox 324. As can be seen, the airbox 324 is disposed on the right side of the cylinder block 104. An air intake port (not shown) is defined in the right side of each cylinder 108. The airbox 324 has three outlets (not shown), each of which connects to the air intake ports of a corresponding cylinder 108. The air intake ports of the cylinders 108 define an engine air inlet 315 of the engine 30 (schematically illustrated at FIG. 17). When the engine 30 is operating, air flows consecutively through the air inlet 326, the engine air intake conduit 320, the throttle body 322, the conduit 323, and the airbox 324 to the cylinders 108 of the engine 30. Air thus flows from a left side of the longitudinal centerplane 3 to a right side of the longitudinal centerplane 3 as the engine air inlet 315 (defined by the air intake ports of the cylinders 108) is located on the right side of the longitudinal centerplane 3.

As can be seen, the air inlet 326 is facing leftwardly. In some implementations, as shown in FIGS. 11A to 11D, the air inlet 326 is connected to an engine air duct 420 to direct air from a front of the vehicle 10 into the air inlet 326. The engine air duct 420 is connected to the engine air intake conduit 320 such that an air outlet 422 of the engine air duct 420 connects to the air inlet 326. From the air inlet 326, the engine air duct 420 extends forwardly on a left side of the engine block 102 to a generally forwardly facing air inlet 424 through which air enters the air intake system 120.

As mentioned above, in the illustrated implementation, the engine air duct 420 is formed integrally with the CVT air duct 410. It is however contemplated that the engine air duct 420 could be formed separately from the CVT air duct 410.

Figure 14:
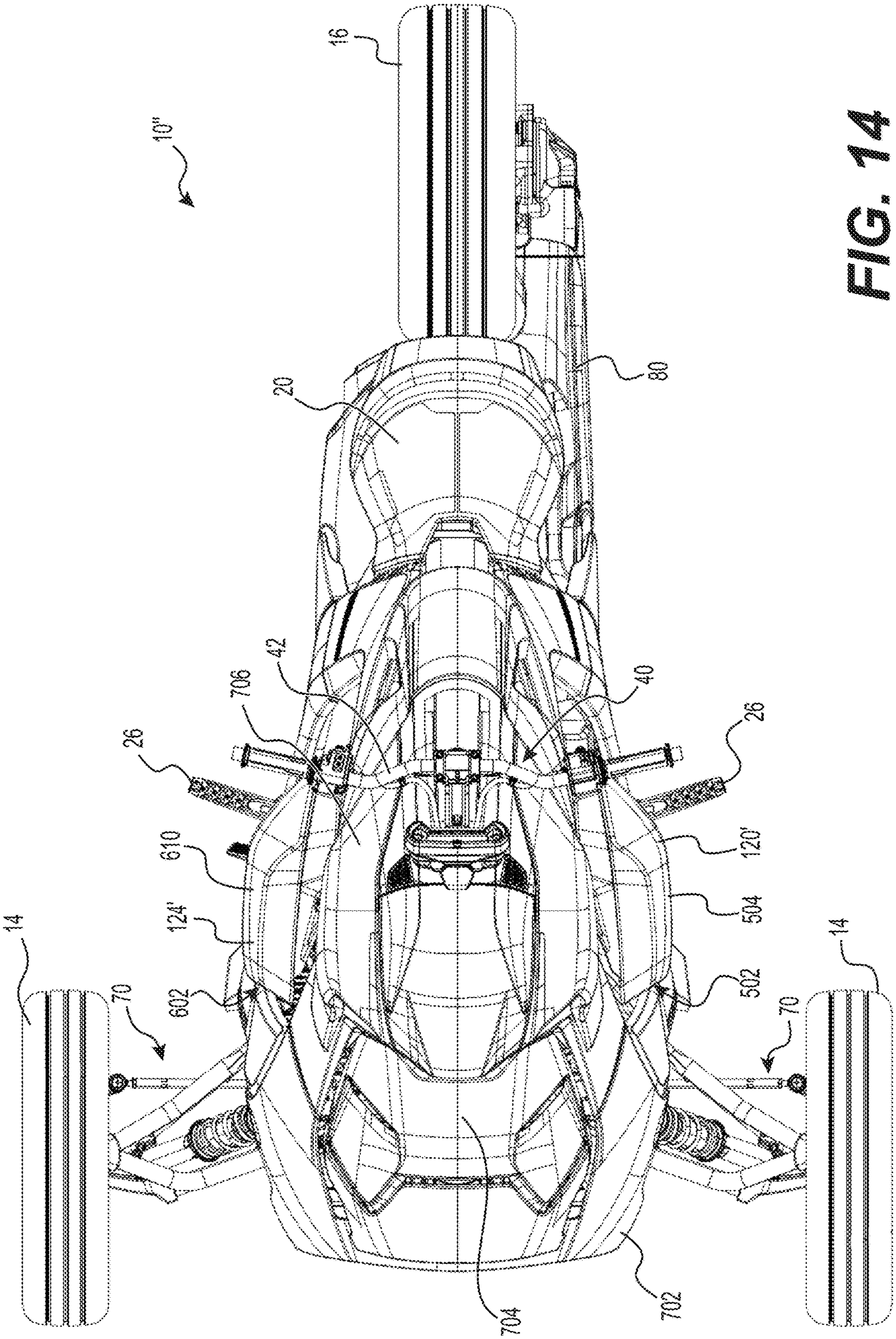
FIG. 14 is a top plan view of the vehicle of FIG. 12.
Figure 15:
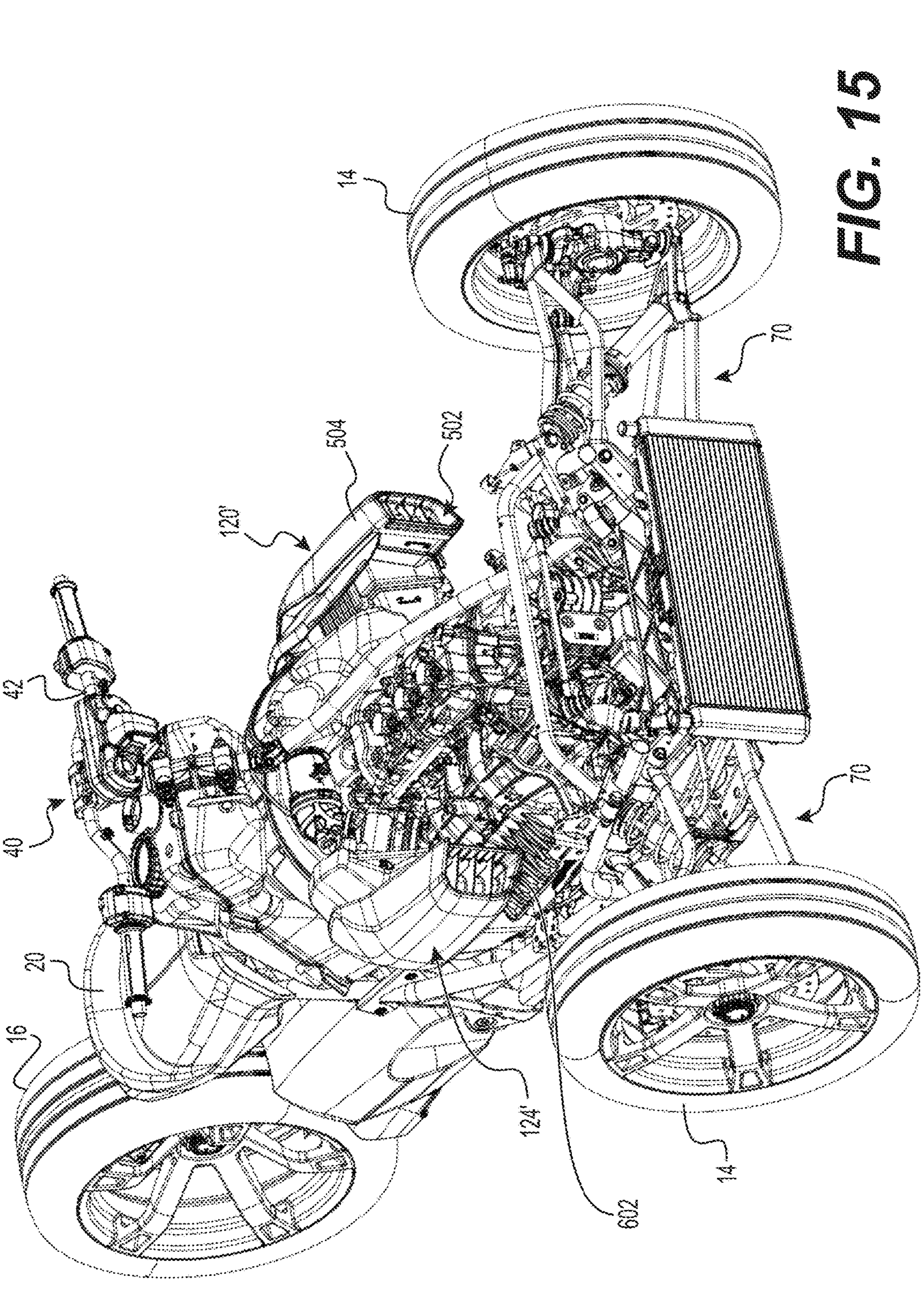
FIG. 15 is a perspective view, taken from a front, top and right side of the vehicle of FIG. 12 with certain panel members removed to expose the engine and other internal components of the vehicle.

Returning now to FIGS. 12 to 15, in the vehicle 10", air from a front of the vehicle 10" is directed into the engine air intake system 120'. In this implementation, the air intake system 120', which fluidly communicates with the engine air inlet 315, includes an engine air duct 504 (which replaces the engine air duct 420), a conduit 505 (which replaces the engine air intake conduit 320), as well as the throttle body 322, the conduit 323 and the airbox 324 discussed above. The air intake system 120' has an air inlet 502 defined by the engine air duct 504. It is contemplated that a separate component connected to the engine air duct 504 could define the air inlet 502 in other implementations. As shown in FIG. 14, the engine air duct 504 extends rearwardly from the air inlet 502 (i.e., the air duct 504 extends in a direction having a longitudinal rearward component).

As can be seen, the air inlet 502 faces generally forwardly. The air inlet 502 is said to face generally forwardly in that air from in front of the vehicle 10" can enter the air inlet 502 when the vehicle 10" is in motion and that a projection of the air inlet 502 onto a plane normal to a longitudinal axis of the vehicle 10" defines a surface area. The forwardly facing configuration of the air inlet 502 functions as a ram-air intake causing a static air pressure increase within the air intake system 120' as a result of the dynamic pressure created by forward motion of the vehicle. This results in higher volumetric flow and pressure to the engine 30.

As shown in FIG. 17, the air inlet 502 is located on the left side of the longitudinal centerplane 3 and partly on the left side of the engine 30. The air inlet 502 of the engine air intake system 120' and the air inlet 602 of the CVT air intake system 124 are thus disposed on opposite lateral sides of the longitudinal centerplane 3 and partly on opposite lateral sides of the engine 30.

With reference to FIGS. 18 to 21, the engine air duct 504 includes a base member 506 and an outer cover 508 that is connected to the base member 506. FIG. 22 shows the outer cover 508 with the base member 506 removed to expose the engine air filter 328. The outer cover 508 defines the air inlet 502 while the base member 506 defines an air outlet 511 of the engine air duct 504.

The outer cover 508 extends from a front end 507 defining the air inlet 502 to a rear end 509. The outer cover 508 has a convex outer side and a concave inner side facing laterally inward towards the base member 506. The outer cover 508 includes a grille 510 at the air inlet 502 to prevent oversized debris from entering the engine air intake system 120'. The grille 510 includes a plurality of generally horizontal slats 537 and a deflector 512 for removing at least some of the water entrained with air entering the engine air duct 504. More specifically, while entering the air inlet 502, air deflects around the deflector 512. This deflecting causes at least some of the water entrained with the air to be separated from the air that will continue to flow toward the engine 30.

Figure 22:
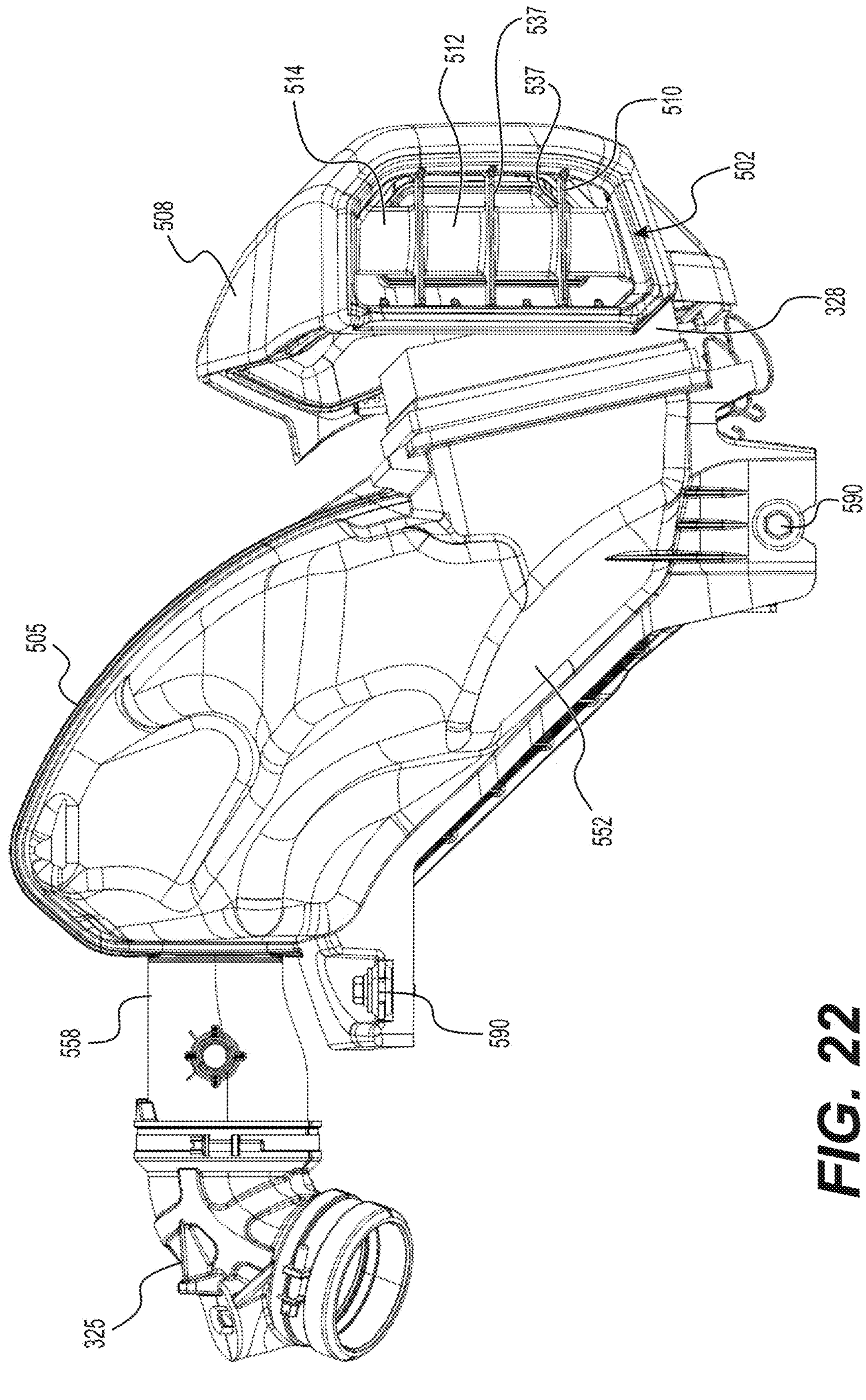
FIG. 22 is a front elevation view of the engine air intake system of FIG. 18 with a base member of an engine air duct removed for clarity.
Figure 23:
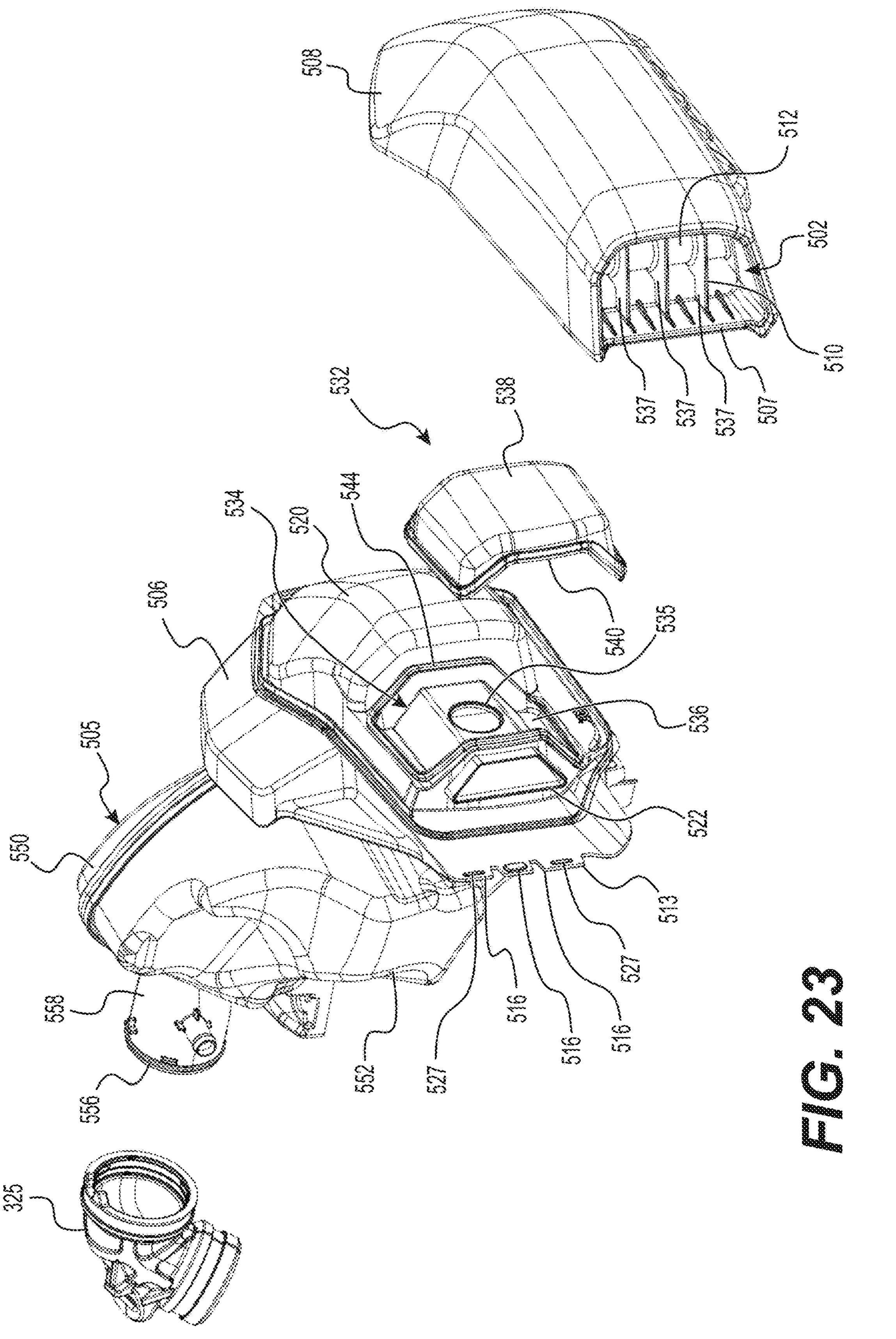
FIG. 23 is a partially exploded view, taken from a front, top and left side, of the engine air intake system of FIG. 18.

As shown in FIGS. 22 and 23, in this implementation, the deflector 512 extends generally vertically and has a rounded surface 514 facing frontwardly for promoting the smooth deflection of air. The deflector 512 is spaced apart from the lateral walls defining the air inlet 502 to allow air to deflect around both sides of the deflector 512.

Figure 24:
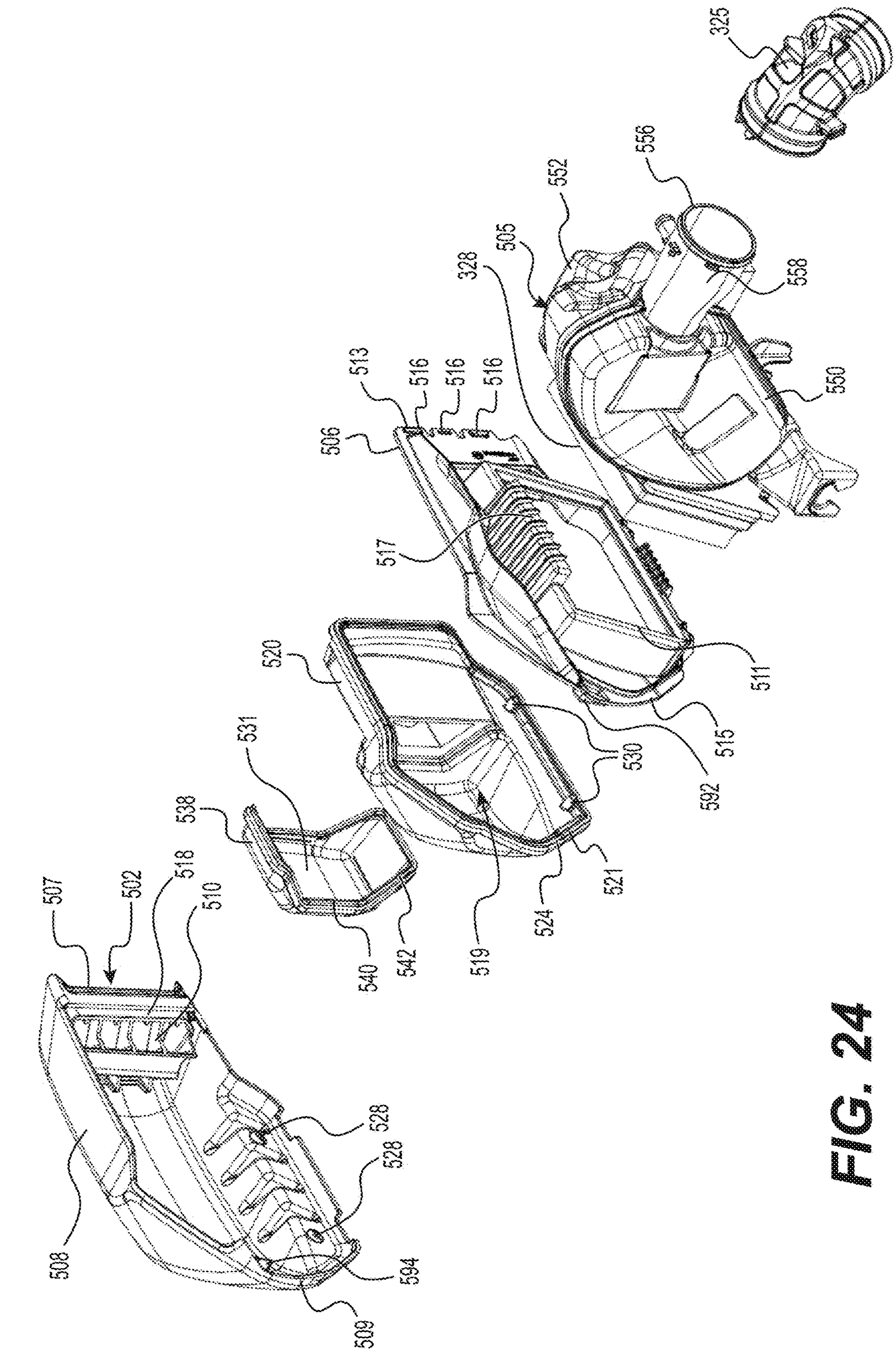
FIG. 24 is a partially exploded view, taken from a rear, top and right side, of the engine air intake system of FIG. 18.
Figure 25:
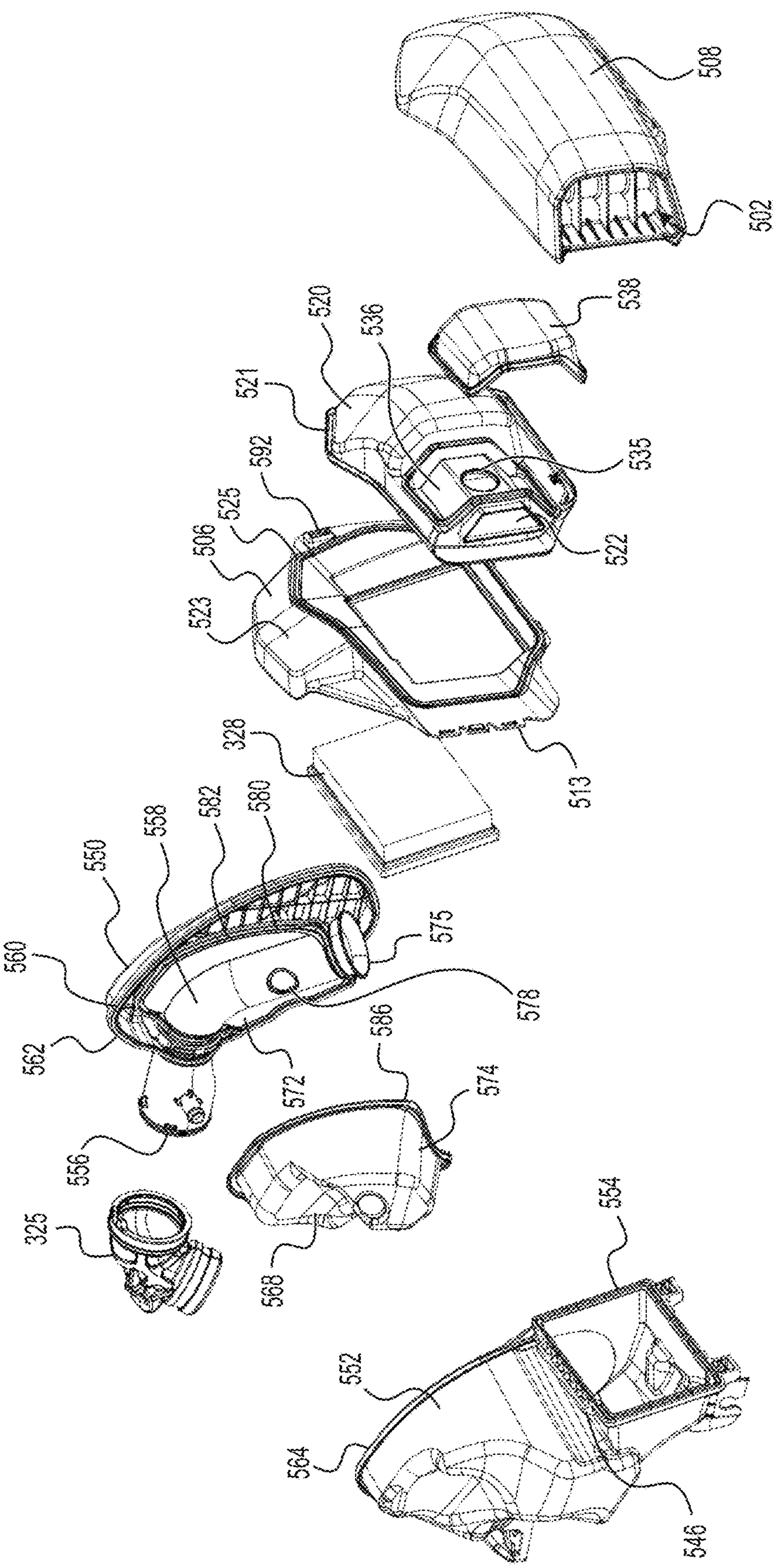
FIG. 25 is an exploded view, taken from a front, top and left side, of the engine air intake system of FIG. 18.

The base member 506 extends from a front end 513 to a rear end 515. The front end 513 of the base member 506 has tabs 516 for interlocking with the outer cover 508. More specifically, the front end 513 of the base member 506 is configured to be received in a groove 518 formed at the front end 507 of the outer cover 508 (FIG. 24). The tabs 516 are interlocked with projections (not shown) formed within the groove 518 via openings 527 provided on the tabs 516. In addition, as shown in FIGS. 24 and 25, the base member 506 has a clip base 592 adjacent the rear end 515 for receiving a clip 594 (partially shown in FIG. 24) protruding from an inner side of the outer cover 508. The clip 594 latches onto the clip base 592 for retaining a rear portion of the outer cover 508 to the base member 506. The air outlet 511 defined by the base member 506 is shaped to match a shape of the engine air filter 328. Notably, in this implementation, the air outlet 511 is generally rectangular. An engagement member 517 is provided at the air outlet 511 to engage the conduit 505 as will be described in more detail below.

Figure 21:
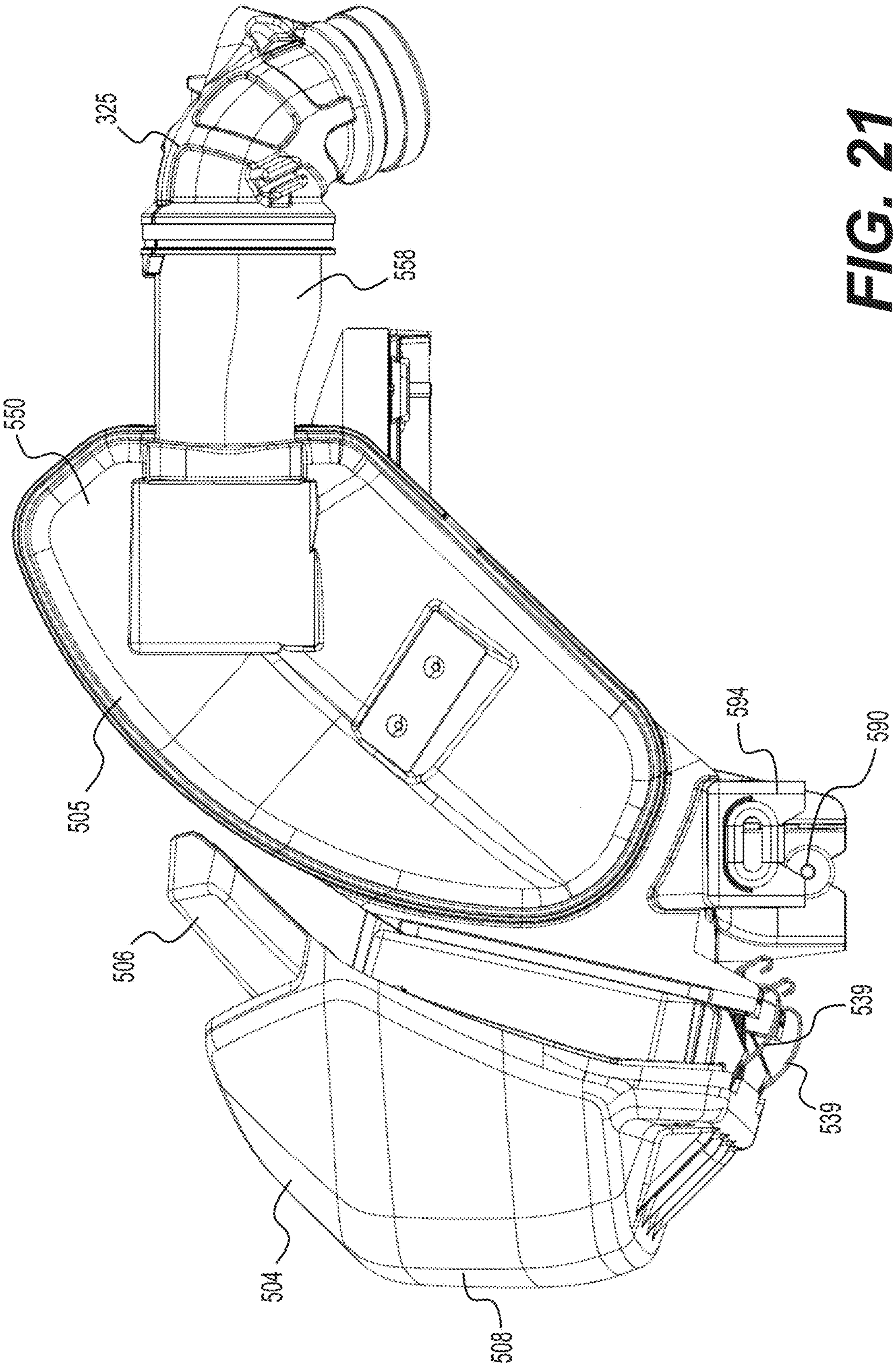
FIG. 21 is a rear elevation view of the engine air intake system of FIG. 18.

The base member 506 is removably connected to the conduit 505 via fasteners 539 (FIGS. 21, 29). In this implementation, the fasteners 539 are clips that are attached to a bottom edge of the base member 506. As will be discussed in more detail below, by detaching the clips 539 from the conduit 505, the base member 506 can be removed from engagement with the conduit 505.

As shown in FIGS. 23 and 24, the engine air duct 504 also includes an inner conduit 520 enclosed between the base member 506 and the outer cover 508. The inner conduit 520 fluidly communicates the air inlet 502 to the air outlet 511. The inner conduit 520 defines an air inlet 522 for receiving air therein and an air outlet 519 adjacent the air outlet 511 of the base member 506. The inner conduit 520 has an inner peripheral edge 521 that is supported by the base member 506. More specifically, an outer surface 523 of the base member 506, facing the inner conduit 520, has a projecting edge 525 (FIG. 25). The projecting edge 525 is shaped and dimensioned to be received within a channel 524 at the inner peripheral edge 521 of the inner conduit 520 (FIG. 24). A sealing member (e.g. a gasket, such as an O-ring) may be provided at the inner peripheral edge 521 to ensure an air-tight seal between the inner conduit 520 and the base member 506.

Figure 20:
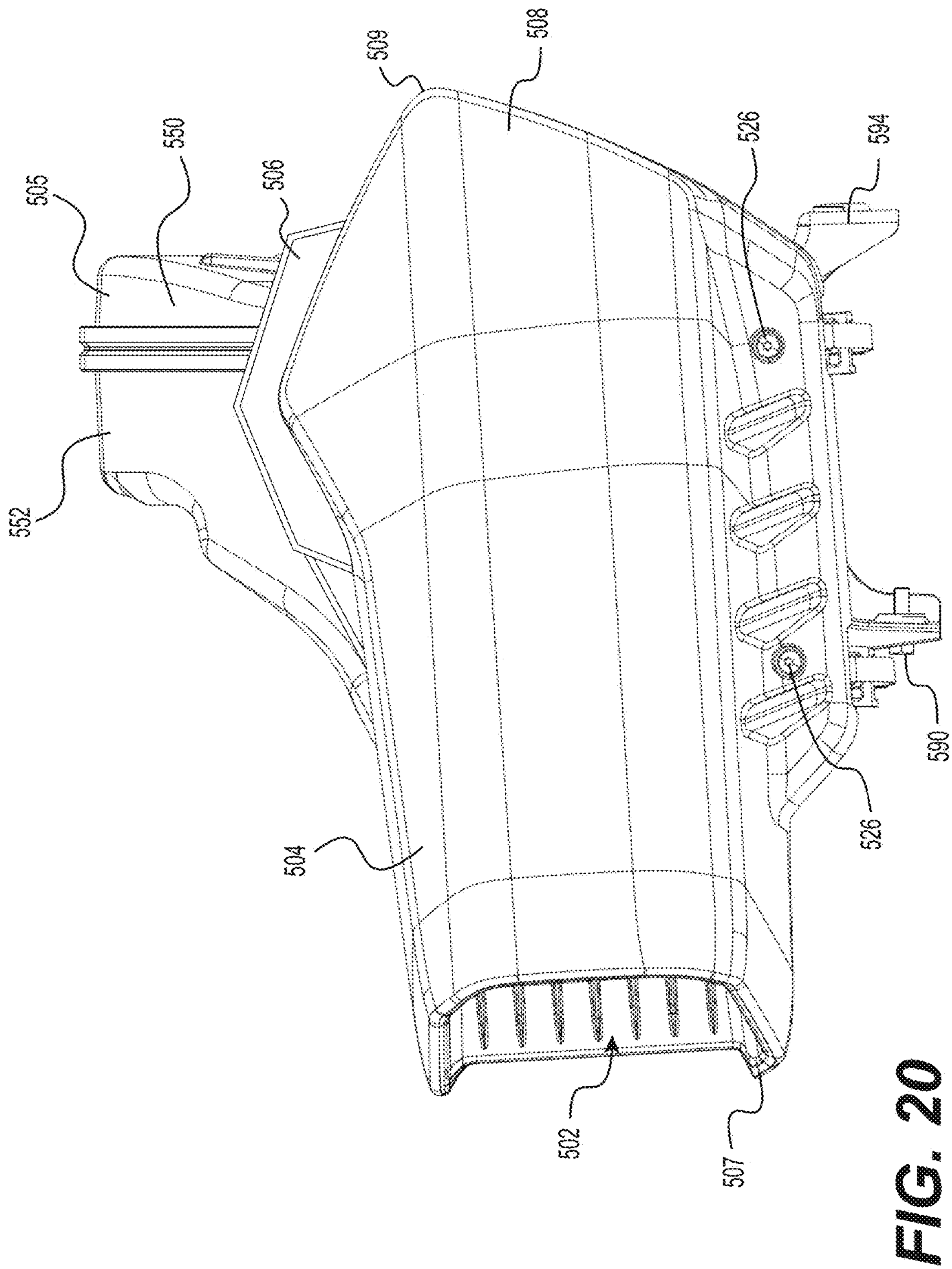
FIG. 20 is a left side elevation view of the engine air intake system of FIG. 18.

In use, the outer cover 508 is secured to the inner conduit 520 via fasteners 526 (FIG. 20). Notably, with particular reference to FIG. 24, in this implementation, the fasteners 526 are bolts that traverse openings 528 at a lower portion of the outer cover 508 to engage threaded apertures 530 at a lower portion of the base member 506.

Furthermore, in this implementation, the engine air duct 504 includes a Helmholtz resonator 532 for attenuating sounds of a given band of frequencies. The Helmholtz resonator 532 is located on an outer side of the inner conduit 520. Notably, in this implementation, the resonator 532 includes a chamber 534 defined in part by a pocket 536 provided on the outer side of the inner conduit 520. The resonator 532 also includes a resonator cover 538 that is attached to the inner conduit 520 to cover the pocket 536 and thus defines the chamber 534 between the pocket 536 and an inner surface 531 of the resonator cover 538. The resonator cover 538 is disposed between the inner conduit 520 and the outer cover 508. An opening 535 defined in the pocket 536 of the inner conduit 520 fluidly communicates the air inlet 502 with the chamber 534. The chamber 534 has a specified volume that determines the band of frequencies that is attenuated by the Helmholtz resonator 532. In this implementation, a periphery 540 of the resonator cover 538 includes a projecting edge 542 (FIG. 24) that is received within a channel 544 (FIG. 23) surrounding the pocket 536. The resonator cover 538 is secured in place by an interlocking fit between the projecting edge 542 and the channel 544. In some cases, the resonator cover 538 may be secured in place merely by being abutted by the outer cover 508. In yet other cases, an adhesive may also secure the resonator cover 538 to the inner conduit 520.

Figure 16:
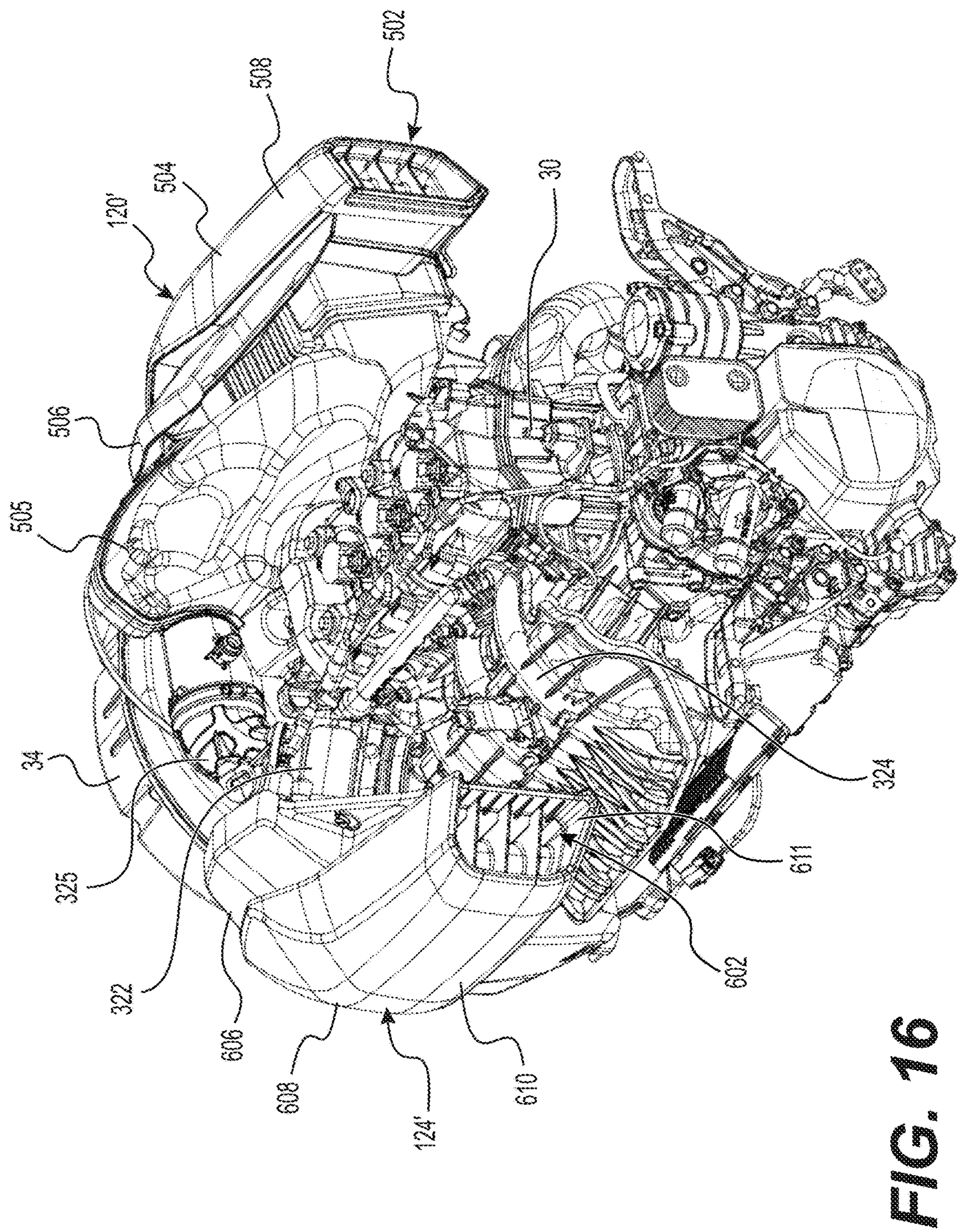
FIG. 16 is a perspective view, taken from a front top, and right side of the engine, the CVT air intake system and the engine air intake system of the vehicle of FIG. 12.

The conduit 505 extends generally transversely and fluidly communicates the engine air duct 504 to the engine air inlet 315. As shown in FIGS. 16 and 17, the conduit 505 is located in front of the CVT 34, above the transfer case 36 and extends laterally across the longitudinal centerplane 3 from the left side to the right side of the longitudinal centerplane 3.

Figure 26:
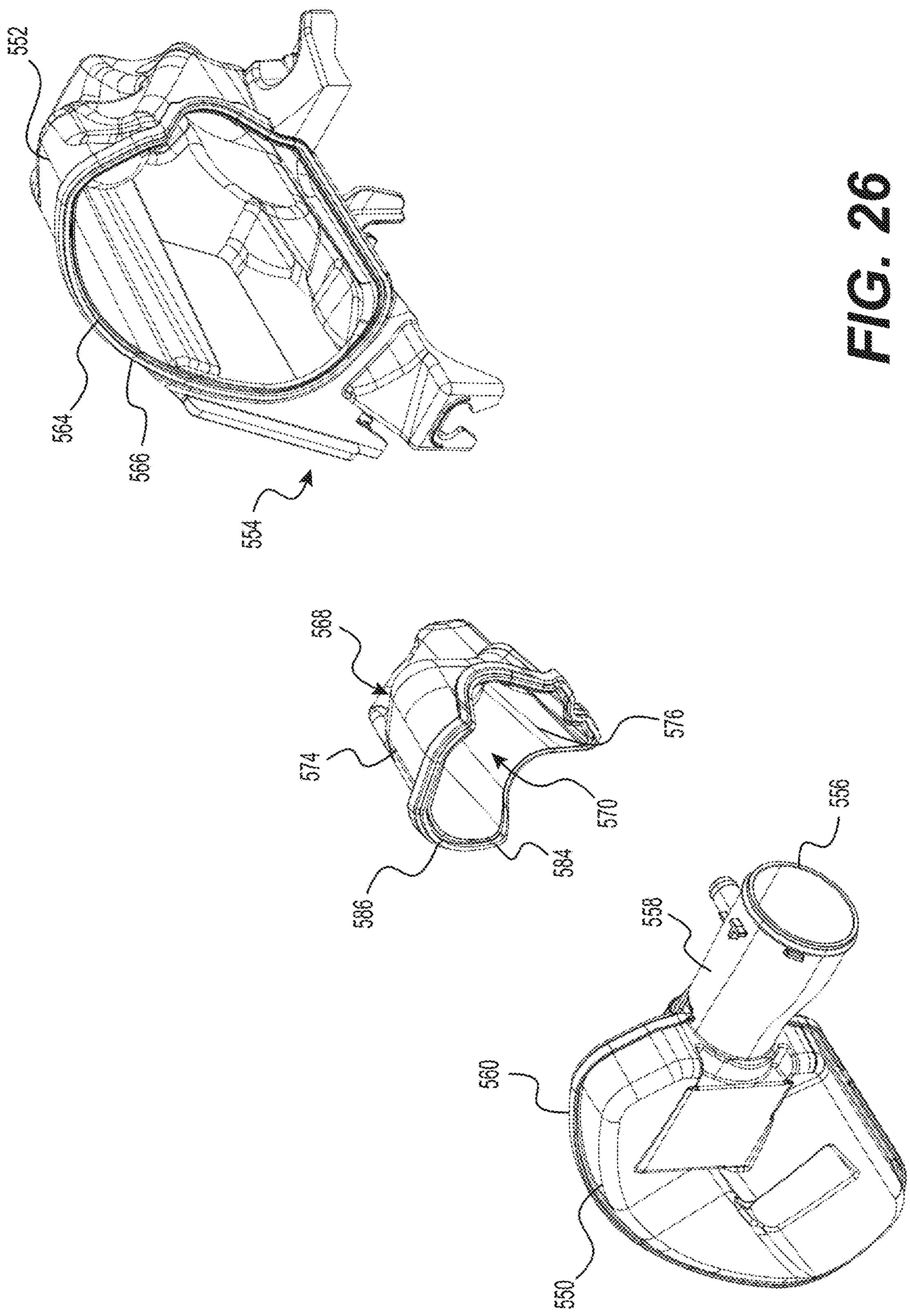
FIG. 26 is an exploded view, taken from a rear, top and right side, of a transversely-extending conduit of the engine air intake system of FIG. 18.

As shown in FIGS. 25 and 26, the conduit 505 includes a base member 550 and an outer cover 552 that is connectable to the base member 550. The outer cover 552 is fastened to the transfer case 36 via fasteners 590 (FIG. 22). Moreover, the outer cover 552 is fastened to the front cover 152 of the CVT housing 150 via a clip 594 (FIGS. 20, 21). The front cover 152 of the CVT housing 150 has a clip-receiving member (not shown) for receiving and latching onto the clip 594 and thus the outer cover 552. The outer cover 552 defines the air inlet 554 while a tubular passageway 558 (described in more detail below) defines an air outlet 556 of the conduit 505. The air inlet 554 and the base member 506 combine to support the engine air filter 328 such that the engine air filter 328 covers the air inlet 554 when installed. In particular, in this implementation, the air inlet 554 is generally rectangular to match a rectangular shape of the engine air filter 328. Moreover, a periphery of the air inlet 554 is smaller than a periphery of the engine air filter 328 to prevent the engine air filter 328 from entering the air inlet 554. A retaining protrusion 546 located at the top of the air inlet 554 is configured for engaging the engagement member 517 of the base member 506 when the base member 506 is attached to the conduit 505. More specifically, an underside of the engagement member 517 has a recess for receiving the retaining protrusion 546 therein. A sealing member (not shown), more particularly an O-ring, is provided around the air inlet 554. The outer cover 552 and the base member 506 are sized and shaped such that they compress the O-ring when assembled, thereby ensuring the seal around the engine air filter 328, although it will be appreciated that various alternative ways of ensuring a seal around the filter 328 are available.

In use, the engine air duct 504 covers the engine air filter 328. However, as shown in FIGS. 29 and 30, the engine air duct 504 is openable to access the engine air filter 328. More specifically, the engine air duct 504 is selectively removable for providing access to the engine air filter 328. Notably, as shown in FIG. 21, the engine air duct 504 can be detached by unfastening the clips 539 from a bottom edge of the outer cover 552 adjacent the air inlet 554. This permits access to the engine air filter 328 in order to visually inspect its condition and, if necessary, clean or replace it. The engine air duct 504 is thus toollessly removable. In other implementations, the engine air duct 504 may be pivotable between closed and open positions similarly to the CVT air duct 610 discussed above. In addition, in some implementations, removing the engine air duct 504 (or moving the engine air duct 504 to its open position) may provide access to other engine components (e.g., a battery, a coolant reservoir, an oil filter, spark plugs, injectors, fuses or a diagnostic connector may be accessible).

As will be described in more detail below, the conduit 505 also includes a Helmholtz resonator 568 for attenuating sounds of a given band of frequencies, different from those attenuated by the Helmholtz resonator 532 described above. The Helmholtz resonator 568 includes a chamber 570 formed between a resonator cover 574 and the base member 550 and the tubular passageway 558 (FIG. 25). The resonator cover 574 is enclosed between the base member 550 and the outer cover 552. A volume is defined between the base member 550 and the outer cover 552 outside of the resonator cover 574. This volume can decrease the amount of noise emitted by the engine 30.

Returning to FIGS. 25 and 26, a tubular passageway 558 is connected to the base member 550 such that, when the conduit 505 is assembled, part of the tubular passageway 558 is enclosed between the base member 550 and the outer cover 552. The tubular passageway 558 is connected to an outer side of the base member 550 (e.g., via fasteners) and is fluidly connected to the air inlet 554. That is, air flows from the air inlet 554 into the volume defined between the base member 550 and the outer cover 552 outside of the resonator cover 574, into an inlet 575 of the tubular passageway 558, through the tubular passageway 558 and out through the air outlet 556 (which is the outlet of the tubular passageway 558). In this implementation, the tubular passageway 558 extends laterally and upwardly from the inlet 575 to the outlet 556. A peripheral edge 560 of the base member 550 includes a protrusion 562 extending continuously along a length of the peripheral edge 560. A channel 566 of an inwardly-facing peripheral edge 564 of the outer cover 552 is configured to receive the protrusion 562 therein. More specifically, an interlocking fit between the protrusion 562 and the channel 566 connects the outer cover 552 to the base member 550. Fasteners (e.g., bolts) may also be provided to additionally retain the outer cover 552 with the base member 550. Moreover, a sealing member (e.g., a gasket, such as an O-ring) may be provided at the inwardly-facing peripheral edge 564 to ensure an air-tight seal between the base member 550 and the outer cover 552.

The chamber 570 is defined in part by an outer surface 572 of the base member 550 and an inner surface 576 of the resonator cover 574. An opening 578 defined in the tubular passageway 558, fluidly communicates the air inlet 554 with the chamber 570. The chamber 570 has a specified volume that determines the band of frequencies that is attenuated by the Helmholtz resonator 568. Thus, in this implementation, the engine air intake system 120' includes a Helmholtz resonator upstream (the resonator 532) and downstream (the resonator 568) of the engine air filter 328.

The resonator cover 574 is secured to the base member 550 in a similar manner to the outer cover 552. Notably, the base member 550 includes an interior edge 580 surrounding the part of the outer surface 572 that defines the chamber 570. The interior edge 580 includes a protrusion 582 that extends continuously along a length of the interior edge 580. A channel 584 of a peripheral edge 586 of the resonator cover 574 is configured to receive the protrusion 582 therein. An interlocking fit between the protrusion 582 and the channel 584 connects the resonator cover 574 to the base member 550. Fasteners (e.g., bolts) may also be provided to additionally retain the resonator cover 574 with the base member 550. Moreover, a sealing member (e.g., a gasket, such as an O-ring) may be provided at the peripheral edge 586 to ensure an air-tight seal between the resonator cover 574 and the base member 550.

An air outlet of the conduit 505 includes an elbow 325 that is connected to the throttle body 322 which fluidly communicates the conduit 505 to the engine air inlet 315. More specifically, as described above, one end of the throttle body 322 (opposite the end connected to the elbow 325) is connected via the conduit 323 to the airbox 324. In turn, the airbox 324 fluidly communicates the throttle body 322 to the engine air inlet 315 of the engine 30 as described above. It is contemplated that the airbox 324 could be omitted from the engine air intake system 120' in other implementations. In such implementations, the throttle body 322 could be connected to the engine air inlet 315 via a manifold.

As shown in FIGS. 16 and 17, in this implementation, the outer cover 508 of the engine air duct 504 is generally symmetrical to the outer cover 608 of the CVT air duct 610 about the longitudinal centerplane 3. Notably, the air inlet 502 and the air inlet 602 are laterally and vertically symmetrical about the longitudinal centerplane 3. With additional reference to FIGS. 13 to 15, in this implementation, both the air inlets 502, 602 are located forwardly of the straddle seat 20 as well as forwardly of the handlebar 42. Moreover, the air inlets 502, 602 are positioned forwardly of the footrests 26 and vertically higher than the footrests 26. The air inlets 502, 602 are however positioned rearwardly of the front suspension assemblies 70. Moreover, as shown in FIG. 17, the engine 30 is disposed in part laterally between the engine air duct 504 and the CVT air duct 610.

The positioning of the engine air duct 504 and the CVT air duct 610 also cover a part of the engine 30. Notably, with reference to FIGS. 12 to 14, the engine air duct 504 and the CVT air duct 610 conceal upper and opposite lateral parts of the engine 30 from view. The vehicle 10" also includes panels for concealing other parts of the engine 30 and other components of the vehicle 10 as well as providing a more appealing aesthetic look of the vehicle 10". For instance, the vehicle 10" has a front panel 702 for concealing a front part of the engine 30, and engine panels 704, 706 for concealing a top part of the engine 30. The vehicle 10" also has lateral panels 708 on opposite lateral sides of the vehicle 10" for concealing a lower part of the engine 30. Other panels may also be provided for concealing other internal components of the vehicle 10".

In addition, the positioning of the engine air duct 504 and the CVT air duct 610 does not interfere with other components or driver ergonomics and does not reduce visibility or significantly raise the vehicle's center of gravity.

Exhaust System for Engine

The exhaust system 122 connected to the engine 30 will now be described with reference to FIGS. 1B and 4A.

Each cylinder 108 has an exhaust port 340 defined in the left side thereof. The exhaust system 122 includes an exhaust manifold 342 having three conduits 344. Each conduit 344 is connected to the exhaust port 340 of a corresponding cylinder and extends leftwardly and downwardly therefrom. The exhaust manifold 342 connects the exhaust ports 340 to an exhaust conduit 346 extending longitudinally and rearwardly from the exhaust manifold 342 to a muffler 350 disposed under the seat 20. In the illustrated implementation, the muffler 350 is laterally centered with respect to the longitudinal centerplane 3. The muffler 350 is aligned with the seat 20 in the lateral and longitudinal directions. Thus, there is an overlap between the seat 20 and the muffler 350 when viewed from a top or bottom. It is however contemplated that muffler 350 could not be aligned with the seat 20 in the lateral and/or longitudinal directions. It is contemplated that the muffler 350 could not be laterally centered with respect to the longitudinal centerplane 3. In the illustrated implementation of the vehicle 10, the driveshaft 38 is disposed vertically higher than the muffler 350 when the vehicle 10 is placed on level ground without any driver, passenger, and/or cargo.

The engine 30 is also connected to other systems and components which aid in the functioning of the engine 30.

As best seen in FIGS. 4C and 5D, the front end of the crankcase 102 has bolted thereto a magneto cover 372 for covering a magneto (not shown). The magneto (not shown) is connected to the front end of the crankshaft 31. As is known, the magneto produces electrical power while the engine 30 is running to power some of the engine systems (for example, the ignition and fuel injection systems) and vehicle systems (for example, lights and display gauges).

As best seen in FIGS. 5A and 5C, a starter motor 374 is disposed on a left side of the crankcase 102 and disposed below exhaust ports 340 of the cylinders 108. The exhaust manifold 342 extends downwardly on a left side of the starter motor 374. As is known, the starter motor 374 is an electrical motor operatively connected to the crankshaft 31 in order to initiate rotation of the crankshaft 31 and to thereby start operation of the engine 30.

With reference to FIG. 4C to 5D, the engine 30 has a lubrication system which includes an oil tank 360 connected to the engine 30 on the right side of the engine 30 below the airbox 324. The oil tank 360 is shaped such that it follows the contour of the cylinder block 104 and the crankcase 102. In the illustrated implementation of the engine 30, the oil tank 360 is defined by a cover bolted to the right side of the cylinder block 104. An oil filler neck 362, through which oil is poured to fill the oil tank 360, extends upwardly from the oil tank 360 in order to be easily accessible from above the engine 30. An oil cap 364 is used to selectively close the upper opening of the oil filler neck 362. The oil dipstick 615 (FIG. 27) extends from the oil cap 364 and can be used to determine the level of oil in the oil tank 360. As best seen in FIGS. 4C, 5A and 5D, an oil cooler 366 is connected to the front end of the cylinder block 104 just above the left side of the magneto cover 372. An oil filter housing 368 is also provided at the front end of the cylinder block 104 on the left side of the oil cooler 366. As the name suggests, the oil filter housing 368 houses the oil filter (not shown). The oil filter housing 368 has a removable cap provided at the top thereof to allow for easy access to the oil filter for maintenance and replacement thereof.

The oil in the lubrication system is cooled by a water cooling system including a water pump 370 located at the front end of the cylinder block 104 on a right side of the oil cooler 366.

Other details regarding the engine 30 can be found in United States Patent Application Publication No. 2009/0007878, published on Jan. 8, 2009, and European Patent Application Publication No. 2348201 A1, published on Jul. 27, 2011, the entirety of which are incorporated herein by reference.

The configuration of the vehicle 10 provides a center of gravity positioned at a low and longitudinally forward position compared to other straddle-seat vehicles. The generally vertically oriented inline configuration of the engine 30, the generally vertically oriented CVT 34, the generally vertically oriented transfer case 36, and their longitudinal arrangement allows the vehicle 10 to have a slim profile in the lateral direction. The slim lateral direction profile allows the driver to ride in a foot-forward stance. The narrow lateral direction profile and the lower center of gravity of the vehicle 10 also provide are also dynamically advantageous for three-wheeled straddle-seat vehicles.

Family of Vehicles

The above described vehicle 10 is a member of a family of vehicles.

With reference to FIGS. 6A to 9B, another member 10' of the family of vehicles will now be described.

The vehicle 10' has many features that correspond to features of the vehicle 10 above. Corresponding and similar features of the vehicles 10 and 10' have been labeled with the same reference numbers and will not be described again herein in detail. Features of the vehicle 10' that are different from corresponding features of the vehicle 10 described above have been labeled with the same reference number followed by an apostrophe. The vehicle 10' will only be discussed in detail with regard to the differences from the vehicle 10.

The vehicle 10 and 10' have the same vehicle frames 12, wheels 14, 16, suspension assemblies 70, 80 and steering assembly 40.

A powertrain 100' of the vehicle 10' includes an engine 30' which is similar to the engine 30 except that the engine 30' has one cylinder 108 fewer than the engine 30. The engine 30' is an inline two cylinder engine 30', including a front cylinder 108 and a rear cylinder 108, instead of the inline three cylinder engine 30 of the vehicle 10. The engine 30' is mounted to the vehicle frame 12 such that the rear cylinder 108 of the engine 30' is in the same location as the rearmost cylinder 108 of the engine 30 in the vehicle 10, and the front cylinder 108 of the engine 30' is in the same location as the middle cylinder 108 in the vehicle 10. In the illustrated implementation, the cylinder axis 110 of the rear cylinder 108 of the engine 30' is in the same longitudinal position as the cylinder axis 110 of the rearmost cylinder 108 of the engine 30 in the vehicle 10, and the cylinder axis 110 of the front cylinder 108 of the engine 30' is in the same longitudinal position as the middle cylinder 108 in the vehicle 10. A forward portion of the front cylinder 108 of the engine 30' extends forward of the front wheel plane 18 as can be seen best in FIG. 7B.

It is contemplated that the engine 30' could be mounted to the vehicle frame 12 such that the front cylinder 108 of the engine 30' is in the same location as the front cylinder 108 of the engine 30 in the vehicle 10, and the rear cylinder 108 of the engine 30' is in the same location as the middle cylinder 108 in the vehicle 10. In the illustrated implementation, the cylinder axis 110 of the front cylinder 108 of the engine 30' is in the same longitudinal position as the cylinder axis 110 of the front cylinder 108 of the engine 30 in the vehicle 10, and the cylinder axis 110 of the rear cylinder 108 of the engine 30' is in the same longitudinal position as the middle cylinder 108 in the vehicle 10.

It is also contemplated that the engine 30' could have one cylinder 108 instead of two cylinders 108 as shown herein.

The vehicle 10' has a transfer case 36' that is different from the transfer case 36 of the vehicle 10. The transfer case housing 140 is the same in the respective transfer cases, 36 and 36', in both of the vehicles 10 and 10'. The transfer case housing 140 is mounted to the vehicle frame 12 in the same manner in both vehicles 10 and 10'. In the vehicle 10' however, the gear ratio defined by the input sprocket (not shown) and the output sprocket (not shown) of the transfer case 36' is different than the gear ratio defined by the input sprocket 170 and output sprocket 172 of the transfer case 36 in the vehicle 10. Thus, one or both of the input and output sprockets of the transfer case 36' could be different from the corresponding sprocket 170, 172 in the transfer case 36.

In the illustrated implementation of the vehicle 10', the exhaust manifold 342' is different from the exhaust manifold 342 connected to the engine 30. The exhaust manifold 342' has two conduits 344 corresponding to the two cylinders 108 of the engine 30'.

Similarly, the fuel rail (not shown) of the vehicle 10' is configured for connecting to two cylinders 108 rather than three cylinders 108 and is thus different from the fuel rail 216 of the vehicle 10.

In the illustrated implementation of the vehicle 10', the airbox 324 is identical to the airbox 324 of the engine 30 in the vehicle 10. In the vehicle 10' however, the forwardmost outlets of the airbox 324 is plugged while in the vehicle 10, the forwardmost outlet of the airbox 324 is connected to the third cylinder 108 of the engine 30. Using the same airbox 324 for both engines 30, 30' allows for a reduction in the number of different types of parts that need to be manufactured and stocked for the assembly of the vehicle 10, 10', thereby ultimately leading to an increase in efficiency and cost savings of assembly and/or manufacture. It is however contemplated that a different airbox could be used in the vehicle 10' than in the vehicle 10. The vehicle 10' could have an airbox having two outlets corresponding to the two cylinders of the engine 30' instead of the airbox 324 with three outlets used for the three-cylinder engine 30 of the vehicle 10.

Since the engine 30' is smaller than the engine 30, the oil tank 360 which is formed integrally with the engine 30' is smaller than the oil tank 360 formed integrally with the engine 30. The starter motor 374' of the vehicle 10' is also less powerful than the starter motor 374 in the vehicle 10. In the illustrated implementation of the vehicle 10 and 10', some of the components connected to the engine 30' are however identical to the corresponding components connected to the engine 30. For example, the magneto, the water pump 370, the oil cooler 366, and oil filter housing 368 are identical in the vehicles 10 and 10'. It is also contemplated that any of the magneto, the water pump 370, the oil cooler 366, and oil filter housing 368 used in the vehicle 10' could be different from the corresponding component used in the vehicle 10.

Components connected to the front of the engine 30' such as the magneto, the water pump 370, the oil cooler 366, and oil filter housing 368 are disposed in the same relative location with respect to the front cylinder 108 of the engine 30' as with the respect to forwardmost cylinder 108 of the engine 30. The respective locations of these components with respect to the vehicle frame 12 is thus different in the vehicle 10' compared to the vehicle 10. Relative to the vehicle frame 12, the position of each of these components, has been displaced longitudinally rearwardly in the vehicle 10' compared with their corresponding position in the vehicle 10' as can be seen in FIGS. 6A to 8B.

Figure 7A:
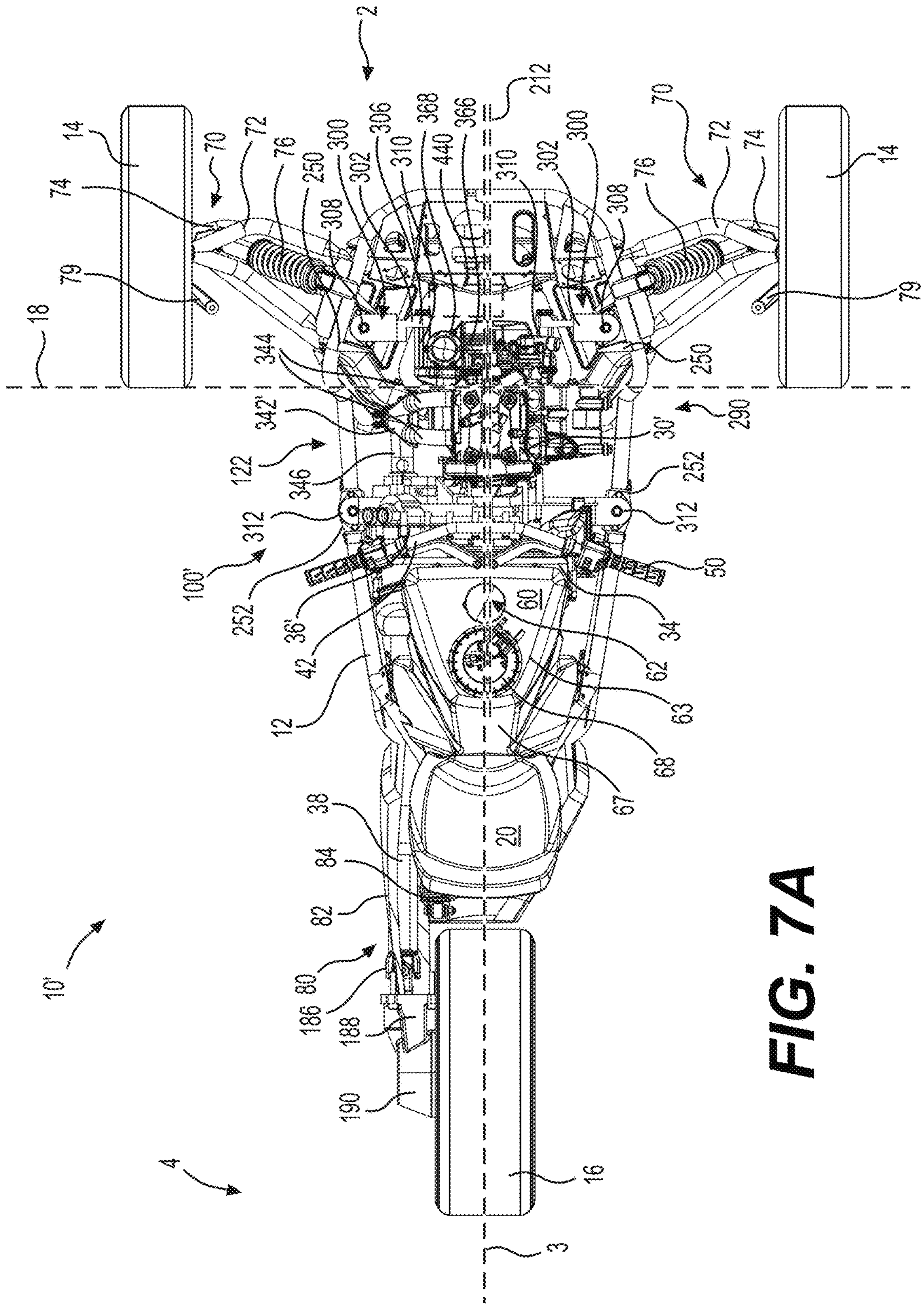
FIG. 7A is a top plan view of the vehicle of FIG. 6A with a portion of the steering assembly being removed for clarity.
Figure 7B:
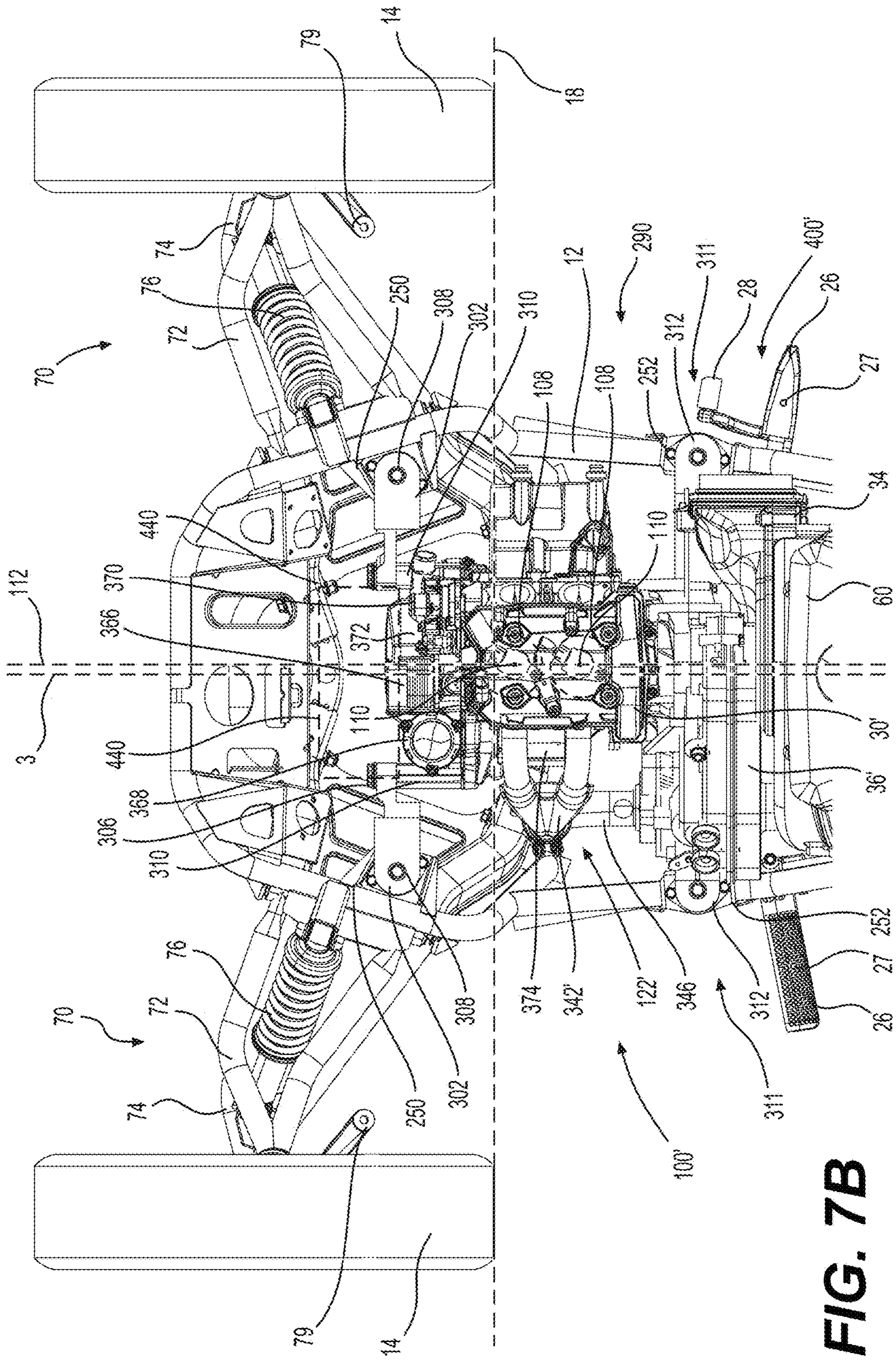
FIG. 7B is a close-up top plan view of the front portion of the vehicle of FIG. 7A.
Figure 8A:
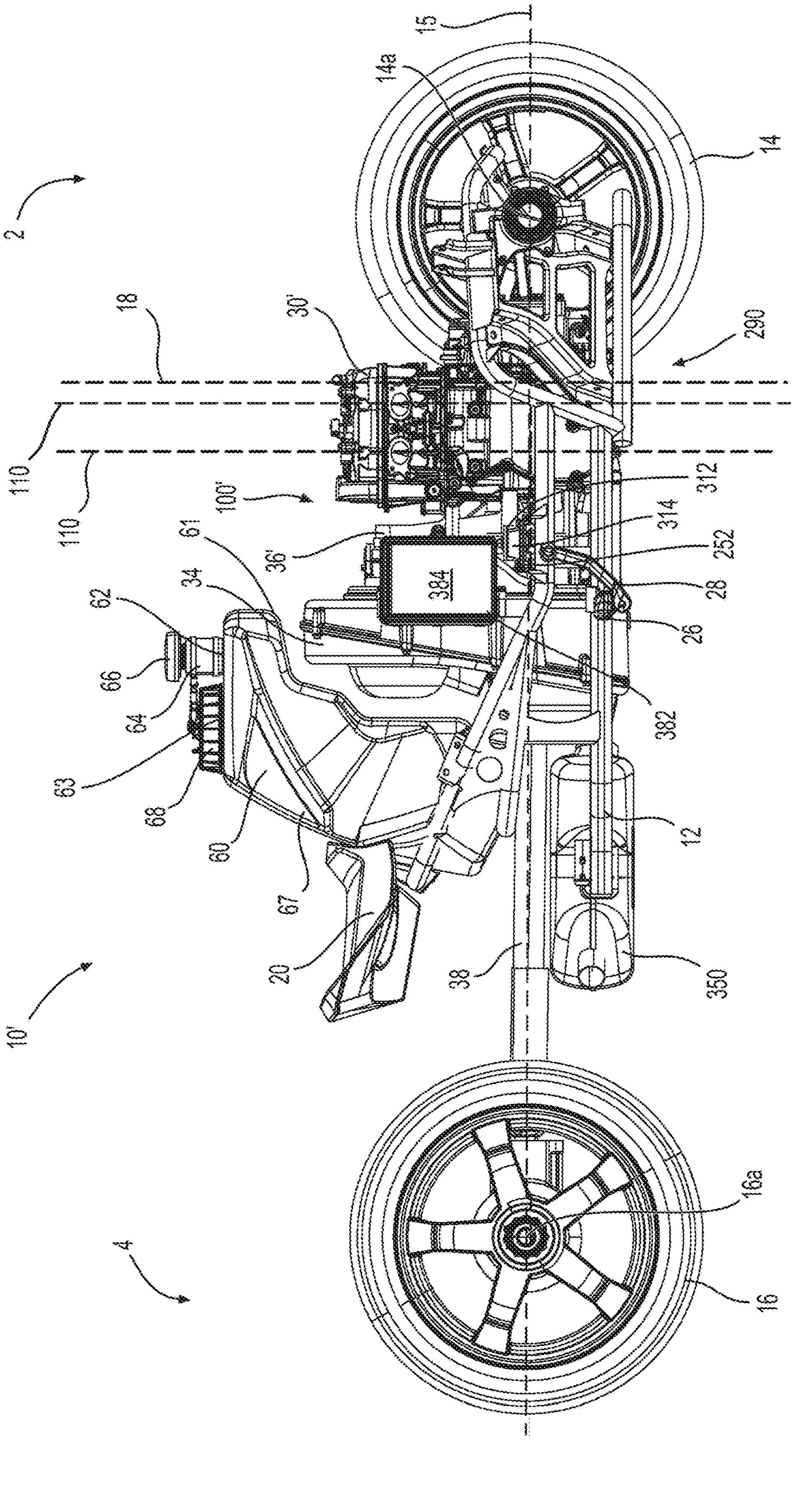
FIG. 8A is right side elevation view of the vehicle of FIG. 6A with the right front wheel, steering assembly and the front left and right suspension assemblies being removed for clarity.
Figure 8B:
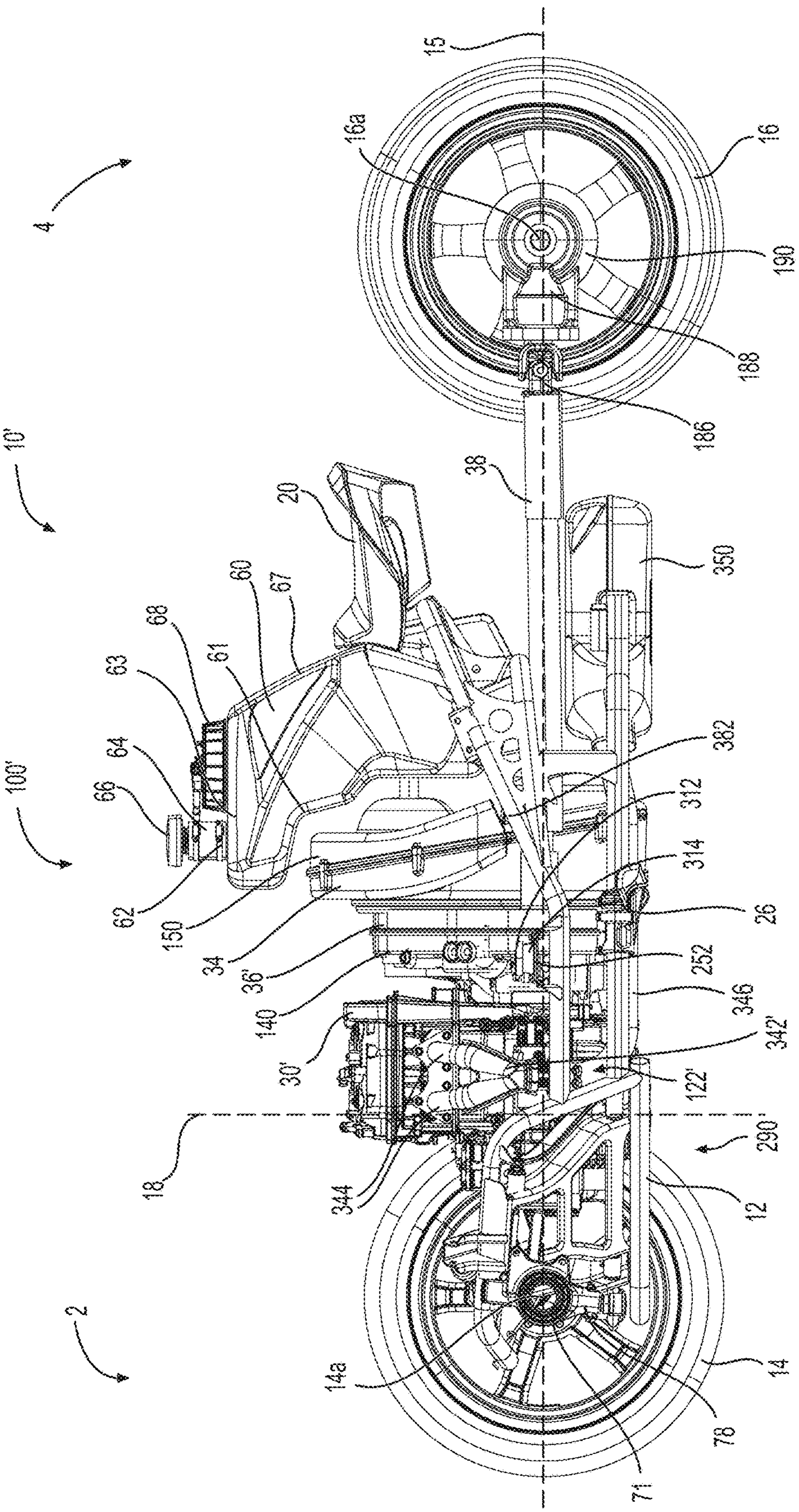
FIG. 8B is left side elevation view of the vehicle of FIG. 6A with the left front wheel, steering assembly and the front left and right suspension assemblies being removed for clarity.
Figure 9A:
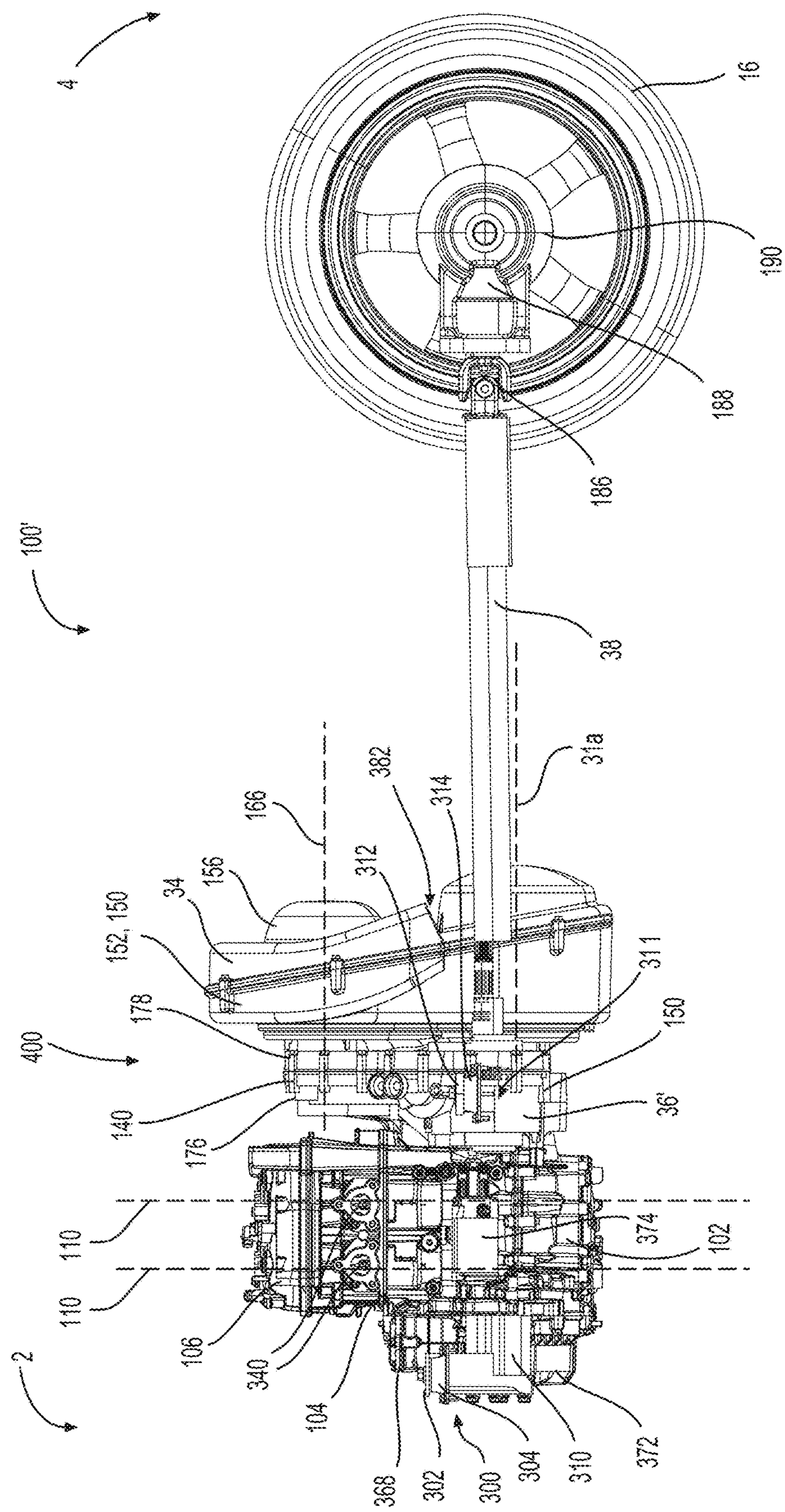
FIG. 9A is a left side elevation view of the powertrain, engine mounting assemblies, and rear wheel of the vehicle of FIG. 6A.
Figure 9B:
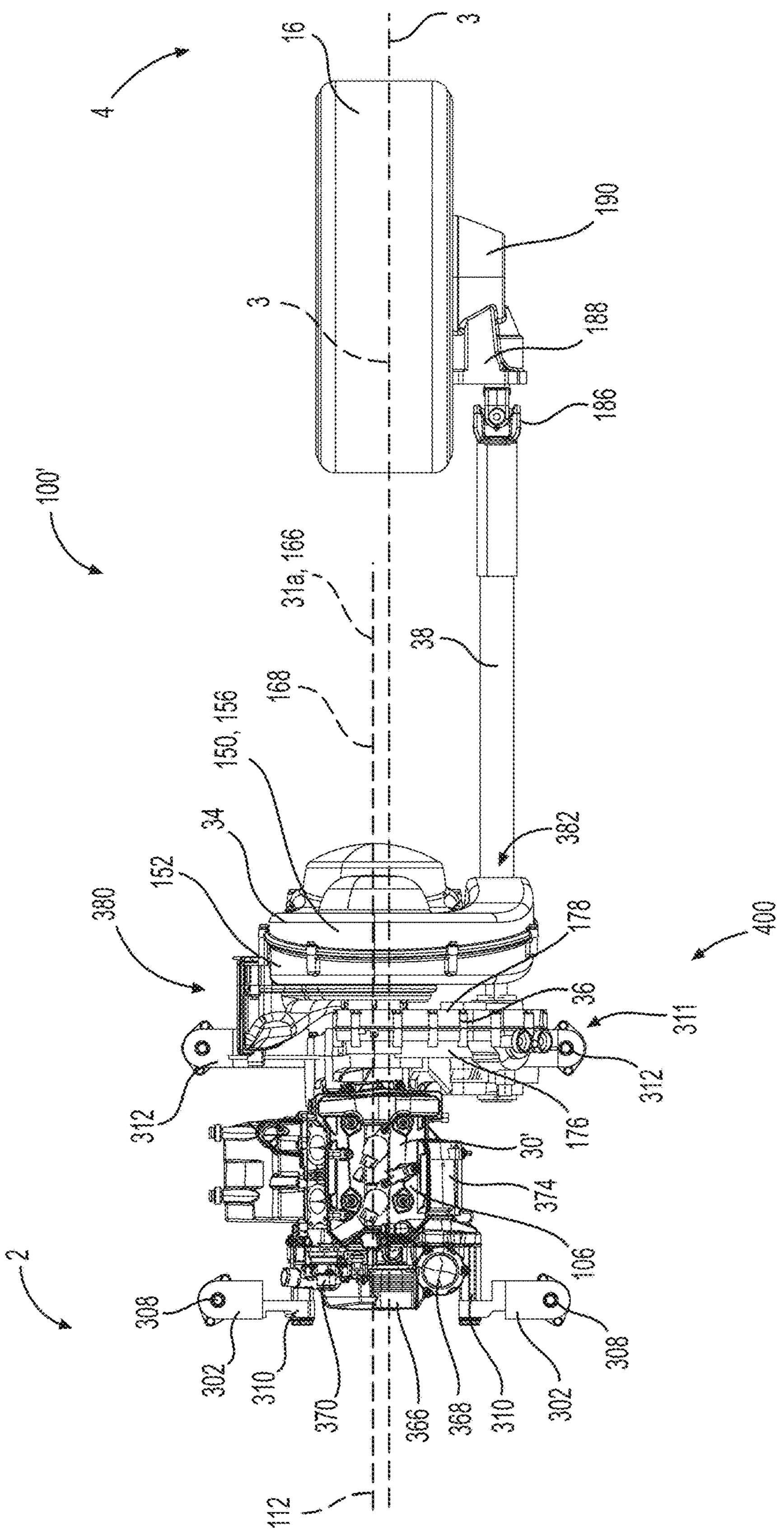
FIG. 9B is a top plan view of the powertrain, engine mounting assemblies, and rear wheel of FIG. 9A.

Since, in the illustrated implementation, the front of the engine 30' is disposed longitudinally rearwardly with respect to the engine mounting brackets 250, the engine 30' is mounted to the engine mounting brackets 250 using spacers 310 in addition to the brackets 302 of the mounting assembly 300 as can be seen best in FIG. 7B. A right spacer 310 has throughholes (not shown) corresponding to the right boltholes (not shown for the engine 30' but identical to the right boltholes 130 of the engine 30) of the engine 30' and the vertical flange of the bracket 302 of the right mounting assembly 300. As can be seen in FIG. 7B, engine bolts 306 are inserted through the vertical flange of the bracket 302, and through the right spacer 310 into the right boltholes disposed in the front of the engine 30' to connect the engine 30' to the vehicle frame 12.

Since the engine cradle 290 is dimensioned to house the larger engine 30, the engine cradle 290 (FIGS. 7A and 7B) has a space 440 in front of the engine 30' when the engine 30' is mounted in the engine cradle 290.

A left spacer 310, similar to the right spacer 310, has throughholes corresponding to the left boltholes (not shown for the engine 30' but identical to the left boltholes 130 of the engine 30) of the engine 30' and the vertical flange of the bracket 302 of the left mounting assembly 300. The left spacer 310 is used to connect the left side of the front of the engine 30' to the vehicle frame similarly as the right spacer 310 described above.

It is contemplated that the front of the engine 30' could be disposed in the same longitudinal position with respect to the engine mounting brackets 250 as the front of the engine 30'. In this case, it is contemplated that a spacer could be used to mount the transfer case housing 140 to each bracket 252. It is also contemplated that the CVT housing 150 and/or a rear portion of the engine 30' could be secured to the vehicle frame 12 instead of, or in addition to, the transfer case housing 140.

It is contemplated that the family of vehicles could have more than two members. All of the members of the family of vehicles are assembled using the same vehicle frame 12. In general, at least one member of the family of vehicles is assembled using a corresponding engine that is different from the engine used to assemble at least one other member of the family of vehicles. Thus the family of vehicles includes at least a first member (vehicle 10) with a first engine 30 and a second member (vehicle 10') with a second engine 30'. The engines 30, 30' of the first and second member have a different number of cylinders 108, but each engine 30, 30' is arranged in the corresponding vehicle 10, 10' in an inline configuration with the cylinder plane 112 extending generally vertically and longitudinally.

In general, individual components of the powertrain 100, 100' of each vehicle 10, 10' of the family of vehicles could be different from the corresponding components of the powertrain 100, 100' of another member 10, 10' of the family of vehicles. However, in each member 10, 10' of the family of vehicles, the components of the powertrain 100, 100' are arranged in the same configuration relative to other components of the powertrain 100, 100'. Thus, in each member 10, 10' of the family of vehicles, the engine 30, 30' is disposed longitudinally forward of the seat 20 and the transmission assembly 400 is disposed longitudinally rearward of the engine 30, 30' and longitudinally forward of the seat 20.

The manufacture and assembly of a family of vehicles including a plurality of members 10, 10' is made more efficient by using components that are common to more than one member 10, 10' of the family of vehicles. As will be understood, the use of common components also leads to a reduction in the numbers of parts that need to be manufactured which could result in a reduction in manufacturing costs.

Modifications and improvements to the above-described implementations of the present vehicle may become apparent to those skilled in the art. The foregoing description is intended to be exemplary rather than limiting. The scope of the present technology is therefore intended to be limited solely by the scope of the appended claims.

What is claimed is:

1. A vehicle, comprising:

a frame;

a plurality of ground-engaging members;

a steering assembly operatively connected to at least one ground-engaging member of the plurality of ground-engaging members for steering the vehicle;

an internal combustion engine supported by the frame, the engine defining an engine air inlet for receiving air therein;

a continuously variable transmission (CVT) operatively connecting the engine to at least one of the plurality of ground-engaging members, the CVT defining a cooling air inlet for receiving air therein;

an engine air intake system fluidly communicating with the engine air inlet for providing air to the engine, the engine air intake system comprising:

a first air inlet facing generally forwardly; and a first rearwardly-extending conduit portion extending rearwardly from the first air inlet located on a first lateral side of a longitudinal centerplane of the vehicle and fluidly communicating with the engine air inlet; and a CVT air intake system fluidly communicating with the cooling air inlet for providing air to the CVT, the CVT air intake system comprising:

a second air inlet facing generally forwardly; and a second rearwardly-extending conduit portion extending rearwardly from the second air inlet located on a second lateral side of the longitudinal centerplane of the vehicle and fluidly communicating with the cooling air inlet, the engine being disposed at least in part laterally between the first and second rearwardly-extending conduit portions.

2. The vehicle of claim 1, wherein the first air inlet and the second air inlet are disposed on opposite lateral sides of the engine.

3. The vehicle of claim 1, wherein the engine air intake system further comprises:

a first transversely-extending conduit portion fluidly communicating the first rearwardly-extending conduit portion to the engine air inlet and extending laterally across the longitudinal centerplane.

4. The vehicle of claim 3, wherein the first transversely-extending conduit portion is located in front of the CVT.

5. The vehicle of claim 3, wherein the engine air intake system further comprises a throttle body fluidly communicating the first transversely-extending conduit portion to the engine air inlet.

6. The vehicle of claim 5, wherein the throttle body and the engine air inlet are located on the second lateral side of the longitudinal centerplane.

7. The vehicle of claim 5, wherein the engine air intake system further comprises an air filter.

8. The vehicle of claim 7, wherein the air filter is disposed between the first rearwardly-extending conduit portion and the engine air inlet.

9. The vehicle of claim 7, wherein at least one of the first and second rearwardly-extending conduit portions is openable for providing access to an engine component.

10. The vehicle of claim 9, wherein the first rearwardly-extending conduit portion is removable for providing access to the air filter.

11. The vehicle of claim 1, wherein the first rearwardly-extending conduit portion comprises a Helmholtz resonator.

12. The vehicle of claim 3, wherein the first transversely-extending conduit portion comprises a Helmholtz resonator.

13. The vehicle of claim 1, wherein the CVT comprises:

a primary pulley operatively connected to the engine;

a secondary pulley;

a belt interconnecting the primary pulley to the secondary pulley; and a housing for enclosing the primary pulley, the secondary pulley and the belt therein, the housing defining the cooling air inlet, and the housing defining an air outlet located on an opposite lateral side of the longitudinal centerplane than the cooling air inlet.

14. The vehicle of claim 13, wherein the CVT air intake system further comprises a second transversely-extending conduit portion fluidly communicating the second rearwardly-extending conduit portion to the cooling air inlet and extending laterally towards the longitudinal centerplane from the second rearwardly-extending conduit portion.

15. The vehicle of claim 14, wherein the second transversely-extending conduit portion extends downwardly and laterally inwardly toward the cooling air inlet.

16. The vehicle of claim 5, wherein the engine air intake system further comprises a plenum fluidly communicating the throttle body to the engine air inlet.

17. The vehicle of claim 1, further comprising a straddle seat, the first and second air inlets being located forwardly of the straddle seat.

18. The vehicle of claim 1, wherein:

the steering assembly includes a handlebar for steering the vehicle; and the first and second air inlets are positioned forwardly of the handlebar.

19. The vehicle of claim 1, further comprising first and second footrests located on either lateral side of the vehicle for resting a driver's feet, the first and second air inlets being positioned forwardly of and vertically higher than the footrests.

20. The vehicle of claim 1, wherein the plurality of ground-engaging members includes two front ground-engaging members, the vehicle further comprising front suspension assemblies connecting the front ground-engaging members to the frame, the first and second air inlets being positioned rearwardly of the front suspension assemblies.

21. The vehicle of claim 1, wherein:

the plurality of ground-engaging members is a plurality of wheels; and the plurality of wheels includes a single rear wheel.

22. The vehicle of claim 1, wherein the second rearwardly-extending conduit portion is pivotable for providing access to an oil dipstick of the engine.

* * * * *